(12) United States Patent  
Ritter et al.

(10) Patent No.: US 12,130,840 B2
(45) Date of Patent: Oct. 29, 2024

(54) VIRTUAL FOREIGN KEYS

(71) Applicant: Tonic AI, Inc., San Francisco, CA (US)

(72) Inventors: Emily Christine Ritter, Atlanta, GA (US); Howard Wang, Fremont, CA (US); Andrew C. Colombi, San Francisco, CA (US); Jonathan T. Gluck, Athens, GA (US)

(73) Assignee: Tonic AI, Inc., San Francisco, CA (US)

( * ) Notice: Subject to any disclaimer, the term of this patent is extended or adjusted under 35 U.S.C. 154(b) by 0 days.

(21) Appl. No.: 18/084,001

(22) Filed: Dec. 19, 2022

(65) Prior Publication Data

US 2023/0195752 A1 Jun. 22, 2023

Related U.S. Application Data

(60) Provisional application No. 63/291,600, filed on Dec. 20, 2021, provisional application No. 63/336,181, filed on Apr. 28, 2022.

(51) Int. Cl.
*G06F 16/28* (2019.01)
*G06F 16/21* (2019.01)
*G06F 16/2457* (2019.01)

(52) U.S. Cl.
CPC .......... *G06F 16/284* (2019.01); *G06F 16/211* (2019.01); *G06F 16/2457* (2019.01)

(58) Field of Classification Search
CPC ... G06F 16/284; G06F 16/211; G06F 16/2457
(Continued)

(56) References Cited

U.S. PATENT DOCUMENTS 5,819,086 A * 10/1998 Kroenke ............... G06F 16/284
 715/764
5,819,254 A * 10/1998 Kawai .................. G06F 16/284
 707/999.102

(Continued)

OTHER PUBLICATIONS

Oracle SQL Developer User's Guide, Release 22.2 F58839-01 Copyright @ 2006 (Year: 2006).*

(Continued)

*Primary Examiner* — Kuen S Lu
(74) *Attorney, Agent, or Firm* — Van Pelt, Yi & James LLP

(57) ABSTRACT

Generating virtual foreign key relationships includes determining and displaying, in a user interface, a set of candidate foreign keys. It further includes determining and displaying, in the user interface, a set of candidate primary keys. It further includes receiving a request, via the user interface, to generate a virtual foreign key relationship between a selected candidate foreign key and a selected candidate primary key. It further includes in response to receiving the request to generate the virtual foreign key relationship between the selected candidate foreign key and the selected candidate primary key, generating the virtual foreign key relationship at least in part by generating a record for the virtual foreign key relationship.

Determining a schema for non-relational data includes receiving a document in a first format. It further includes scanning the document and determining, for a field in the document, a corresponding path of the field and a data type of the field. It further includes updating a hybrid schema based at least in part on the determined path and data type of the field in the document.

12 Claims, 36 Drawing Sheets

(58) Field of Classification Search
USPC .......................................................... 707/748
See application file for complete search history.

(56) References Cited

U.S. PATENT DOCUMENTS

| | | | |
|---|---|---|---|
| 6,295,539 B1 * | 9/2001 | Isip, Jr. ............. | G06F 16/24565 |
| | | | 707/999.102 |
| 11,636,086 B1 * | 4/2023 | Goodnow ............. | G06F 16/288 |
| | | | 707/736 |
| 2014/0046972 A1 * | 2/2014 | Xue ........................ | G06F 16/00 |
| | | | 707/769 |
| 2019/0050437 A1 * | 2/2019 | Goyal ................. | G06F 16/2272 |
| 2021/0374153 A1 * | 12/2021 | Saxena ............... | G06F 11/3476 |

OTHER PUBLICATIONS

Oracle SQL Developer User's Guide, Release 22.2 F58839-01 Copyright @ 2006, 2022 (Year: 2022).*

* cited by examiner

TONIC ↶ ↷ | Workspace: pg rds ▾ | ⌀ 🖉 🗇 ⌃ ↧ 🗑 ⊕ New Workspace | ƒ× Generate Data | ⊙ ≡

▭ Workspaces
● Privacy Hub

🔍 Tables | ▽ Filter

Every table

🔍 Column name search | 🔍 Advanced

⚙ Database View
▤ Table View
🔑 Foreign Keys
⚔ Jobs
⇅ Schema Changes ⌀
▽ Subsetting ∘
🗐 Post-Job Actions ☐▸ Bulk Edit ˅
˅ public
☐ customers   M˅ 🗎
☐ customers_legacy   M˅ 🗎
☐ date
☐ employees   M˅ 🗎
☐ legacy_wo🖱   M˅ 🗎
☐ marketing   M˅ 🗎
☐ products   M˅ 🗎
☐ retail_sales   M˅ 🗎
☐ stores   M˅ 🗎
☐ vendors   M˅ 🗎
☐ wholesale_orders   M˅ 🗎
☐ wo_date   M˅ 🗎

☐▸ Bulk Edit Generator ˅  Bulk Edit Sensitivity ˅  Sort Columns ˅ 🖽
☐ customers.Customer_Key [integer]   🔍 Passthrough ˅
☐ customers.First_Name [varchar]   🔍 Passthrough ˅
☐ customers.Last_Name [varchar]   🔍 Passthrough ˅
☐ customers.Gender [varchar]   🔍 Passthrough ˅
☐ customers.Email [varchar]   🔍 Passthrough ˅
☐ customers.Marital_Status [varchar]   🔍 Passthrough ˅
☐ customers.Number_of_Children [integer]   🔍 Passthrough ˅
☐ customers.Annual_Income [numeric]   🔍 Passthrough ˅
☐ customers.Occupation [varchar]   🔍 Passthrough ˅
☐ customers.Largest_Bill_Amount [numeric]   🔍 Passthrough ˅
☐ customers.Store_Membership_Card [varchar]   🔍 Passthrough ˅
☐ customers.Birth_Date [date]   🔍 Passthrough ˅
☐ customers.Customer_Since [date]   🔍 Passthrough ˅
☐ customers.Last_Transaction [date]   🔍 Passthrough ˅
☐ customers.Ext_Demographic_Data [json]   🔍 Passthrough ˅
☐ customers_legacy.Customer_Key [integer]   🔍 Passthrough ˅
☐ customers_legacy.First_Name [varchar]   🔍 Passthrough ˅

⊕ Collapse

| TONIC ↶ ↷ | Workspace: [pg rds ▼] ✎ ⟲ ⎘ 🗑 ⬇ ⬆ ⊕ New Workspace | | | fx Generate Data ⊙ ≡ |
|---|---|---|---|---|
| ▦ Workspaces | Privacy Hub | | | |
| ● Privacy Hub | Scan for sensitive data types, apply generators to protect them, and track your progress in the current workspace, all within the Privacy Hub. | | | |
| ⛁ Database View | Scan ⓘ | Protect ⓘ | | Track Progress |
| ▦ Table View | Privacy Scan Completed | Unprotected Fields | | Protected Fields |
| 🔑 Foreign Keys | Tonic has identified unprotected fields and logged all updates to the protection audit trail below. | 21 | | 0 |
| ⚒ Jobs | [Run Privacy Scan] ✓ Successfully completed 2 years ago. | View in Database View → | | View in Database View → |
| ⇄ Schema Changes △ | | ⌐ 404 | | ⌐ 406 |
| ▽ Subsetting ○ | Unprotected Column ⌐ 402 | PII Type | Suggested Generator | Custom Generator |
| ▦ Post-Job Actions | public.customers.Email 🔍▤ | Email | [Email Generator] | [Passthrough ∨] ⊗ |
| | public.customers.Annual_Income 🔍▤ | Manual | | [Passthrough ∨] ⊗ |
| | public.customers.Birth_Date 🔍▤ | Birth Date | [Random Timestamp Generator] | [Passthrough ∨] ⊗ |
| | public.customers_legacy.First_Name 🔍▤ | First name | [Name Generator] | [Passthrough ∨] ⊗ |
| | public.customers_legacy.Last_Name 🔍▤ | Last name | [Name Generator] | [Passthrough ∨] ⊗ |
| | public.customers_legacy.Gender 🔍▤ | Gender | [Categorical Generator] | [Passthrough ∨] ⊗ |
| | public.customers_legacy.Customer_Address 🔍▤ | Email | [Email Generator] | [Passthrough ∨] ⊗ |
| | | Address | [Address Generator] | [Passthrough ∨] ⊗ |
| | public.customers_legacy.Birth_Date 🔍▤ | Birth Date | [Random Timestamp Generator] | [Passthrough ∨] ⊗ |
| | public.employees.first_name 🔍▤ | First name | [Name Generator] | [Passthrough ∨] ⊗ |
| | and 11 more... | | | |
| ⊕ Collapse | | | | |

FIG. 4A

| TONIC | Workspace: pg rds ▼ | ✏ ⎘ ⎘ ⎘ ↓ ⎘ ⊕ New Workspace | | ƒx Generate Data \| ⊕ ≡ |
|---|---|---|---|---|

Privacy Hub

Scan for sensitive data types, apply generators to protect them, and track your progress in the current workspace, all within the Privacy Hub.

- Workspaces
- Privacy Hub

| Scan | Protect | Track Progress |
|---|---|---|
| Privacy Scan Completed | Unprotected Fields | Protected Fields |
| Tonic has identified unprotected fields and logged all updates to the protection audit trail below. | 21 | 0 |
| [Run Privacy Scan] ✓ Successfully completed 2 years ago. | View in Database View → 412 | View in Database View → |

- Database View
- Table View
- Foreign Keys
- Jobs
- Schema Changes
- Subsetting
- Post-Job Actions

| Unprotected Column | PII Type | Original Data | Suggested Generator | Custom Generator |
|---|---|---|---|---|
| public.customers.Email | | David | Email Generator | Passthrough ⌄  ⊗ |
| public.customers.Annual_Income | | Raja | | Passthrough ⌄  ⊗ |
| public.customers.Birth_Date | | Darlene | Random Timestamp Generator | Passthrough ⌄  ⊗ |
| public.customers_legacy.First_Name | | Daniel | Name Generator ↙ 414 | Passthrough ⌄  ⊗ |
| public.customers_legacy.Last_Name | | Midori | Name Generator | Passthrough ⌄  ⊗ |
| public.customers_legacy.Gender | | Theodore | Categorical Generator | Passthrough ⌄  ⊗ |
| public.customers_legacy.Email | | Ben | Email Generator | Passthrough ⌄  ⊗ |
| public.customers_legacy.Customer_Addr | | Laura | Address Generator | Passthrough ⌄  ⊗ |
| public.customers_legacy.Birth_Date | Birth Date | Mark | Random Timestamp Generator | Passthrough ⌄  ⊗ |
| public.employees.first_name | First name | Lucas | Name Generator | Passthrough ⌄  ⊗ |
| and 11 more... | | | | |

⊕ Collapse

TONIC

Workspace: pg rds ▼ | ⊕ New Workspace | ƒx Generate Data

- Workspaces
- Privacy Hub
- Database View
- Table View
- Foreign Keys
- Jobs
- Schema Changes
- Subsetting
- Post-Job Actions

Subsetting
Configure a referentially intact subset of your data.
● Enable subsetting

Configure Subsetting   View Previous Subsetting Runs

Target Tables

Add a New Target Table +   ○ Process Tables Out of Subset

| Target Table | Target Percentage | Target Where Clause |
|---|---|---|
| customers ▼ | 10 | |

Reference Table

Preview
The preview below gives an estimate of which tables will contain data after subsetting on the target table. Once a data generation has been completed with this subsetting configuration, the results will be shown here.

| In Subset | | Out of Subset |
|---|---|---|
| public.customers | 172/1,937 rows | public.customers_legacy |
| public.date | 1,761/1,827 rows | public.employees |
| public.products | 2,309/2,504 rows | public.legacy_wo |
| public.retail_sales | 166,080/1,910,783 rows | public.marketing |
| public.stores | 200/200 rows | |
| public.vendors | 1/33 rows | |
| public.wholesale_orders | 7,546/7,546 rows | |
| public.wo_date | 413/1,827 rows | |

Subset Steps
Jump to a Subset Action Step ▶

⊞ Open All Cards
- ⊞ public.customers
- ⊞ public.retail_sales
- ⊞ public.stores
- ⊞ public.date
- ⊞ public.products
- ⊞ public.wholesale_orders
- ⊞ public.wo_date
- ⊞ public.vendors ⊕ Collapse

FIG. 5A

| TONIC | Workspace: pg rds ▼ | ✎ | ⌂ ⊡ 🗂 🗑 | ⇩ ⇧ ⊕ New Workspace | fx Generate Data | ⊙ ≡ |

- Workspaces
- Privacy Hub
- Database View
- Table View
- Foreign Keys
- Jobs
- Schema Changes
- Subsetting
- Post-Job Actions customers ▼ | 10

Preview
The preview below gives an estimate of which tables will contain data after subsetting on the target table. Once a data generation has been completed with this subsetting configuration, the results will be shown here.

| In Subset | | Out of Subset |
|---|---|---|
| public.customers | 172/1,937 rows | public.customers_legacy |
| public.date | 1,761/1,827 rows | public.employees |
| public.products | 2,309/2,504 rows | public.legacy_wo |
| public.retail_sales | 166,080/1,910,783 rows | public.marketing |
| public.stores | 200/200 rows | |
| public.vendors | 1/33 rows | |
| public.wholesale_orders | 7,546/7,546 rows | |
| public.wo_date | 413/1,827 rows | |

Subset Steps

Jump to a Subset Action Step ▼

⊞ Close All Cards
⊞ public.customers ⊕
  Source Rows: 1937
  Contributing Tables: 0 ⊙
  Rows Processed: 172
⊞ public.retail_sales »
  Source Rows: 1910783
  Contributing Tables: 1 ⊙
  Rows Processed: 166080
⊞ public.stores »
  Source Rows: 200
  Contributing Tables: 1 ⊙
  Rows Processed: 200
⊞ public.date »
  Source Rows: 1827
  Contributing Tables: 1 ⊙
  Rows Processed: 1761
⊞ public.products »
  Source Rows: 2504
  Contributing Tables: 1 ⊙
  Rows Processed: 2309
⊞ public.wholesale_orders «
  Source Rows: 7546
  Contributing Tables: 1 ⊙
  Rows Processed: 7546

⊕ Collapse

TONIC ↶ ↷ | Workspace: [pg rds ▼] ⊘ 🖉 🗗 ⬇ 🗑 ↑ ⊕ New Workspace     fx Generate Data | ⓘ ≡

- ▦ Workspaces
- ◐ Privacy Hub
- ⛓ Database View
- ▦ Table View
- 🔑 Foreign Keys
- ⚙ Jobs
- ⇄ Schema Changes △
- ▽ Subsetting ○
- ⊞ Post-Job Actions

Subsetting
Configure a referentially intact subset of your data.
⬤ Enable subsetting ⓘ
Configure Subsetting   View Previous Subsetting Runs

Target Tables

[Add a New Target Table +]

| Target Table | Target Percentage | ○ Process Tables Out of Subset ⓘ |
|---|---|---|
| [customers ▼] | [10] | Target Where Clause [_____] Reference Table ⊙ |
| Target Table | Target Percentage | Target Where Clause |
| [date ▼] | [100] | [_____] Reference Table ⊙ |

Preview
The preview below gives an estimate of which tables will contain data after subsetting on the target table. Once a data generation has been completed with this subsetting configuration, the results will be shown here.

| In Subset | | Out of Subset |
|---|---|---|
| public.customers | 172/1,937 rows | public.customers_legacy |
| public.date | 1,761/1,827 rows | public.employees |
| public.products | 2,309/2,504 rows | public.legacy_wo |
| public.retail_sales | 166,080/1,910,783 rows | public.marketing |
| public.stores | 200/200 rows | |
| public.vendors | 1/33 rows | |
| public.wholesale_orders | 7,546/7,546 rows | |
| public.wo_date | 413/1,827 rows | |

Subset Steps

[Jump to a Subset Action Step ▶]

⊞ Open All Cards
- ⊞ public.date ⊙
- ⊞ public.customers ⊙
- ⊞ public.retail_sales «
- ⊞ public.stores »
- ⊞ public.products »
- ⊞ public.wholesale_orders «
- ⊞ public.wo_date »
- ⊞ public.vendors «

⊕ Collapse

| TONIC ↶ ↷ | Workspace: My Workspace ▼ | ✎ ⎘ ⎗ ⎘ ⬇ ⬆ ⊕ New Workspace | | fx Generate Data | ☰ |
|---|---|---|---|---|---|

Workspaces
My Workspace

Manage

Foreign Key Relationships

View Foreign Key Relationships    Add Foreign Key Relationships

⬢ Privacy Hub

⬡ Database View

▦ Table View

| | Column name search | | | Q Advanced |
|---|---|---|---|---|
| 🔍 Foreign Keys | 🗑 Bulk Delete | | | |
| ⚙ Jobs | ⬜ ▸ Foreign Key  Sort ⇅ | | Primary Key  Sorting by Column Name (Asc) ⇅ | |
| ⇅ Schema Changes | ⬜ customers_legacy.Birth_Date | | customers.Birth_Date | |
| ⛛ Subsetting | ⬜ customers_legacy.Customer_Key | | customers.Customer_Key | 🗄 |
| ▤ Post-Job Actions | ⬜ marketing.Customer_Key | | customers.Customer_Key | 🗄 |
| | ⬜ retail_sales.Customer_Key | | customers.Customer_Key | 🗄 ⎱ |
| | ⬜ customers.First_Name | | customers.Customer_Key | 🗄  ⎬ 722 |
| | ⬜ customers_legacy.First_Name | | customers.Customer_Key | 🗄 ⎰ |
| | ⬜ marketing.First_Name | | date.Date_Key | |
| | 🔗 retail_sales.Customer_Key | | wo_date.[Date_Key,Date_Key] | |
| | 🔗 vendors.[Manager_Start_Date_Key,Manager_End_Date_Key] | | wo_date.[Date_Key,Date_Key] | |
| | 🔗 wholesale_orders.[Order_Date_Key,Shipped_Date_Key] | | products.Product_Key | |
| | 🔗 retail_sales.Product_Key | | products.Product_Key | |
| | 🔗 wholesale_orders.Product_Key | | stores.Store_Key | |
| | 🔗 retail_sales.Store_Key | | | |

⊕ Collapse

FIG. 7C

```json
[
    {
        "fk_schema": "public",
        "fk_table": "customers_legacy",
        "fk_columns":
        [
            "Birth_Date"
        ],
        "target_schema": "public",
        "target_table": "customers",
        "target_columns":
        [
            "Birth_DateXXXXXXXXKFLDASKLFHD"
        ],
        "nullable": false
    },
    {
        "fk_table": "customers_legacy",
        "target_table": "customers",
        "fk_schema": "public",
        "target_schema": "public",
        "fk_columns":
        [
            "Customer_Key"
        ],
        "target_columns":
        [
            "Customer_Key"
        ],
        "nullable": false
    },
    {
        "fk_table": "marketing",
        "target_table": "customers",
        "fk_schema": "public",
        "target_schema": "public",
        "fk_columns":
        [
            "Customer_Key"
        ],
        "target_columns":
        [
            "Customer_Key"
        ],
        "nullable": false
    },
    {
```

FIG. 8A

```json
[
    {
        "fk_schema": "public",
        "fk_table": "customers_legacy",
        "fk_columns":
        [
            "Birth_Date"
        ], "target_schema": "public",
        "target_table": "customers",
        "target_columns":
        [
            "Birth_Date"
        ],
        "nullable": false
    },
    {
        "fk_table": "customers_legacy",
        "target_table": "customers",
        "fk_schema": "public",
        "target_schema": "public",
        "fk_columns":
        [
            "Customer_Key"
        ],
        "target_columns":
        [
            "Customer_Key"
        ],
        "nullable": false
    },
    {
        "fk_table": "marketing",
        "target_table": "customers",
        "fk_schema": "public",
        "target_schema": "public",
        "fk_columns":
        [
            "Customer_Key"
        ],
        "target_columns":
        [
            "Customer_Key"
        ],
        "nullable": false
    },
```

812

14 lines, 319 characters selected    Tab Size: 4    JSON

FIG. 8B (Cont.)

```
{
    "fk_collection": "sub_regions",
    "fk_fields":
    [
        "user_id"
    ],
    "target_collection": "public_users",
    "target_fields":
    [
        "id"
    ]
},
{
    "fk_collection": "public_cohorts",
    "fk_fields":
    [
        "user_id"
    ],
    "target_collection": "public_users",
    "target_fields":
    [
        "id"
    ]
},
{
    "fk_collection": "public_ignore_me",
    "fk_fields":
    [
        "user_id"
    ],
    "target_collection": "public_users",
    "target_fields":
    [
        "id"
    ]
}
```

FIG. 8C

```
1   {
2       "URL": "https",
3       "_id": "akjsdha",          } 1002
4       "address": "oakton",
5       "rating": "4.0"
6   }
7
8   {
9       "URL": "https",
10      "_id": "akjsdha",          } 1004
11      "rating": 4
12  }
13
14  {
15      "URL": "https",
16      "_id": "akjsdha",          } 1006
17      "address": 12345,
18      "rating": 4.0
19  }
20
```

```
{
    "Path":"",
    "Metadata":
    {
        "Document":                    ┌─1112
        {
            "Hit": 2
        }
    },
    "ObjectChildren":
    {
        "URL":
        {
            "Path": "URL",
            "Metadata":
            {
                "String":
                {
                    "Hit": 2
                }
            }
            "ObjectChildren":
            {},
            "ArraySchema": null
        },
        "_id":
        {
            "Path": "_id",
            "Metadata":
            {
                "String":
                {
                    "Hit": 2
                }
            }
            "ObjectChildren":
            {},
            "ArraySchema": null
        },
        "address":
        {
            "Path": "address",
            "Metadata":
            {
                "String":
                {
                    "Hit": 1
                }
            }
            "ObjectChildren":
            {},
            "ArraySchema": null
        },
        "rating":
        {
            "Path": "rating",
            "Metadata":
            {
                "int":
                {
                    "Hit": 1
                }
                "string":
                {
                    "Hit": 1
                }
            }
            "ObjectChildren":
            {},
            "ArraySchema": null
        },
    }
    "ArraySchema": null
}
```

1104 brackets the "ObjectChildren" block.
1106 brackets the URL entry.
1114 brackets the address entry.
1116 brackets the rating entry.
1118 brackets the "string" sub-entry.

```
{
    "Path":"",
    "Metadata":
    {
        "Document":
        {
            "Hit": 3
        }
    },
    "ObjectChildren":
    {
        "URL":
        {
            "Path": "URL",
            "Metadata":
            {
                "String":
                {
                    "Hit": 3
                }
            },
            "ObjectChildren":
            {},
            "ArraySchema": null
        },
        "_id":
        {
            "Path": "_id",
            "Metadata":
            {
                "String":
                {
                    "Hit": 3
                }
            },
            "ObjectChildren":
            {},
            "ArraySchema": null
        },
        "address":                                          ⎫
        {                                                   ⎪
            "Path": "address",                              ⎪
            "Metadata":                                     ⎪
            {                                               ⎬ 1122
                "String":                                   ⎪
                {                                           ⎪
                    "Hit": 1                                ⎪
                }                                           ⎪
                "int":                                      ⎪
                {                                           ⎪
                    "Hit": 1                                ⎭
                }
            },
            "ObjectChildren":
            {},
            "ArraySchema": null
        },
        "rating":                                           ⎫
        {                                                   ⎪
            "Path": "rating",                               ⎪
            "Metadata":                                     ⎪
            {                                               ⎪
                "int":                                      ⎪
                {                                           ⎬ 1124
                    "Hit": 1                                ⎪
                }                                           ⎪
                "String":                                   ⎪
                {                                           ⎪
                    "Hit": 1                                ⎪
                }                                           ⎪
                "double":                        ⎫          ⎪
                {                                ⎬ 1126     ⎪
                    "Hit": 1                     ⎭          ⎪
                }                                           ⎭
            }
            "ObjectChildren":
            {},
            "ArraySchema": null
        },
    }
    "ArraySchema": null
}
```

FIG. 11C

```
1  {
2      "Path": "",
3      "Metadata":
4      {
5          "Document":
6          {
7              "Percent": 1.0
8          }
9      },
10     "ObjectChildren":
11     {
12         "_id":
13         {
14             "Path": "_id",
15             "Metadata":
16             {
17                 "ObjectId":
18                 {
19                     "Percent": 1.0
20                 }
21             },
22             "ObjectChildren":
23             {},
24             "ArraySchema": null
25         },
26         "string_arr":
27         {
28             "Path": "string_arr",
29             "Metadata":
30             {
31                 "Array" :
32                 {
33                     "Percent": 0.18181818181818182
34                 }
35             },
36             "ObjectChildren":
37             {},
38             "ArraySchema":
39             {
40                 "Path": "string_arr[]",
41                 "Metadata":
42                 {
43                     "String":
44                     {
45                         "Percent": 1.0
46                     }
47                 },
48                 "ObjectChildren":
49                 {},
50                 "ArraySchema": null
51             }
52         },
53         "mixed_arr":
54         {
55             "Path": "mixed_arr",
56             "Metadata":
57             {
58                 "Array" :
```

```
1612    "acquisitions":
1613    {
1614        "Path": "acquisitions",
1615        "Metadata":
1616        {
1617            "Array":
1618            {
1619                "Percent": 1.0
1620            }
1621        },
1622        "ObjectChildren":
1623        {},
1624        "ArraySchema":
1625        {
1626            "Path": "acquisitions[]",
1627            "Metadata":
1628            {
1629                "Document":
1630                {
1631                    "Percent": 1.0
1632                }
1633            },
1634            "ObjectChildren":
1635            {
1636                "price_amount":
1637                {
1638                    "Path": "acquisitions[].price_amount",
1639                    "Metadata":
1640                    {
1641                        "Int32":
1642                        {
1643                            "Percent": 0.061911600446784745
1644                        },
1645                        "Null":
1646                        {
1647                            "Percent": 0.16967182596667039
1648                        },
1649                        "Int64":
```

FIG. 12B

```
"name":
{
    "Path": "name",
    "Metadata":
    {
        "String":
        {
            "Hits": 382,
            "Examples": ["Emily", "George"]    ← 1302
        },
        "Integer":
        {
            "Hits": 1
        }
    },
    "ObjectChildren":
    {},
    "ArraySchema": null
},
```

FIG. 13

| TONIC | ↶ ↷ | Workspace: Copy of Mongo ▾ | ✎ | 🗂 | 🗑 | ↧ | ↥ | ⊕ New Workspace | | ƒx Generate Data | ⊖ ≡ |
|---|---|---|---|---|---|---|---|---|---|---|---|
| 🗃 Workspaces | | | | | | | | | | ⊂⊃ Preview | |
| 🍖 Privacy Hub | | Collection: restaurant ▾ | | | | | | | | | |
| 🗄 Collection View | | Key | | | | | | Generator | | Example Value | |
| ⚒ Jobs | | URL — 1402 | | | | | | Passthrough ▾ 🗐 | | 🔍 http://www.just-eat.co.uk/restaurants-cn-chin... | |
| ⇅ Schema Changes | | _id — 1404 | | | | | | ① Passthrough ▾ 🗐 | | 🔍 55114312c7447c3da7051b26 | |
| | | address line 2 | | | | | | | | | |
| | | address | | | | | | | | | |
| | | ↳ type: Int32 ⎤ 1406 | | | | | | ① Passthrough ▾ 🗐 | | 🔍 130 | |
| | | ↳ type: String ⎦ | | | | | | ① Passthrough ▾ 🗐 | | 🔍 228 City Road | |
| | | name | | | | | | Company Name * 🗐 | | 🔍 Kalimba Services | |
| | | outcode | | | | | | Passthrough ▾ 🗐 | | 🔍 CF24 | |
| | | postcode | | | | | | Passthrough ▾ 🗐 | | 🔍 3JH | |
| | | rating ⎤ 1408 | | | | | | Passthrough ▾ 🗐 | | 🔍 5.5 | |
| | | ↳ type: Double ⎥ | | | | | | Passthrough ▾ 🗐 | | 🔍 5 | |
| | | ↳ type: Int32 ⎥ | | | | | | Passthrough ▾ 🗐 | | 🔍 Not yet rated | |
| | | ↳ type: String ⎦ | | | | | | | | | |
| | | type_of_food | | | | | | Passthrough ▾ 🗐 | | 🔍 Chinese | |
| ⊕ Collapse | | | | | | | | | | | |

FIG. 14

| Collection: books ▼ | Collection Mode: Masked ▼ | View: Hybrid Document ▼ |
|---|---|---|
| 🔍 Search Fields | | |
| Key | Generator | Example Value |
| id | | |
| → type: Int32 | Integer Key ▼ | 🔍 382517190 |
| → type: ObjectId | | 🔍 53c2ae8528d75d572c06ad9d |
| > authors: Array | | |
| ☐ | Passthrough ▼ | 🔍 W. Frank Ableson |
| > categories: Array | | |
| ☐ | Passthrough ▼ | 🔍 Open Source |
| isbn | Passthrough ▼ | 🔍 1933988673 |
| longDescription | Passthrough ▼ | 🔍 Android is an open source mobile phone platfo... |
| pageCount | Random Integer ▼  Min: 0 Max: 10 | 🔍 4 |
| publishedDate | Random Timestamp ▼  Min... Max... Unix... | 🔍 2022-04-25T11:49:03.000Z |
| shortDescription | Passthrough ▼ | 🔍 Unlocking Android: A Developer's Guide provid... |
| status | Passthrough ▼ | 🔍 PUBLISH |
| thumbnailUrl | Passthrough ▼ | 🔍 https://s3.amazonaws.com/AKIAJC5RLADLUMVRPFDQ... |
| title | Passthrough ▼ | 🔍 Unlocking Android |

FIG. 15

| Collection: companies ▼ | Collection Mode: De-Identify ▼ | View: Hybrid Document ▼ |
|---|---|---|
| 🔍 Search Fields | | |
| Key | Generator | Example Value |
| ▨ _id | | ◉ 52cdef7c4bab8bd675297d8b |
| acquisition | | |
| ▨ ⌐→type:Document | | |
| ⌐→type:Null | | null |
| ⌄ acquisitions: Array | | |
| ⌐ ▨ | | |
| acquired_year | Categorical ▼ ▣ ▢ Is Differentially Priv... ◉ 1998 | |
| ⌄ company | | |
| name | Passthrough ▼ ▨ | ◉ Theta Inc. |
| permalink | Passthrough ▼ ▨ | ◉ Theta Inc. |

FIG. 16A

| Collection: companies ▼ | Collection Mode: De-Identify ▼ | View: Single Document ▼ | ← Document 1 of 100 → |

🔍 Search Fields

| Key | Generator | Example Value |
|---|---|---|
| ∨ [0] | | |
| ∨ available_sizes | | |
| ∨ [0] | | |
| [0] | Random Integer ∨  🏛 Min: Max: 10   9 | |
| [1] | Random Integer ∨  🏛 Min: Max: 10   1 | |
| [1] | Passthrough ∨ | assets/images/resized/0004/3400/43400v1-max-1... |
| ∨ [1] | | |
| ∨ [0] | | |
| [0] | Random Integer ∨  🏛 Min: Max: 10   9 | |
| [1] | Random Integer ∨  🏛 Min: Max: 10   1 | |
| [1] | Passthrough ∨ | assets/images/resized/0004/3400/43400v1-max-2... |
| ∨ [2] | | |
| ∨ [0] | | |
| [0] | Random Integer ∨  🏛 Min: Max: 10   9 | |
| [1] | Random Integer ∨  🏛 Min: Max: 10   1 | |
| [1] | Passthrough ∨ | assets/images/resized/0004/3400/43400v1-max-4... |

FIG. 16C

VIRTUAL FOREIGN KEYS

CROSS REFERENCE TO OTHER APPLICATIONS

This application claims priority to U.S. Provisional Patent Application No. 63/291,600 entitled VIRTUAL FOREIGN KEYS filed Dec. 20, 2021 which is incorporated herein by reference for all purposes, and claims priority to U.S. Provisional Patent Application No. 63/336,181 entitled DATABASE SCHEMA DETERMINATION filed Apr. 28, 2022 which is incorporated herein by reference for all purposes.

BACKGROUND OF THE INVENTION

There are various applications for which it is useful for developers and data scientists to be able to generate safe, realistic data by performing data mimicking. For example, being able to model, shape and size data to specific requirements allows for data to be generated that is useful and secure, or allows for pre-production environments that look, act, and feel like production. However, generating such synthetic data can be difficult given the characteristics of underlying data, such as in its configuration, database type, etc.

BRIEF DESCRIPTION OF THE DRAWINGS

Various embodiments of the invention are disclosed in the following detailed description and the accompanying drawings.

FIGS. 3A-3C illustrate embodiments of views of data sources that include various tables of source data.

FIG. 4A illustrates an embodiment of a privacy scan user interface.

FIG. 4B illustrates an embodiment of a privacy user interface.

FIG. 4C illustrates an embodiment of a user interface for requesting to generate data.

FIG. 5A illustrates an embodiment of a subsetting interface.

FIG. 5B illustrates an embodiment of a subsetting interface.

FIG. 5C illustrates an embodiment of a process for configuring subsetting.

FIG. 5D illustrates an embodiment of a subsetting interface.

FIG. 5E illustrates an embodiment of a subsetting interface.

FIG. 7C illustrates an embodiment of an interface for viewing foreign key relationships.

FIGS. 8A-8B illustrates an embodiment of a JSON representation of a virtual foreign key relationship.

FIG. 8C illustrates an embodiment of a JSON representation of a virtual foreign key relationship established for a non-relational database.

FIG. 10 illustrates an embodiment of a collection of JSON documents.

FIG. 11B illustrates an embodiment of a hybrid schema.

FIG. 11C illustrates an embodiment of a hybrid schema.

FIG. 12A illustrates an embodiment of a hybrid schema.

FIG. 12B illustrates an embodiment of a hybrid schema.

FIG. 13 illustrates an embodiment of a saturated hybrid schema.

FIG. 14 illustrates an embodiment of a hybrid document view.

FIG. 15 illustrates an embodiment of a hybrid document view in a user interface.

FIGS. 16A-16C illustrate embodiments of interfaces for applying generators to arrays or array elements.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Embodiments of generating synthetic data are described herein. The ability to synthesize fake data is beneficial in a variety of applications and contexts. As one example, synthetic data may be generated that is both useful and secure for users such as developers and data scientists, providing them tools by which to model, shape, and size data to their specific requirements.

As another example, pre-production environments may be run that appear similar to, or mimic, production environments. For example, realistic test data may be generated based on production data, while preserving relationships and maintaining input-to-output consistency across tables and databases.

As yet another example, synthetic data may be generated to facilitate building of effective machine learning (ML models). For example, neural networks may be used to mirror relationships throughout data, and the synthetic data may be used to train ML models using realistic data.

Figure 1:
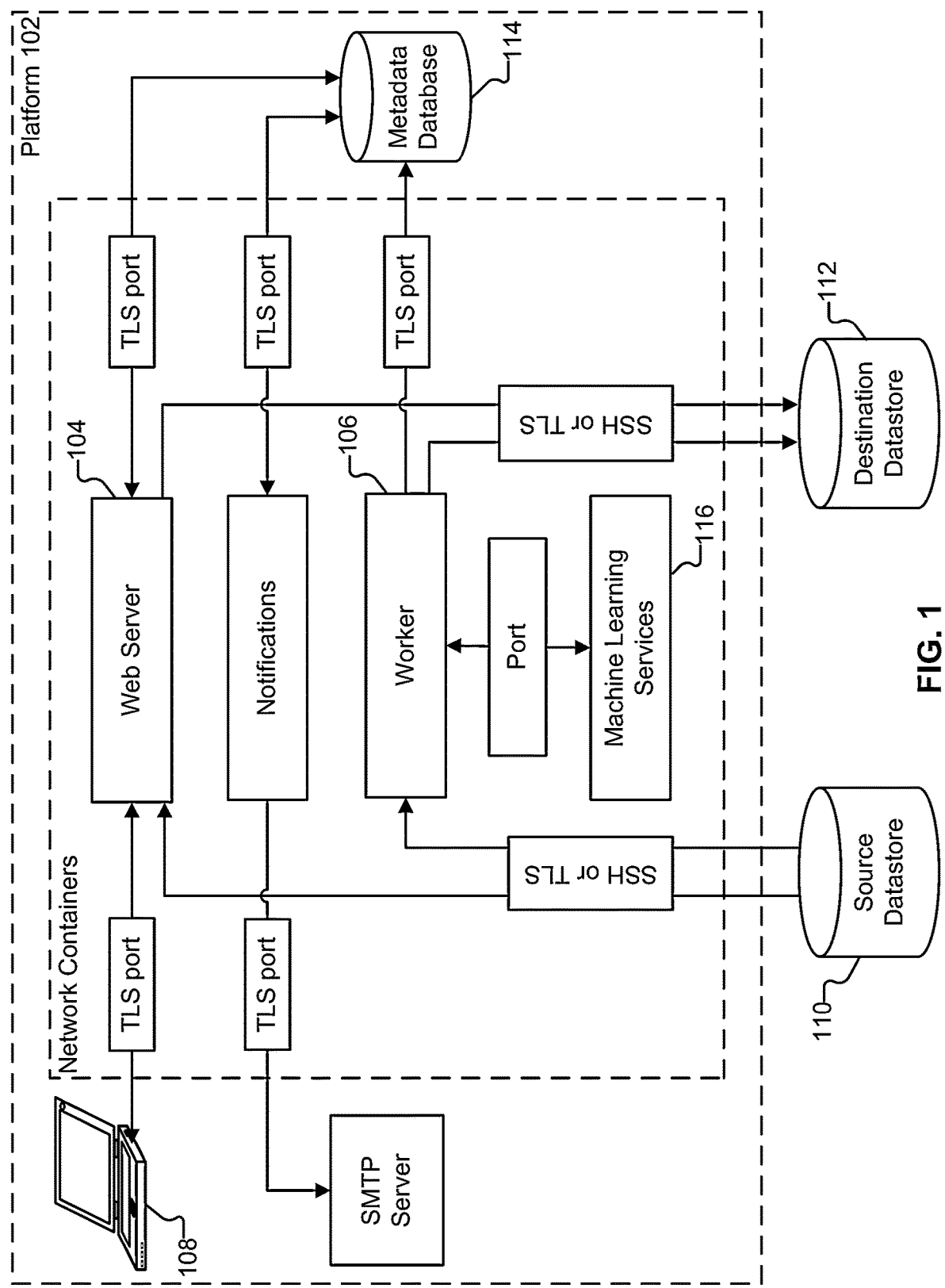
FIG. 1 illustrates an embodiment of a platform for generating synthetic data.

FIG. 1 illustrates an embodiment of a platform for generating synthetic data. In various embodiments, platform 102 is configured to ingest data, process data (e.g., synthesize fake data), provide the synthetic data as output, etc. In some embodiments, the synthetic data generation system is implemented on-premises of an entity utilizing the services and functionality of the synthetic data generation system. For example, the system may be on-premise in a virtual private cloud (VPC). In other embodiments, the synthetic data generation system is hosted by an operating entity, where customers or subscribers of the system access the hosted system.

In this example, the platform includes a web server 104. In some embodiments, the web server is an interaction component that users of the platform communicate with (e.g., via web-based applications installed on their browsers such as on user device 108 that interact with the web server). Via the web server, a user is able to perform configuration of synthetic data generation jobs. For example, the user is able to specify a data store of source data (110) (based upon which synthetic data is to be generated), configure a set of generators to utilize to transform the source data, as well as specify a destination data store (112) to which synthetic data is to be written. The webserver also provides various other types of functionality, such as providing previews to users of synthetic generation jobs. Further details regarding configuration of data synthesis and outputs of the platform are described below.

In some embodiments, when a request is made to perform a synthetic data generation job, the web server communicates with metadata database 114, requesting execution of the job. In this example, platform 102 includes a set of workers such as worker 106. In some embodiments, a worker is configured to execute a requested generation job. Further details regarding job execution are described below.

The following are embodiments of performing synthetic data generation by utilizing the functionality provided by synthetic data generation platform 102.

Configuring a Workspace for Synthetic Data Generation

The following is an example of configuring a workspace for performing synthetic data generation.

Figure 2:
FIG. 2 illustrates an embodiment of a user interface for configuring synthetic data generation.

FIG. 2 illustrates an embodiment of a user interface for configuring synthetic data generation. In this example, a user (referred to as "Alice" in the examples described herein) creates a workspace. In this example, as part of creating a workspace, the user specifies the server or source database (e.g., source database 110) that contains the source data from which fake data similar to the source data is to be synthesized. In this example, the source database is associated with a Postgres database system that is hosted by a party such as Amazon. In this example, a destination (e.g., destination datastore 112) for the synthesized data is also specified. The user may specify the type of database for the destination, as well as the host (e.g., Postgres on Amazon). As one example, suppose that Alice is a developer for a retail e-commerce site. Alice may use this configuration interface to generate a synthetic version of sales data. While examples involving a retail e-commerce site are provided herein for illustrative purposes, the synthetic data generation techniques described herein may be used for any other type of data, as appropriate.

Figure 3B:
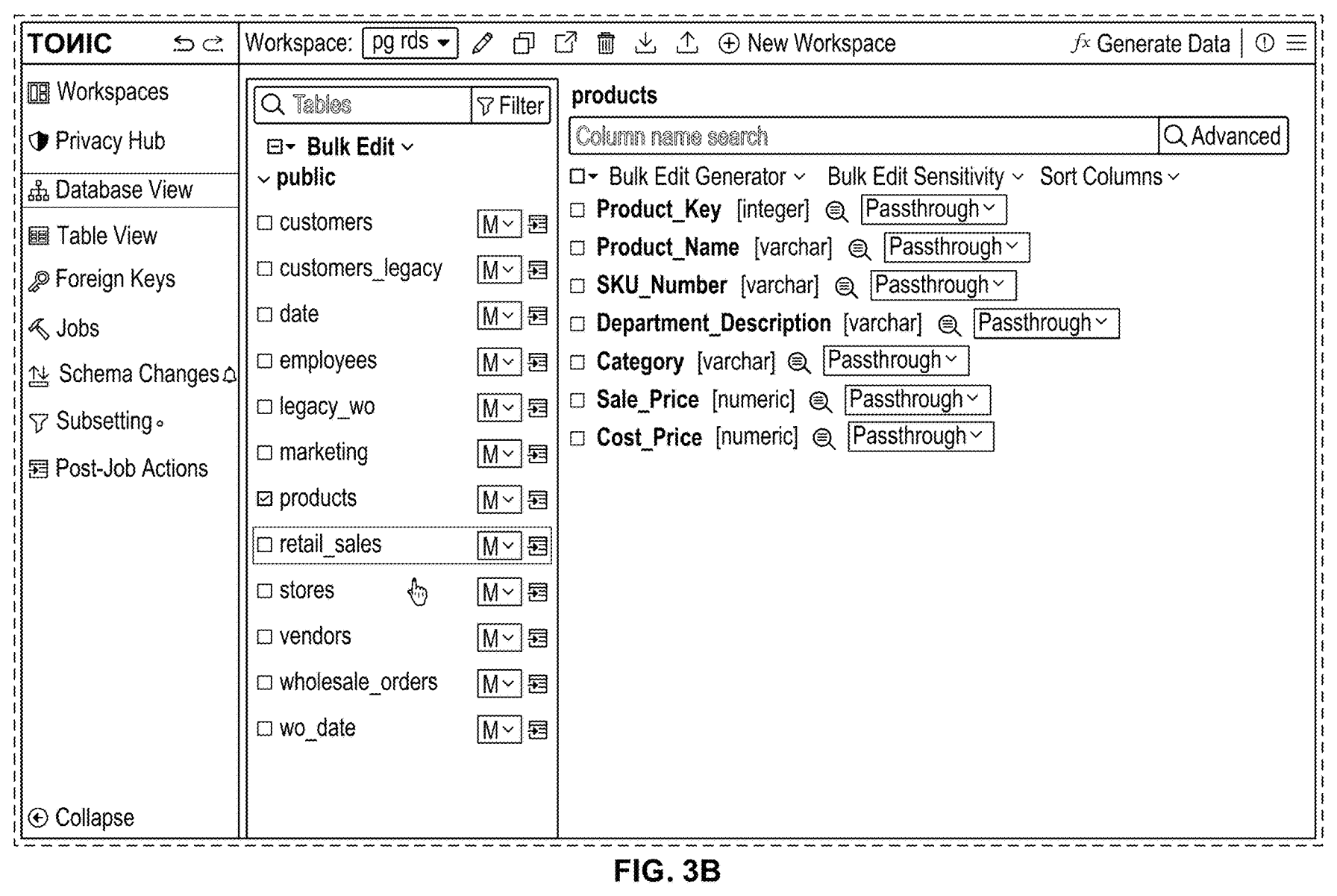
Figure 3C:
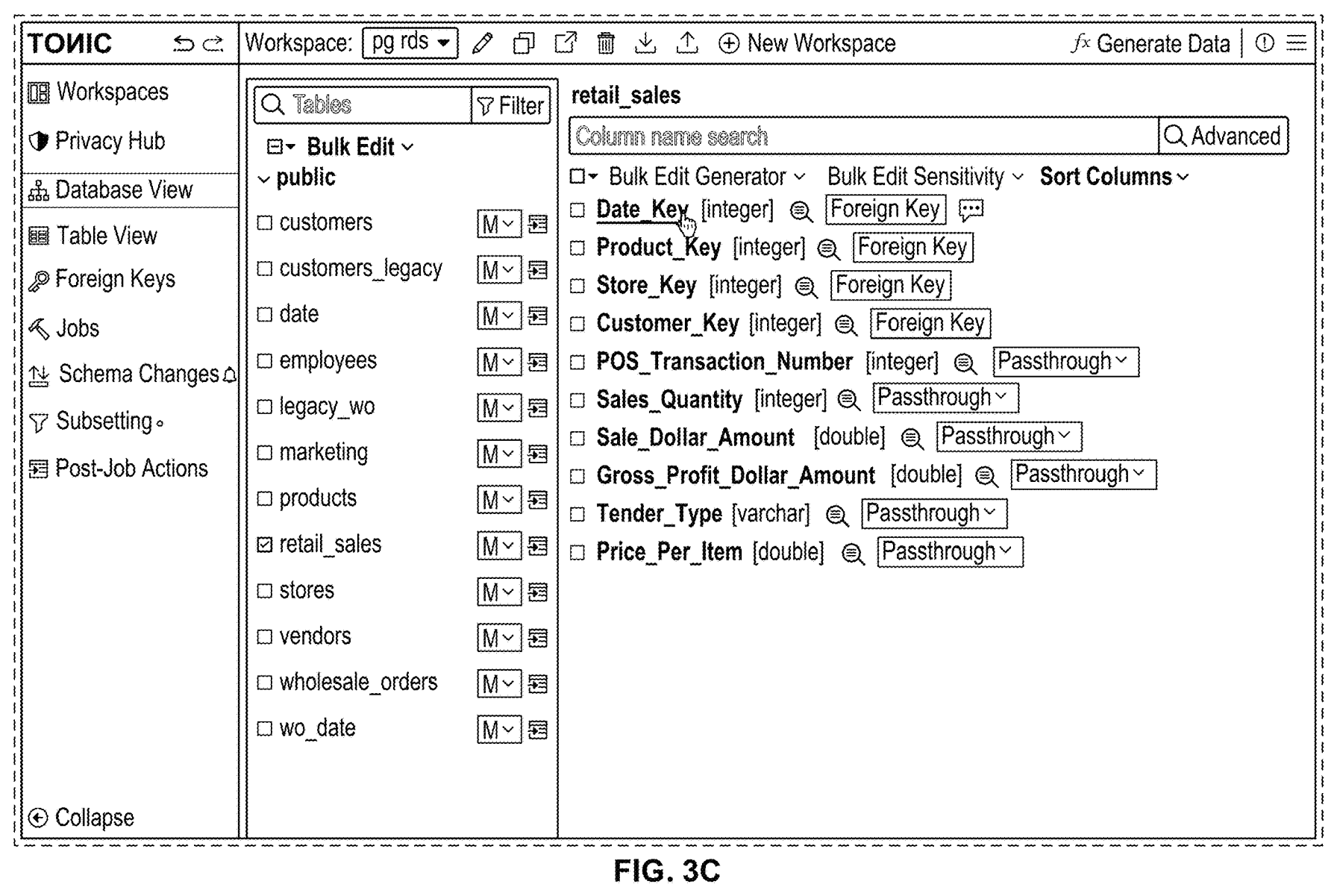

FIGS. 3A-3C illustrate embodiments of views of data sources that include various tables of source data. For example, as shown in the example of FIG. 3A, Alice has provided to the platform databases and data sources that include one or more tables that include information related to the customers of the retail e-commerce site, where their customer tables include various information such as names, genders, email addresses, how long a person has been a customer for, etc. As shown in the example of FIG. 3B, Alice has also provided to the platform databases and data sources that include one or more tables that include information pertaining to one or more products tables, where such products tables include products sold by the retailer. As shown in the example of FIG. 3C, Alice has also provided to the platform databases and data sources that include one or more tables that include information associated with orders and retail sales. For example, the tables include information related to where sales occur, when the sales occurred, that a given product was sold by a certain store to a particular individual, the cost of a product, etc. In some embodiments, the various databases and data sources may be connected (e.g., the customer tables, product tables, and retail sales tables, etc.).

The synthetic data generation platform provides various transformations that a user such as Alice can apply to the source data to generate synthetic data. Such transformations that may be applied are also referred to herein as "generators." Embodiments of various generators that may be configured and executed are described in further detail below.

Table Modes

In this example, the source database includes various tables. In some embodiments, as part of configuring data synthesis, each table is able to be assigned a table mode. In some embodiments, a table mode determines, at a high level, how the table is populated in the destination database. The following are embodiments of table modes.

One example of a table mode is a truncated table mode. In some embodiments, the truncated mode drops all data for a given table in the destination database. In some embodiments, the table schema and any constraints associated with the table are included in the destination database. For example, all of the rows in the table may be removed. This is useful when, for example, a user indicates that a table is not needed in the destination (e.g., is not needed for testing), allowing that table to be removed Another example of a table mode is an incremental mode. In some embodiments, the incremental mode only processes the changes that have happened to a source table since a last time a synthetic data generation job had been run. In some embodiments, a column may be selected for a date updated field. As one example of using incremental mode, suppose that a user has run a job to create synthetic data. Now suppose that a week has passed, and the retail site has new customers. However, the retailer only wishes to perform synthetic data processing on the change or delta. The incremental mode provides such functionality.

Another example of a table mode is a preserve destination mode. In some embodiments, this mode preserves the data in the destination database for a given table. In some embodiments, this mode requires that the destination database already has the same schema. For example, suppose that there is already a table in the destination database, and the retailer would like that table to remain untouched. Preserve destination maintains the indicated table. This allows for a user to, for example, have a staging database where they can place data, where the table to be preserved may be one that is relevant to the configuration of the staging instance. If, for example, the production configuration were copied over into the staging, this may break the staging. Using the preserve destination mode, such a configuration table may be left unchanged.

Another example of a table mode is a masked mode. In some embodiments, in masked mode, when a generator is applied to a column (further details and embodiments of which will be described below), the system replaces the data in that column in the destination database. For example, when using the masked mode, for every row in the input (of the source data), the system outputs a corresponding row in the output (destination).

Another example table mode is a synthesized mode. In some embodiments, using the synthesized mode, the system generates an arbitrary number of new rows, as specified by the user, using the generators selected for a given table. In some embodiments, via the user interface, the user may enter the number of desired new rows. Using the synthesized mode allows a user to create an arbitrary number of rows. In various embodiments, in synthesized mode, the system generates synthetic data based on dictionaries and statistical relationships between and among the source data.

The synthesized mode is beneficial for applications such as scale testing, where users may change the scale of their test data (e.g., data in the destination database of synthetic data) in any way, shape, or form.

In some embodiments, the synthesize mode leverages virtual foreign keys. Further details regarding virtual foreign keys are described below.

Consider the following example of a synthesized mode of operation. Suppose that a source customer table has a thousand customers. Suppose a user would like to use synthetic mode to generate a synthetic test data set that includes a million customers. The customer table may be linked to many other tables. Thus, scaling the customer table has implications on the rest of the destination database.

For example, suppose that a source retail sales table has a customer key. In this example, the customer key is the identifier (ID) of the customer. In some embodiments, when generating a large volume of synthetic fake customers, the system also generates additional fake sales as well. In some embodiments, the synthesis mode attempts to match up the different scales of the different tables, and attempts to preserve relative distributions in the scaled destination database.

For example, suppose that there is a customer table in the source database. The user would like to expand it to double the size, but keep the sales table the same size. In this case, while the system is configured to keep the destination sales table the same size, the system reflects, in the data, the fact that there are some customers that buy more things, and some customers that buy fewer things. Here, as one example, every customer receives fewer sales, while still preserving that there are "whales" in the database.

The reverse of the above may also be true. For example, if the user were to halve the customer table, but the retail sales were kept the same size, then the system may cause the "whales" to be "super whales," where the customers that purchase a few items are synthesized to purchase several more items.

In some embodiments, the system, in synthesis mode, attempts to maintain a similar shape of distributions, given a change in amplitude. In some embodiments, virtual foreign keys (described in further detail below) are used to define the relationship between various tables (e.g., between the retail sales table and the customer table). The use of virtual foreign keys allows the shape of the distributions to be maintained.

Privacy Scan

As described above, one beneficial application of the synthetic data generation techniques described herein is to protect privacy. For example, using the synthetic data generation techniques described herein, data may be de-identified, allowing personally identifiable information (PII) or Protected health Information (PHI) to be kept out of lower environments. In some embodiments, the synthetic data generation platform is configured to perform automated sensitive data detection and discovery by performing a privacy scan. Via such a privacy hub, a user can identify and protect sensitive data. In this example, suppose that Alice decides to run a privacy scan. In some embodiments, a privacy scan is performed by the platform to evaluate data sources, such as source databases, and identify potential areas where personally identifiable information (PII) and other known private data exists.

FIG. 4A illustrates an embodiment of a privacy scan user interface. In the example of FIG. 4A, the platform has identified 21 different places in the source data where there is unprotected data. Identified unprotected columns are shown at 402. The type of PII that has been detected for the identified unprotected columns is shown at 404.

As shown in this example, based on the privacy scan, the platform recommends or suggests, for identified unprotected data, generators to apply. Examples of such generators are shown at 406. Different generators may be suggested for different types of columns in the source datastore. Examples of generators include email generators, random timestamp generators, name generators, categorical generators, address generators, etc. Further details regarding generators are described below.

FIG. 4B illustrates an embodiment of a privacy user interface. Using this example interface, unprotected fields may be viewed, and actions may be taken to protect them. In the example of FIG. 4B, suppose that Alice would like to view further information about one of the identified unprotected columns, and, in this example, as shown at 412, selects the magnifying glass icon next to a "First_Name" column to view a portion of the original source data.

In this example, Alice would like to perform name masking to hide real names and remove PII. To do so, Alice selects, at 414, to execute the suggested "Name Generator."

Figure 4C:
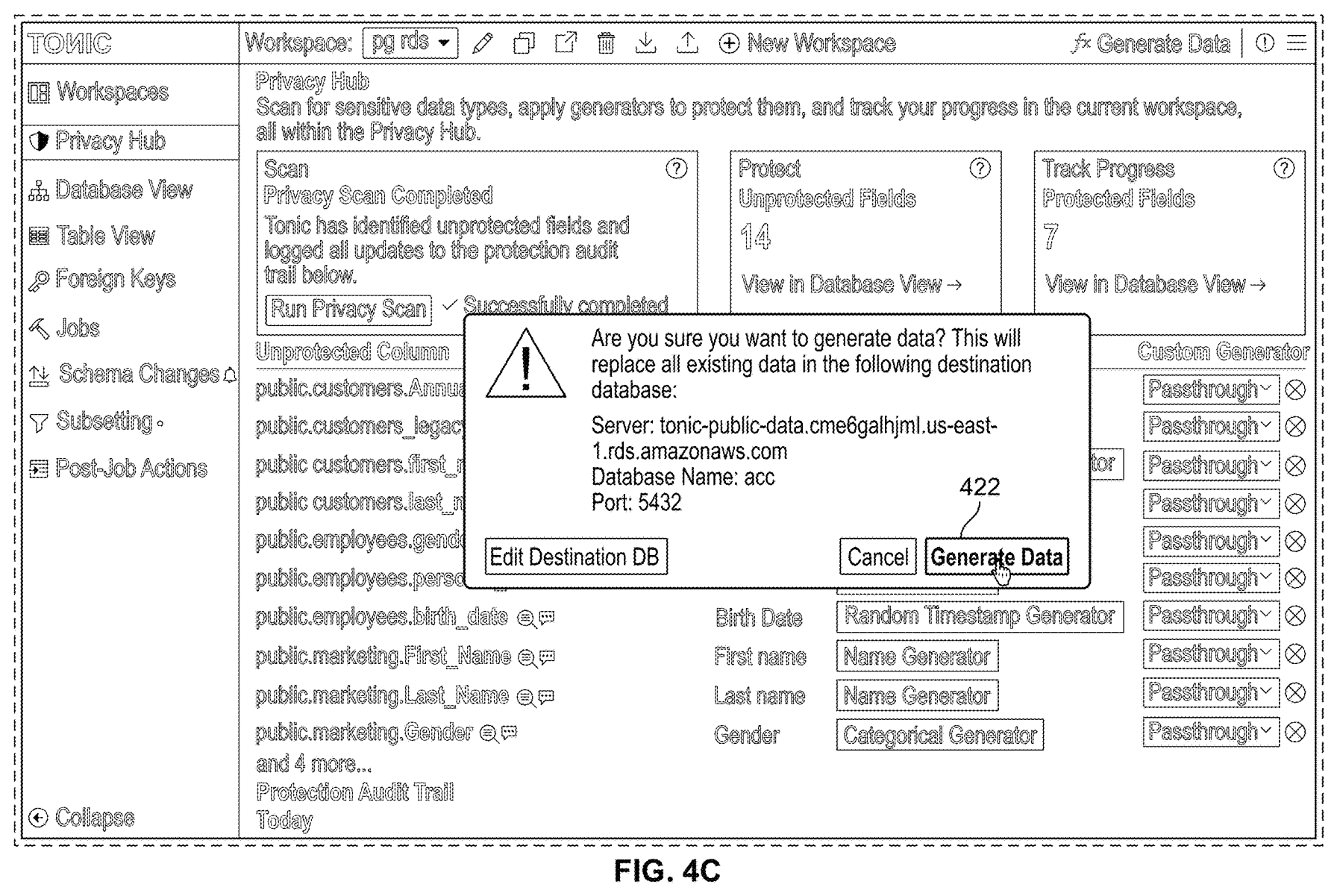

FIG. 4C illustrates an embodiment of a user interface for requesting to generate data. In this example, after Alice selects to execute the name generator, a prompt is shown, requesting Alice to verify her request to execute the name generator. Alice may then confirm her request to generate data (by applying the name generator, for example), by clicking on user input element 422. A generation job is then started in response.

In some embodiments, the name generator is configured to return a random name that is unrelated to the original value. This provides privacy. Further details regarding the name generator are described below. In this example, when the user selects to execute the name generator, the metadata database 114 is notified, and a worker (e.g., worker 106) is provisioned to execute the name generator transformation on the source data first names, the output of which is written to a specified destination data store (e.g., in destination datastore 112). Further details regarding execution of generators are described below.

In some embodiments, after resolution of the PII, the count of unprotected fields is decremented, and the count of protected fields is incremented. A summary view of details of the job may also be provided to the user. For example, the platform is configured to provide a summary view of the job, including its status, the steps in the job performed, etc.

In some embodiments, the platform also provides an option in the user interface (e.g., toggle) to preview changes between the source and the destination database (e.g., to show before and after application of processing).

In this privacy preserving example, a name generator was applied. A name generator is but one example of a generator or transformation that platform 102 provides. Further details regarding the name generator, as well as other generators are described below.

Synthetic Data Generators

The following are various embodiments of generators provided or supported by platform 102. In various embodiments, generators are configured to insert or generate fake or synthesized data. In some embodiments, a generator has a set of (configurable) properties, including the following:

- Consistency: In some embodiments, consistency is an option for some generators that when turned on, maps the same input to the same output across an entire database. Further details regarding consistency are described below.
- Linking: In some embodiments, the linking option for a generator allows multiple columns to use a single generator. For example, linking may be used when columns share a strong interdependency or correlation. By linking columns, an indication is provided to the platform that the columns are related to each other, and that the platform should take this relationship into account when it generates new data.
- Differential Privacy: In some embodiments, differential privacy is an example of a technique used by the platform to ensure the privacy of data. In some embodiments, differential privacy limits the effect of a single source record or user on the destination data. For example, someone who views the output of a process that has differential privacy is unable to determine whether a particular individual's information was used to generate that output. Data that is protected by a process with differential privacy is unable to be reverse engineered, re-identified, or otherwise compromised.

Some types of generators automatically have differential privacy. For example, a generator that does not use the underlying data at all is considered "data free", and automatically has differential privacy. For other types of generators, differential privacy is configurable.

Further details regarding differential privacy are described below.

- Data-free: In some embodiments, a generator that does not use the underlying data at all is considered "data-free." For some generators, this is a configurable option (e.g., may be enabled or disabled), where the generated synthetic data may be generated (or not generated) as a function of the source underlying data.

As will be described in further detail below, platform 102 supports various types of generators. A selection of generators supported by platform 102 is described below for illustrative purposes, and is not exhaustive. Other types of generators may be supported by platform 102.

Name Generator

In some embodiments, a name generator is configured to generate a random name string. For example, synthetic names are generated based on dictionaries of data that are provided. As one example, a first name generator is included with the system and may be used to convert real names to synthetic names. Similarly, the system may include a last name generator that includes a library of last names that may be used to replace real last names in a data store. In some embodiments, the first and last name generators are preconfigured, and synthetic names are generated from a dictionary of fake names. Various dictionaries may be provided for different languages, cultures, etc.

A name generator is an example of a type of generator that performs masking. Other types of masking generators are supported by platform 102, such as those usable to mask PII such as IP (Internet Protocol) addresses, email addresses, etc.

Categorical Generator

In some embodiments, a categorical generator is configured to create values at the same frequency and using the same values as the underlying data. For example, the categorical generator is configured to shuffle existing values within a field (or values of a column) while preserving the overall frequency or shape or distribution of the values. In some embodiments, the categorical generator maintains the values and value frequency. The categorical generator is an example of a type of generator that is based on the statistics of the source data from which the synthetic data is generated. Categorical generators may be configured to be based on an analysis of any number of linked columns so that generated synthetic data is created according to the statistics or characteristics of the source data.

One example of such a generator is a categorical generator that is filtered by gender. In some embodiments, such a categorical generator is configured to measure the distribution of the frequency of genders such as male and female in a source database. From this analysis, new synthetic data may be generated that fits the measured frequency. For example, if the input source data includes 70% male and 30% female, then the output synthetic data also includes 70% male and 30% female. The gender categorical generator is one example of a generator that is based on performing an exploration of underlying data before producing synthetic data. That is, characteristics of the source data are learned to determine how to generate new synthetic data that is similar.

Various generators may be applied and configured on multiple sets of columns to produce synthetic data with desired characteristics. As described above, in some embodiments, the platform includes a name generator that is to create first names from a dictionary. In some cases, users of the platform may desire for first names to be more representative of the actual data that they have in their database. For example, rather than using a dictionary of names, which might not encompass the totality of names that are encountered in the source database, categorical generators may be used. By using a categorical generator, the generator learns, from the underlying data, what synthetic data should be placed in a given field.

Furthermore, in some embodiments, linking may be performed. For example, a user may select the option to perform linking, which in some embodiments indicates to the platform that there is a relationship between or among a set of columns. For example, the first name column may be related to the gender column. Based on the linking, the generator will then create synthetic data according to the underlying actual source data (and that is more reflective of the source data). In this way, the test or synthetic data that is created generally aligns the names with the genders in a manner similar to what is in the source data set (where, for example, what synthetic name is generated is also based on gender frequency measures or other statistics). That is, certain characteristics in the underlying source data may be reproduced in the synthetic data set.

Event Timestamps Generator

In some embodiments, the platform supports an event timestamps generator. In some embodiments, the event timestamps generator is configured to generate timestamps fitting an event distribution. In some embodiments, the event generator is configured to create synthetic dates that are in sequences similar to the input data. In some embodiments, the event generator is configured to examine patterns of inter-event arrival times or deltas between events, such as dates of birth, when a person becomes a customer, when a customer's last transaction occurred, etc., and recreate synthetic data that fits the observed patterns.

Smart-Linking Generator

In some embodiments, the platform supports a smart-linking generator. For example, as described above, users may manually indicate links or relationships between columns. In some embodiments, the statistically-based smart linking generator is configured to automatically determine linking among columns so that manual linking need not be performed. This provides an improvement, as users may not know themselves all of the relationship between the data. In some embodiments, the smart linking generator is configured to determine the relationships between and among the data. For example, the smart linking generator may be used to determine whether an occupation of a retail customer in the source data impacts whether or not a customer is a member of a store. In some embodiments, the smart linking generator uses statistical techniques such as neural networks. As one example, a variational autoencoder is used. Other statistical techniques may be used.

Executing a Synthesis Job

The following are embodiments of executing a generation job. For example, suppose that Alice selects a generator to apply (e.g., via the example interface shown in FIG. 4B). This request is sent to the platform via the webserver, where it is used to create a job in the metadata database 114. The job is then executed in order to apply, according to the selected generator, a transformation on the source data.

For example, returning to the example of FIG. 1, the platform 102 further includes worker 106. In some embodiments, the worker is configured to run generation jobs. For example, a user (e.g., using device 108) configures a generation job for generating synthetic data. This includes, for example, specifying a source data store whose data is to be transformed. The configuration of the generation job further includes specifying generators to apply to the source data. In some embodiments, the generators are specified to assign transformations to the source data, where the generators transform the data in the source datastore. In this example, the platform provides a variety of generators that are suitable for handling different types of data. One example of a generator is one that performs masking of the source data (e.g., for privacy purposes). Embodiments of various types of generators and their configuration are described herein. In some embodiments, the worker is implemented as a container (e.g., in Docker or Kubernetes). In some embodiments, the container is Linux, with .NET as a runtime. In some embodiments, the container has a multi-threaded process.

The following are embodiments of execution of generator transformations by a worker. In some embodiments, the output data that is generated is related to the source data, where the output data is dependent on, or correlated with, the input data (but need not be in some contexts). Depending on the type of generator being applied, the output synthetic data may be related to the input source data in a variety of ways. As one example, consider a categorical generator. In some embodiments, as described above, a categorical generator is configured to create values at the same frequency as the values in the underlying source data. In this case, in order for the generator to perform its generation, the worker executing the generator is configured to collect statistics about the underlying source data, so that the frequency of the created values mimics the same frequency as the values in the underlying source data. For example, the categorical generator is configured to examine the distribution of the source data and then use the results of the examination to create new synthetic data. As shown in this example, the worker is configured to collect data from the source database. That data is used to inform how the worker places data into the destination database.

The following are embodiments of execution of a generator by a worker. In this example, for illustrative purposes, the source data includes data stored in a relational database. This includes a data store with multiple tables, where each table includes columns and rows of data. The data is stored according to a schema. In various embodiments, the synthetic data generation techniques described herein may be variously adapted to accommodate other types of data stores, such as non-relational databases. Further details regarding operating on unstructured or schema-less data (e.g., MongoDB storage) are described in further detail below.

In this example, an embodiment of generator processing when in masking mode is described. In this example, an input source database and output destination database will have the same tables. In this example, the worker is configured to loop through each table of the source database. The tables may be evaluated in parallel. Example pseudocode for performing masking is described below. In some embodiments, the generator is executed by a worker such as worker 106.

```
For Table: //Masking
   1) Collect Statistics
   2) Loops over every row
   3) Reads row
   4) Processes row
   5) Writes row
```

In the example above, for a table, the worker performs, executes, or otherwise runs a two-step process. In some embodiments, in the first step, statistics are collected. Further details regarding collecting of statistics are described below. After statistics are collected, the worker loops over every row. For each row, the worker reads the row, processes the row, and writes the row. The example process shown above relates to an embodiment of a setup for masking.

If synthesis of new data were to be performed, rather than reading a row, a row is generated, as indicated in the comments in the example pseudocode below. For example, in mask mode, the worker reads one row at a time from the input database and creates that as an output row after modification (as performed during the process row step). In contrast, in synthesis mode, as shown in the example pseudocode below, fakes rows are generated (that are not generated based on a corresponding row in the input database), where processing of the rows and writing of the rows is then performed.

For Table:
1) Collect Statistics
2) Loops over every row
3) Generate a row
4) Processes row
5) Writes row In some embodiments, the steps in the second phase of the "for" loop are performed in a pipeline manner. That is, for example, while a row is being processed, the next row is being read or generated in parallel.

As shown in the above example pseudocode, the workers perform a two-phase process, with the first phase including collecting statistics, and the second phase including generating synthetic data. In some embodiments, the first phase of the process of collecting statistics includes training various machine learning models such as neural nets. The models may be for categorical generators, smart linking generators, continuous generators, etc., further details of which will be described below. The models may be trained to collect representative data before producing data. The process may also be adapted to perform subsetting in various embodiments, further details of which will also be described below.

In some embodiments, the worker and its processing are coordinated through a metadata database, such as metadata database 114 of platform 102.

In this example, the metadata database 114 communicates with webserver 104. In some embodiments, when a request is made to perform a synthetic data generation job, the web server sends a notification to the metadata database requesting for an available worker to perform a job. While a single worker is shown in the example of FIG. 1 for illustrative purposes, the system may include multiple workers that are performing jobs that have been placed on the metadata database (e.g., as users click "generate" via a user interface, or as an automated system submits "generate" requests).

In some embodiments, telemetry data from deployments of the synthetic data generation system is collected and provided to an entity (e.g., to report logs, bugs, etc.).

Collecting Statistics

The following are further details and embodiments regarding collecting statistics (e.g., first phase of the example pseudocode described above).

In some embodiments, the generators, when being executed, publish the information they will collect. Some generators will not collect anything (e.g., a name generator may not need to collect statistics). However, in some embodiments, other generators, such as categorical smart linking, do operate based on collected statistics. That is, in some embodiments, each generator publishes desired collected statistics, and the worker is configured to collect the desired statistics.

In some embodiments, the worker collects statistics by generating queries against a database to collect the desired statistics. In some embodiments, the queries are generated based on the specified statistics published by a generator. For example, the worker queries the database to perform group-bys, averages, etc. in order to collect the desired statistics indicated by a particular generator.

The manner in which the worker collects statistics may vary depending on the input source database. For example, the worker will collect statistics differently if the input data source is MongoDB versus Postgres.

The processing described herein may be adapted for other types of databases such as those implemented using a distributed infrastructure such as Apache Spark.

For example, in a database such as an Oracle database, the worker accesses source data, loops through the rows and performs various processing as described in the example pseudocode above, where the output is then placed in the destination database.

In a cluster infrastructure such as Spark, there may be numerous nodes that are responsible for processing data. In some embodiments, the worker is configured to instruct the distributed compute nodes to perform the processing described above. That is, in the example of an Oracle data store, the processing happens within the worker (e.g., by the worker performing queries against the data store). In contrast, in some embodiments, in infrastructures such as Spark, Redshift, or Snowflake, the actual processing of the data occurs in a cluster outside of the synthetic data generation platform. For example, in some embodiments, the synthetic data generation platform inserts code into each of the cluster workers to be executed, where the code to read rows, process rows, and write rows occurs inside the distributed infrastructure. This avoids having a single worker having to manage processing of data from very large distributed systems. Rather, as described in the examples above, in some embodiments, the work is offloaded, where the worker in the synthetic data generation platform directs the work being offloaded to the cluster workers/nodes.

As shown in the above examples, the processing described in the example pseudocode above may be adapted to the type of database infrastructure being used to support the input source data.

The following are further details and embodiments of collecting statistics. In various embodiments, different generators may perform different types of statistics collection. For example, the statistics needed or used by a categorical generator may be different than what a smart linking generator needs.

The following are examples and embodiments of statistics collection for a smart linking generator, which in some embodiments includes a superset of the processing steps and infrastructure that are performed/used across different types of generators.

In some embodiments, the generator uses machine learning (ML) services, such as machine learning services 116 of platform 102. As one example, the machine learning service is implemented as a Docker container with a Python web server running within the container. In some embodiments, the smart linking generator is configured to, during the statistics collection phase, collect a variety of high-level statistics around the data underlying the input database, as well as collect a block of example rows that will be used to train a machine learning model. Examples of high-level statistics include mean, standard deviation, etc.

In some embodiments, the machine learning service uses the block of example rows to train a model. In some embodiments, after training, the machine learning service sends back the weights of a trained model to the worker.

In some embodiments, the worker is then configured to execute code, such as .NET code, to read the weights. In some embodiments, the weights are provided in a format that is available for representing weights in a neural net. In some embodiments, the worker is configured to take the weights and convert the weights into a live model. The live model may then be used to generate synthetic data according to the parameters of the generator. Other generators may perform a portion of the steps. For example, the categorical generator may focus on the first step of collecting high level statistics. Other generators may utilize sample rows.

Differential Privacy Processing

As described above, in some embodiments, generators may be configured to enable performing of differential privacy processing. In some embodiments, differential privacy processing is performed before example rows are sent to the machine learning service in order to modify the high-level statistics and example rows to ensure that private information is not revealed. Differential privacy processing may also be performed after the example rows are sent to the machine learning service, and prior to weights of a trained model being sent back to the worker.

For example, differential privacy techniques may be incorporated in the machine learning process. For example, a differentially private gradient descent algorithm may be used to train a neural net.

Various types of generators, when executing, may execute differential privacy processing. For example, a categorical generator may collect high level statistics and also perform differential privacy processing.

Machine Learning

The following are further examples and embodiments of processing performed by the machine learning service such as machine learning services 116 of platform 102 of FIG. 1. As one example, data is pre-processed to, for example, normalize the data. As one example, suppose that the input data is GPS (Global Positioning System) data. In some embodiments, GPS coordinates are converted or re-encoded to be between a range of values such as between −90 and +90, or −180 and +180. As another example, a geohash may be used, where in some embodiments the geo-hashing results in a string of characters that represent a location at various hierarchical levels of granularity (e.g., depending on the length of the geohash). In some embodiments, latitude and longitude coordinates are encoded as a geohash. In some embodiments, to generate synthetic coordinate data, a neural network such as a recurrent neural network (RNN) is used on location data. In some embodiments, features or geohashes are extracted from coordinate location data.

As another example, in some embodiments, time is renormalized. For example, time data is renormalized to be between a range such as between −1 and +1. For example, if the input data has dates spanning from Jan. 1, 1950 to Jan. 1, 2020, then Jan. 1, 1950 may be normalized to become −1, and Jan. 1, 2020 normalized to become +1.

In some embodiments, the normalized input data is then used to create more synthetic data that is similar to the original data. Another example of normalization includes one-hot encoding categorical data in order to handle categorical data with neural nets. In some embodiments, after performing such normalizations, the normalized data is then fed to a machine learning model such as a neural net (e.g., a variational autoencoder). For example, after a variational autoencoder has been trained, the trained autoencoder may be used to generate synthetic data that is similar to the data on which it was trained. For example, random noise may be fed as input to the trained input to generate output synthetic data.

Consistency

As described above, in some embodiments, generators may be made consistent. In some embodiments, consistency is an option for some generators that when turned on, maps the same input to the same output across an entire database.

The following is an example of applying consistency to a generator. Consider a customer legacy table. In this example, suppose that a customer with customer key 986 was called David. With the consistency-on function, the system may be instructed such that every time the system encounters the first name David, that name is mapped to Lynna. For example, if there are any other Davids in this database, their names will become Lynna.

The consistent-on functionality may be further extended, where the user may specify that they would like to be consistent with some other data. For example, the user may indicate that the generator should be further consistent on the customer key.

By doing so, now, whenever the system encounters customer 986, the name will be something unique, (e.g., Darrell in this example). This has various benefits. For example, if every instance of David were mapped to Lynna, this may be a security hole that is susceptible to a frequency attack. For example, in a frequency attack, by knowing the distribution of the frequency of the number of Davids in the United States, a nefarious entity may determine, based on the frequency of Lynnas, that all Lynnas are actually Davids, because they have the same frequency in the dataset.

Being consistent on another field such as customer keys, which are typically unique, nullifies such frequency attacks. As customer keys typically are not public, an attacker would not be able to use public data to try to glean what the frequency of a given name should be. Thus, the consistency-on functionality provided by the system described herein provides various security benefits.

Another benefit of the consistency-on functionality is that when a user is synthesizing data, they may not have a fixed starting point. When synthesizing data, fake data is created from whole cloth, and by being able to synthesize that Darrell is customer key 986 allows for having two completely different databases. For example, when the two databases come up and a name is needed for customer key 986, the system will independently determine that two instances of the same customer key that appear in two different databases should relate to the same customer name. This is useful, as operators utilizing the services of the system may have more than one database. Using consistent on with synthesis allows a consistent test data set to be generated such that no matter what database is looked at, the customer 986 is always associated with the same name (e.g., Darrell in this example).

In addition to providing and supporting generators for masking and generating synthetic data, platform 102 also provides various other types of processing, examples of which are described below.

Subsetting

In some embodiments, platform 102 is configured to perform subsetting. In some embodiments, subsetting includes generating a representative sample of the source data in a manner that maintains referential integrity. In this way, coherent slices of data across database of different types may be created. This allows users to, for example, work with only the data they need, to minimize risk and execute with focus.

In some embodiments, subsetting includes taking out a logical slice of the source database. For example, using subsetting, a user may extract, for example, 10% of a customer's table (because the user would like to target 10% of the customer table). When the system extracts 10% of the customers table, this will have an impact on what is extracted from other tables related to the customer table (e.g., retail sales table) as well.

FIG. 5A illustrates an embodiment of a subsetting interface. Referring to the example of FIG. 5A, estimates or previews of the subset may be viewed. Suppose that there were approximately 2,000 customers. After taking approximately 10% of the customers, there were 172 customers left.

In this example, a percentage of the retail sales table was taken because they included the purchases that those customers made. This in turn impacted the products that were included in the logical slice/subset. For example, while only 10% of the sales was extracted, a large percentage of the products table may have been extracted, because 10% of the sales may encompass a large quantity of products (where there are only 2500 products in this example). In this example, the subsetting is configured to begin from the starting point (e.g., the customer table), and then proceed from there, expanding into different parts of the source database by following foreign keys (either previously existing or virtual foreign keys that are added).

FIG. 5B illustrates an embodiment of a subsetting interface. An example of a step-by step reenactment of the subsetting processing performed by the system is shown in the example of FIG. 5B. In the example of FIG. 5B, the subsetting process started with the customer's table, and extracted 172 customers. The subsetting process then scanned the retail sales table and determined, given these customers, which sales records/rows to take/extract. The sub setting process then evaluated the stores table, the sales table, etc. to identify further places from which additional data should be collected from.

Figure 5C:
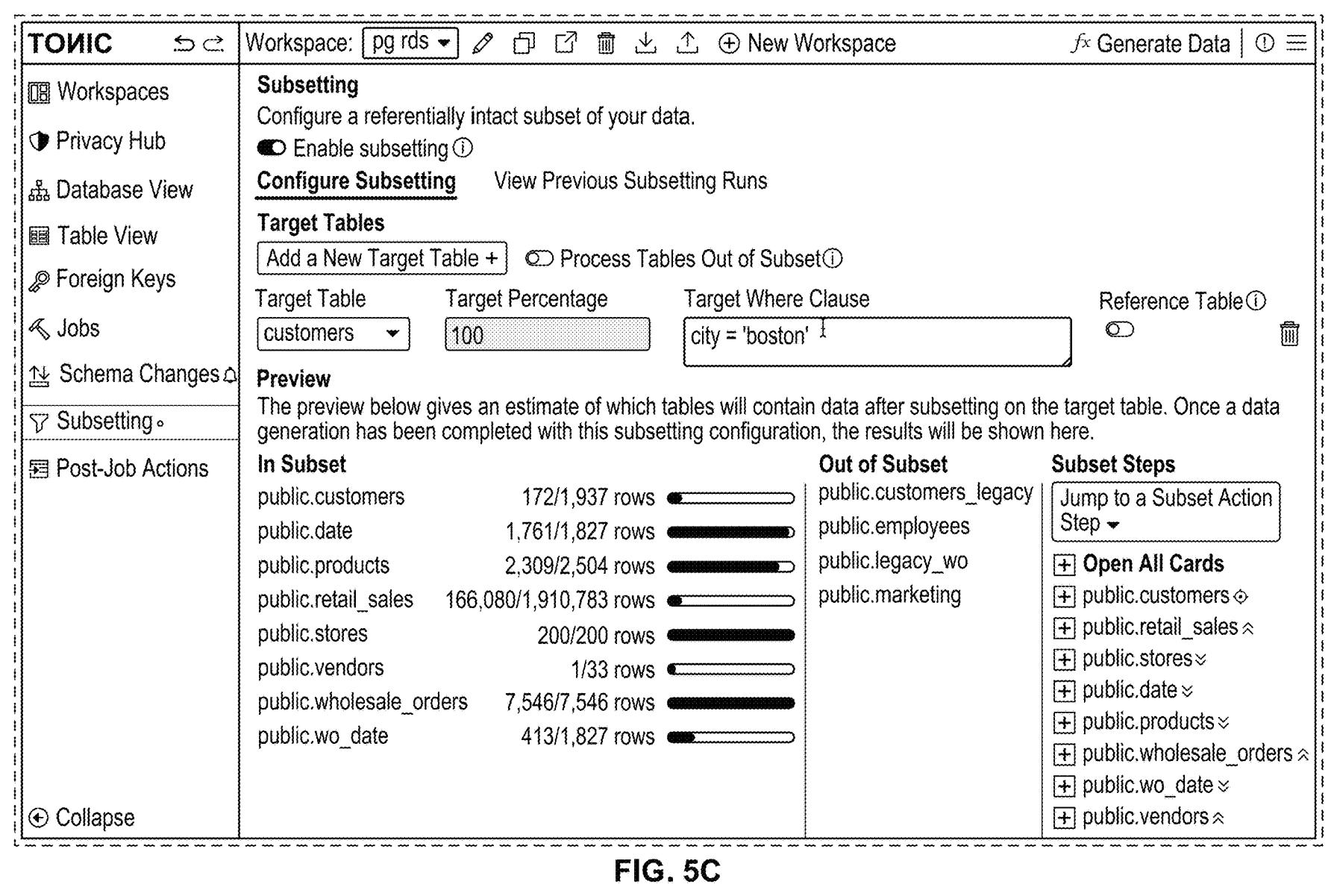
Figure 5D:
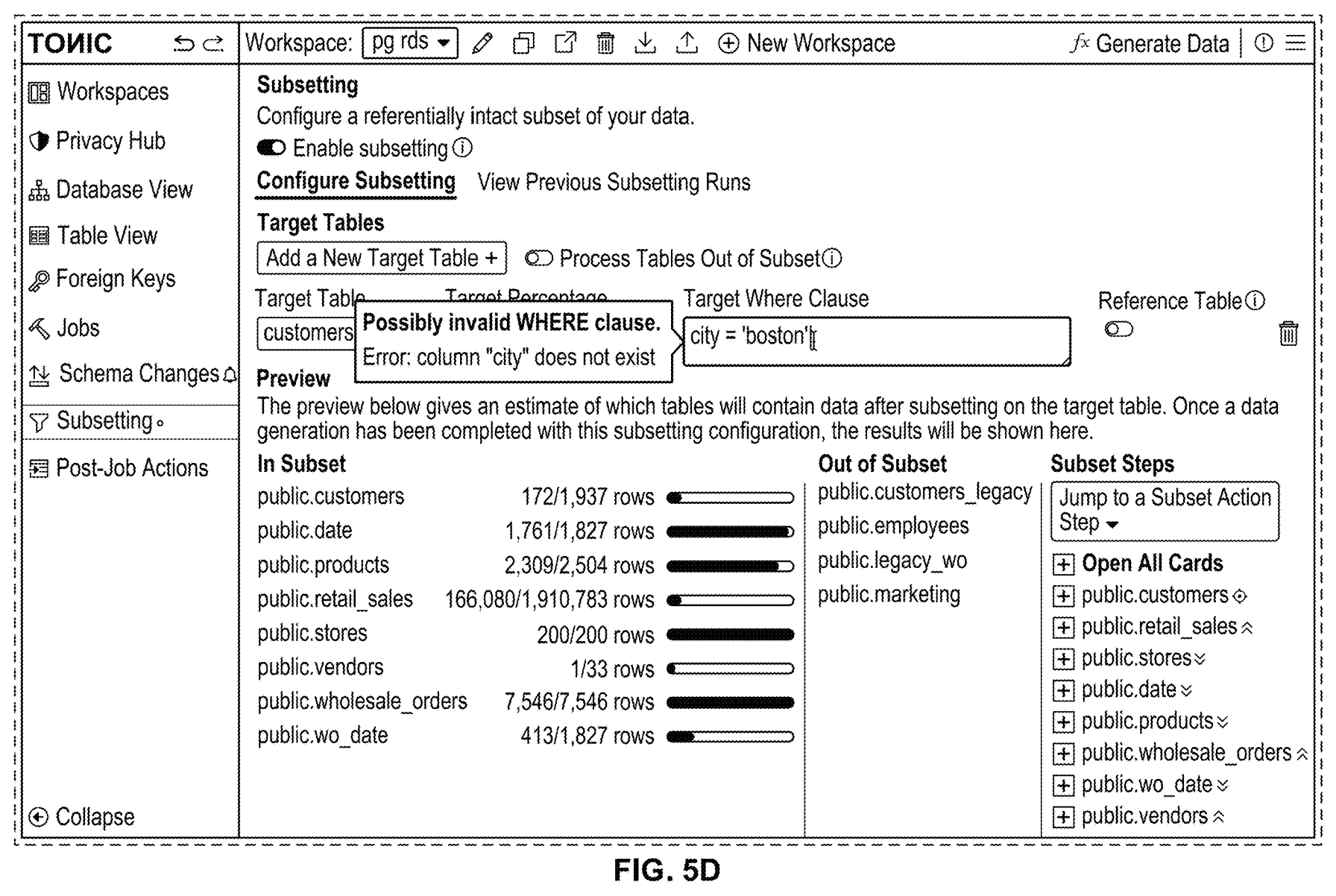

FIG. 5C illustrates an embodiment of a process for configuring subsetting. In this example, the user (e.g., Alice) specifies what their target table will be, as well as the desired percentage. The user may further enter filter criteria, such as city='boston' as shown in this example. In some embodiments, the system performs validation of the filter criteria. For example, if the filter criteria does not match to a real column, the system may flag this in the user interface, indicating that there is possibly an invalid WHERE clause. The system may also indicate the nature of the error (e.g., that a column with the name entered in the filter criteria does not exist). FIG. 5D illustrates an embodiment of a subsetting interface. An example of such an invalidity notification is shown in the example of FIG. 5D.

FIG. 5E illustrates an embodiment of a subsetting interface. The subsetting need not be limited to a single target table. For example, multiple target tables may be specified, as shown in the example interface of FIG. 5E. In this example, Alice may specify the customer table as well as the data table, where in this example, a filter may be further placed to define a period of interest. For example, Alice may target subsetting for 10% of customers, where all sales happened on Christmas day.

In some embodiments, virtual foreign keys are used when performing subsetting, as the virtual foreign keys may be used to indicate what products a customer bought. Further details regarding virtual foreign keys are described below.

The following are examples of how the above-mentioned process for generating synthetic data performed by a worker is adapted for subsetting. In this example, performing sub setting includes determining a traversal order of the tables so that as the worker goes through the tables, needed data is collected, based on the tables that the worker has already encountered. This may include revisiting a table due to other tables that have been examined in the past.

Figure 6A:
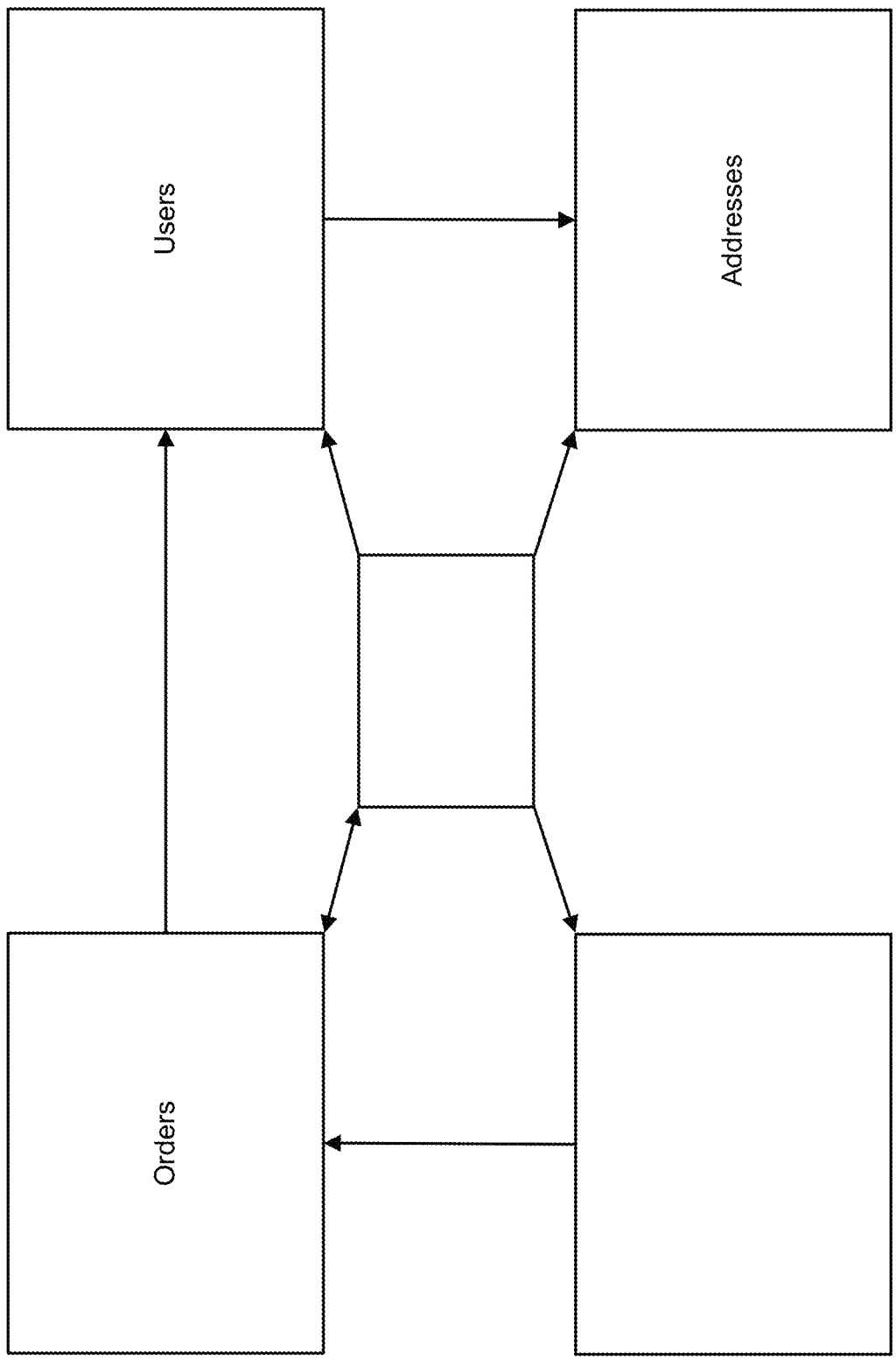
FIG. 6A illustrates an embodiment of a set of tables.

FIG. 6A illustrates an embodiment of a set of tables. Suppose the set of tables shown in the example of FIG. 6A. The tables may be of various sizes with certain foreign key relationships. In some embodiments, performing subsetting includes determining an order to visit the tables in order to satisfy a number of requirements.

In some embodiments, performing subsetting includes collecting a set of logically consistent data that represents the input database, and that a user such as Alice would recognize as a slice of the database. For example, when collecting customers, this may include also collecting their orders and other relevant information. For example, suppose a user table and an address table. Each user has two addresses, a billing address and a mailing address. In some embodiments, when collecting data for a user from the users table, as a result of collecting data for the user, data for the addresses corresponding to the user should also be collected. The address data should be collected, otherwise it will appear that a user does not have an address, and they may not be complete for test purposes. For example, relational databases may have foreign keys, which have validity requirements. For example, if a column in the users table is a foreign key to a primary key in the addresses table, but the value in the foreign key does not exist in the primary key, then this is invalid, which will be indicated by the database. If the users table is collected, but no address table is collected, then this would result in the target database being invalid. Thus, in this example, data is required to be collected from all tables that are linked by foreign key/parent key relationship constraints. While data from some tables is required to be collected in order for the database to be satisfied, other data from tables that are not required may still need to be collected so as to be of use to a user. For example, suppose there is no foreign key/parent key constraint linking the users table and the orders table. While the database may be satisfied if data from the orders table is not collected, this would be of less use to Alice, as it would not be representative of her e-commerce site.

In this example, the data collected from the orders table is an example of what is referred to herein as "upstream" data, while required data such as that collected from the addresses table is referred to herein as "downstream" data (which is required to be collected in order for the database foreign key constraints to be satisfied, where the upstream data is optional from the perspective of database validity/quality).

In some embodiments, performing subsetting includes determining a traversal of the graph such as that shown in the example of FIG. 6A that satisfies both the user's desire that the database be complete (from a validity standpoint, for example), as well as the database's desire so that the database be logically whole.

Figure 6B:
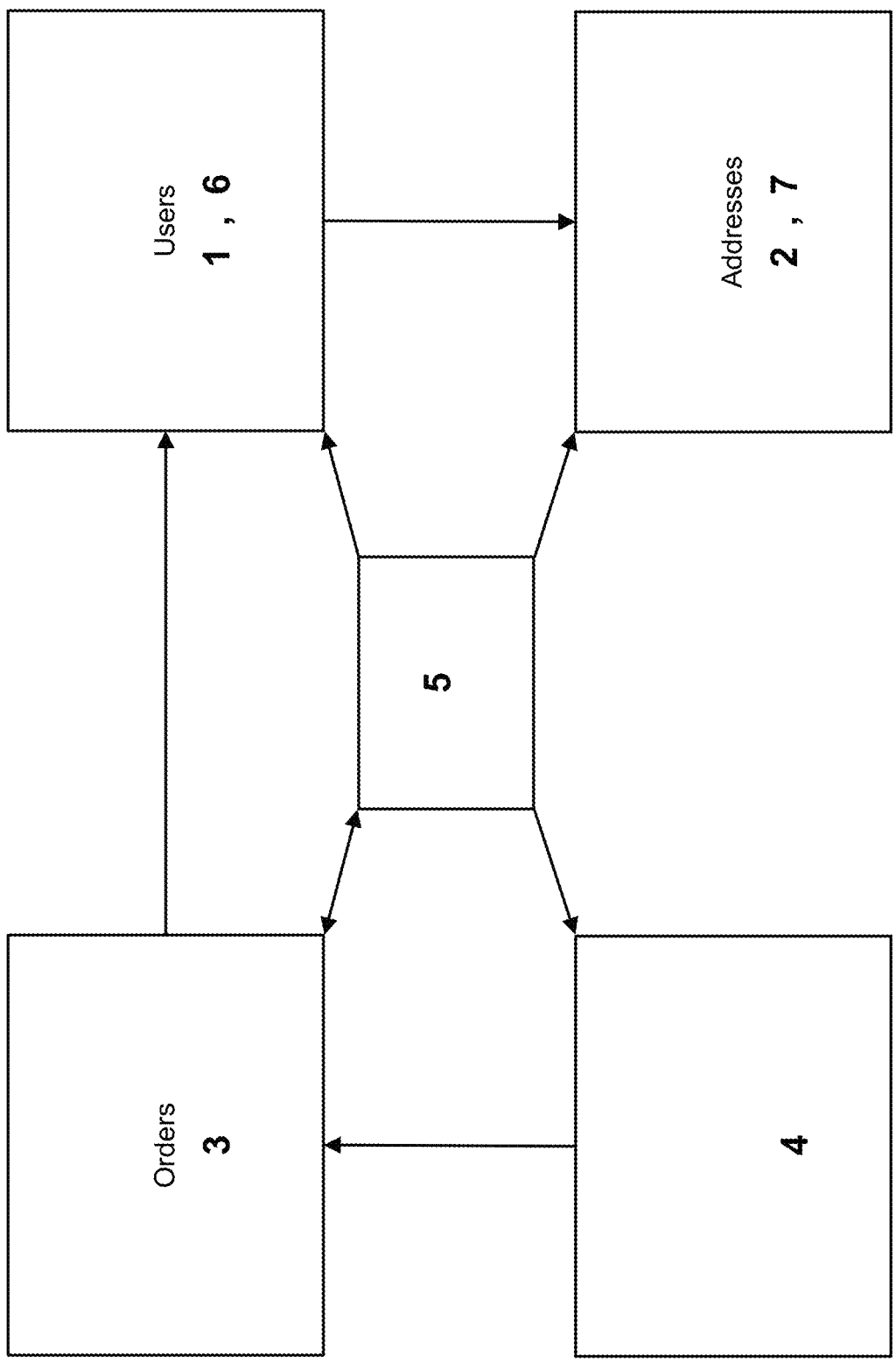
FIG. 6B illustrates an embodiment of a traversal order.

FIG. 6B illustrates an embodiment of a traversal order. In some embodiments, the determined order is fed into a variant of the for loop described in conjunction with the worker processing described above. In some embodiments, rather than looping over every row, the worker loops over only the rows that are relevant to the initial set (e.g., initial set collected from the users table in the example of FIG. 6B).

In some embodiments, bookkeeping is performed to keep track of what data has been collected so far. In some embodiments, the bookkeeping is performed using an efficient data structure so that as the worker loops through its processing, it can quickly determine what rows are of interest versus not of interest. Empirical testing may be used to determine what is more performant or less performant.

Embodiments of Using Synthetic Data

The following are illustrative examples of how synthetic data generated using the techniques described herein may be used.

As one example, Alice may use the outputted data set to perform tests. As another example, Alice may use the synthetic data generation system to create a staging environment that is similar to a production environment, where she may then perform tests on the staging environment. In this example, the platform is used to generate an output database, where the output database is then used for staging.

As another example, when performing subsetting, a smaller output database may be created (that is smaller than the input database, but representative of the data in the input database), where the smaller database is now suitable for loading, for example, on a developer's laptop. This allows the developer to work with their own local staging environment, without having to impact or worry about interrupting anyone else's work. Further, by being able to work locally on a database, testing may be performed more easily, faster, and more efficiently. The developer may then perform whatever they would like anywhere. Further, as the data is synthetic, privacy issues are minimized when developers use such data for local testing. Thus, in this way, developers may perform development work on a realistic data set that has been miniaturized such that the data set may be operated on a local device.

As another example, Alice may use the system described herein to generate realistic-looking data (but that is not actual data that includes sensitive personal information of real customers) for a sales demo.

As another example, the synthetic data generation system described herein may be used to test machine learning pipelines. For example, in machine learning projects, a machine learning model may learn on a large table that represents data that may have been collected from many disparate systems. In some embodiments, a user may use the system described herein to create a data pipeline that generates the final table on which a machine learning model is trained. Further, using the techniques described herein, the data pipeline is created in a way that respects user privacy, where developers may work on the data pipeline without being exposed to actual real data.

As another example, the synthetic data generation system may be used to generate data sets that are sent to external parties for use, such as creating a fake dataset for external development teams to use, without having to expose actual user data or PII.

In some embodiments, the synthetic data generation system includes a notification service. The notification service may be used to notify users of the occurrence of various events. Notifications that may be sent include email, chat, text messages, text such as Slack notifications, GitHub notifications, etc. The notifications may be based on evaluation of collected telemetry and log data.

The following are further embodiments of synthetic data processing facilitated by platform 102.

Creating Virtual Foreign Key Constraints

In various embodiments, platform 102 utilizes foreign keys when it generates subsets and when it applies generators to primary or foreign keys. For example, during data generation, when generators are assigned to primary key columns, the platform ensures that the foreign keys are synchronized with the primary keys. When the platform is utilized to create a subset, foreign keys are used to identify the related tables and rows to include in the subset.

Source data processed by platform 102 is commonly stored relationally inside of a database. Oftentimes, foreign key relationships are defined in the source database. However, this is not always the case. For example, foreign key relationships that should have been established may not have been codified in the database by a user. As another example, databases such as MongoDB do not include foreign keys. However, even though there may not be relationships codified in a source database, or are missing, they may still be desired. For example, while it would be beneficial if all of the foreign key relationships that were desired were already set up in the source database, this is not always the case. For example, while a user may remember that there should be a relationship between the product keys listed in the retail sales table and the product keys column in the products table (and that a product key listed in the retail sales table should exist in the products table), oftentimes there is not a set relationship that is established in the database. It would be beneficial in many cases if foreign key relationships could be established and added dynamically, to augment an already established and defined database. For example, this would allow foreign key constraints to be enforced to ensure referential integrity (e.g., for the database to enforce that a product key listed in the retail sales table should actually be in the products table, rather than relying on a user to remember such a relationship and simply assume that is true).

In some embodiments, to address the issue of missing relationships, or if a user is unable to define them in the source database, the platform described herein provides a virtual foreign key tool that allows the user to add and track virtual foreign key constraints outside of the source database, and to ensure that all relationships are maintained. The generated virtual foreign keys may then be used by the system for various synthetic data applications. For example, the virtual foreign keys are used to establish referential integrity. The virtual foreign keys are also used for performing the subsetting described above, which is performed based on tracing of both codified, and virtual foreign keys. The virtual foreign keys are also used when performing masking, or when assigning other generators to transform data. In some embodiments, the virtual foreign keys are not added to the destination database.

As one example, suppose that in a source database, there is a customers table and a purchases table. Suppose that the purchases table has a column of customer identifiers, where the customer identifiers link back to the customers table. In order to maintain referential integrity, the customer identifiers must remain the same in both the purchases table and the customers table. If not, when a user of the platform loads their application using synthetic data, then referential integrity is broken, and operations dependent on the referential integrity may fail.

As another example, as described above, using the system described herein, a user may specify data to be masked by applying a generator on the data (e.g., encrypting the data, obfuscating the data, etc.). Suppose, for example, that Alice would like to mask the primary key "product" key in the products table. If the system is aware of a foreign key relationship with the product key column in the retail sales table, then the platform may automatically mask the corresponding foreign key (as the foreign key points back to the primary key via the set relationship). However, without such a relationship being set, this may result in the primary key being masked, but columns that should be tied to the primary key (but do not have foreign key relationships set) not being masked, resulting in potential inconsistencies in the destination output database. As described above and as will be described in further detail below, the synthetic data generation system may use foreign key relationships to perform or facilitate various types of functioning, such as subsetting.

In some embodiments, the virtual foreign key tool described herein allows users to find and establish virtual foreign key relationships (that do not already exist in the source database). For example, users are able to add their own foreign keys. In some embodiments, the "virtual" aspect pertains to such foreign keys being added in the platform to preserve relationships, but are not enforced by the source or destination database. That is, they are defined outside of the source database, and managed by the platform. This allows users to create needed or desired foreign key relationships even if those foreign key relationships were not actually set in the source database, without requiring the users to remember that certain relationships should exist when they use them. That is, using the virtual foreign key tool described herein, users may create virtual foreign keys that the platform may then use to perform or facilitate various other functions.

Described herein are embodiments of specifying and generating virtual foreign key relationships. In this way, a data store may be augmented with virtual foreign keys that are not a previously codified existing relationship. For example, as will be described in further detail below, a UI component is provided that allows users to graphically build virtual foreign keys. This allows efficient generation of virtual foreign keys. Embodiments of processes for supporting and facilitating such a graphical user interface are also described in further detail below.

The following are embodiments of foreign key augmentation. The UI (user interface) tool described herein as various benefits. For example, not only are users able to add virtual foreign keys, but they can be added quickly on a real-world database with thousands of tables and thousands of foreign keys. That is, a real-world database may be augmented with additional virtual foreign keys that were not originally codified in the source database. The use of a user interface provides benefits over writing out a configuration file using a text editor, making the process of configuring virtual foreign keys less error prone. Further, a large number of virtual foreign keys may be specified in a short amount of time. In various embodiments, facilitating generation of virtual foreign key constraints/relationships includes surfacing candidates for foreign keys and primary keys.

Enumerating Keys

In some embodiments, to support or power the information provided via the user interface, the input source database is scanned or evaluated to identify all of the keys in the database or application. For example, in a relational database, the source database is scanned to identify and enumerate all of the column names in the source database.

As part of the enumeration, the number of times a column name occurs is tracked and recorded. For example, for a given column name, the number of tables that the column name appears in is tracked and recorded.

In some embodiments, whether a column is a primary key or foreign key already existing and codified in the source database is also recorded as part of the scanning.

Surfacing of Candidates to be Registered as a Virtual Foreign Key

Figure 7A:
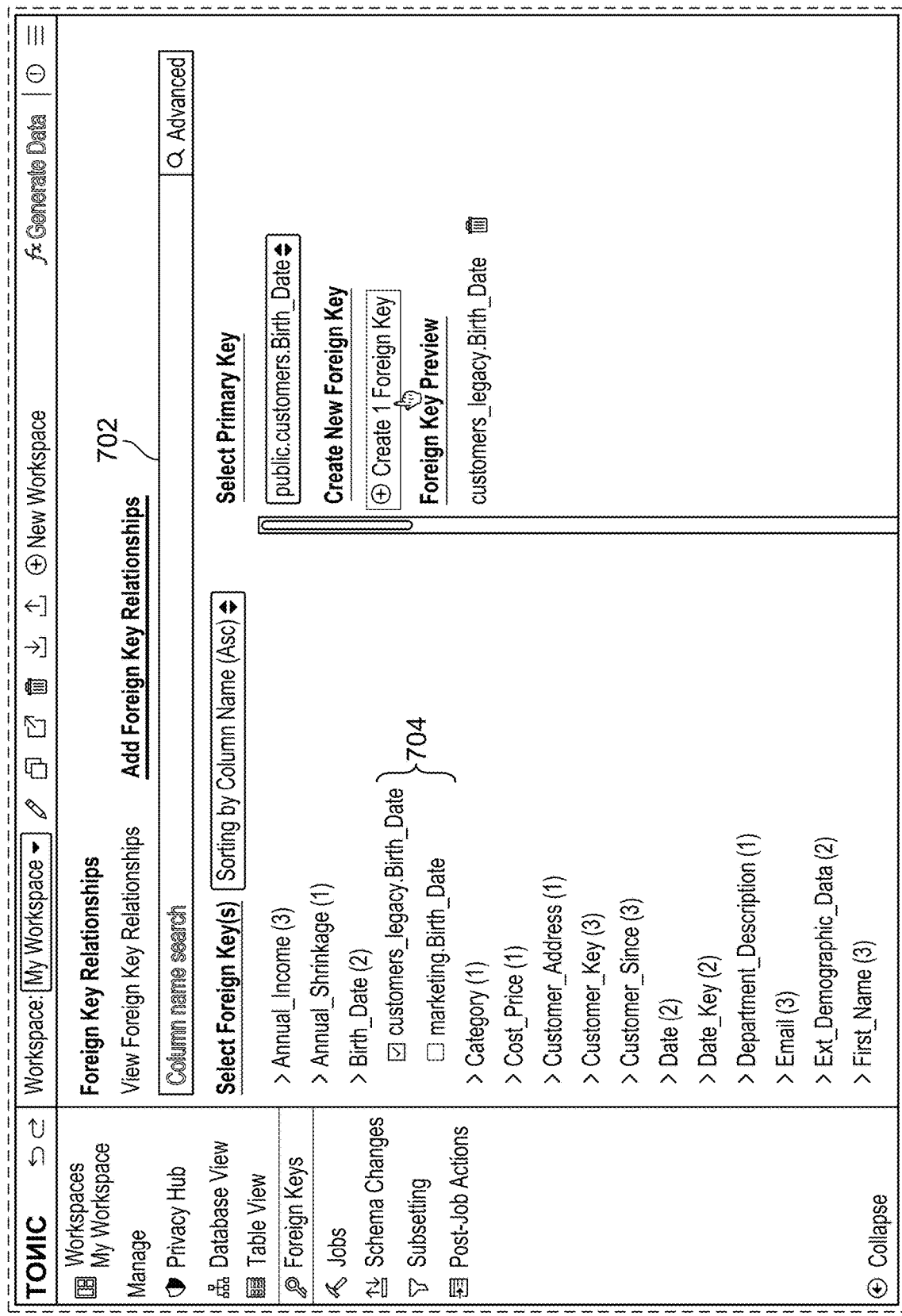
FIG. 7A illustrates an embodiment of a configuration interface for configuring virtual foreign key relationships.

FIG. 7A illustrates an embodiment of a configuration interface for configuring virtual foreign key relationships. In this example, a user interface is provided that includes input elements that allow a user to search for columns that they may wish to generate virtual foreign keys on. For example, the user enters or inputs their search at column name search element 702.

When the user searches based on column name, the query is performed against the set of enumerated column names.

In some embodiments, performing the search includes matching the queried input against the set of enumerated column names. The matching may include exact matching, partial matching, fuzzy matching, etc. In some embodiments, the search also supports regular expressions (regex). As one example, the user may search for "_key", and any column names that include "_key" are shown. The candidates are still grouped by unique column name.

Based on the column name search, a set of candidate foreign keys (candidate columns for generating virtual foreign keys) is returned.

In some embodiments, if the user does not specify a column name input (e.g., empty search bar), then all column names are returned.

The results of the search, which are columns that are potential candidates as foreign keys, are then provided as output via the user interface. In some embodiments, existing codified foreign keys are also surfaced, and users are allowed to create new virtual foreign key relationships for columns that already have existing foreign key relationships.

In some embodiments, an option is provided where only columns that do not have existing foreign key relationships (either codified or virtual) are surfaced. For example, only candidates that have not been previously selected for generating a foreign key relationship are shown.

In some embodiments, to facilitate efficient surfacing to users of what are most likely to be foreign keys, sorting of the returned columns is performed. Two example types of sorting are sorting by frequency and sorting by name, further embodiments and details of which are described below.

Sorting by Name

In some embodiments, the candidate column names that are returned as a result of a search are sorted by name (e.g., sorting by name of the foreign key field). Sorting by name is beneficial in various contexts. For example, if there are multiple people working on generating virtual foreign keys, then different people can be tasked with evaluating column names that are in different parts of the alphabet (e.g., one person handles column names between A-G, another person handling column names between H-Q, etc.). In this way, sorting by name allows a full audit of every single column, where the column names may be divided among people, to mark progress, etc.

In some embodiments, identified columns are linked or associated with each other in the user interface by column name (e.g., grouped by same column name). For example, suppose that a "customers" table and a "marketing" table both have columns with the name "Birth_Date." In this example, the column, customers.Birth_Date, and the column, marketing.Birth_Date, are both listed and grouped together under the column name grouping of Birth_Date (because they both have the same column name). This is shown in the example of FIG. 7A at 704, where identified columns with the same name are grouped together in a user interface. In some embodiments, the groupings are case sensitive (where two columns spelled the same, but with, for example one uppercase and the other lowercase, are two separate column name groupings).

In other embodiments, the groupings of candidates for foreign keys (grouped, for example, based on common column name) may be sorted by either ascending or descending name order.

As another example, suppose that the user searches or filters on the input query "customer_key." Suppose that the enumerated columns include those that are named "customer_key" and "customer_keys" (with an additional "s" in the column name). Columns with both of these names would be returned, as they are both inclusive of any matching search terms. That is, the search is used to perform a filtering on the enumerated columns to return the matching columns. This is beneficial to users, who, for example, are not aware of these slight variations on column names.

Frequency Based Sorting

Figure 7B:
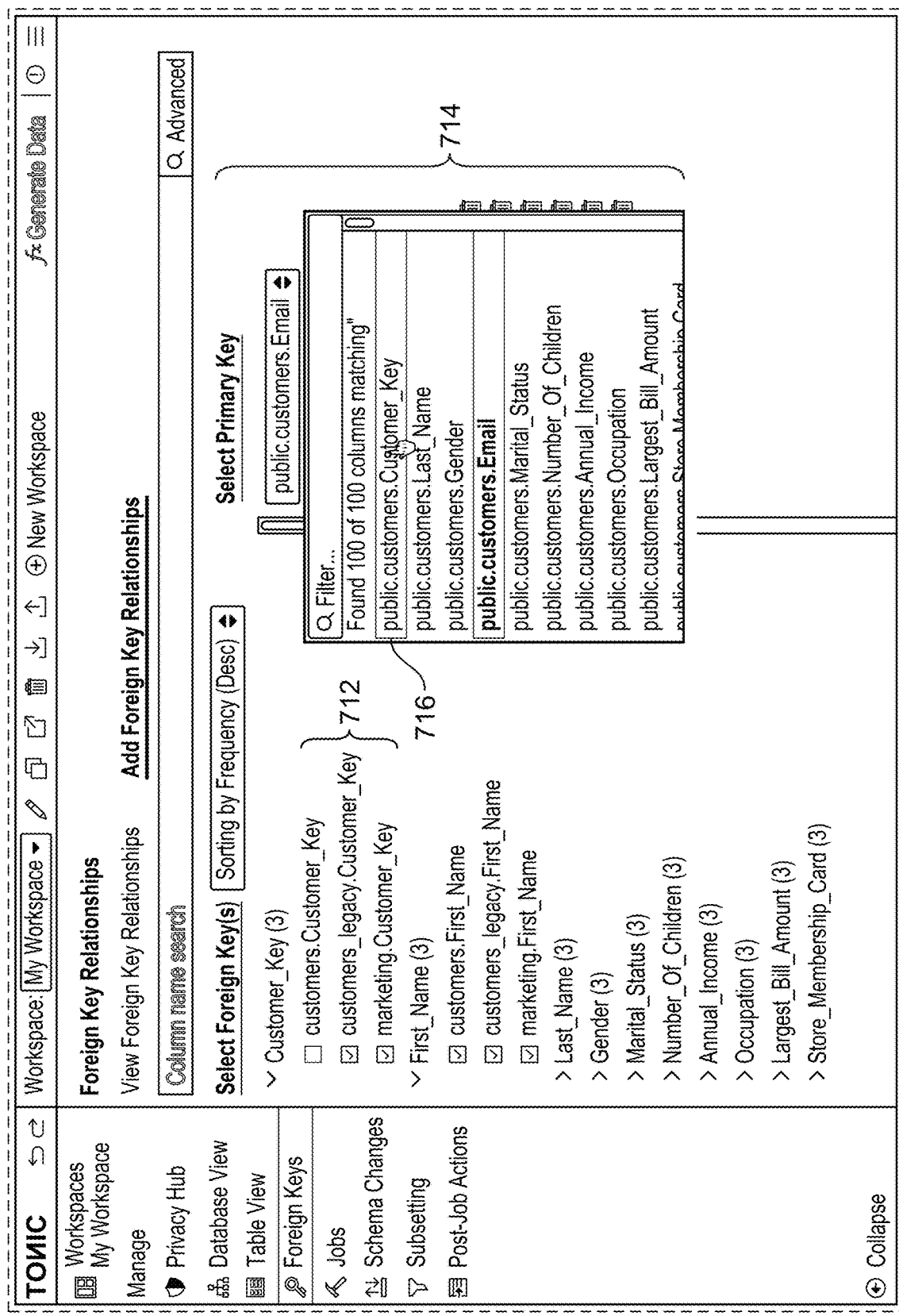
FIG. 7B illustrates an embodiment of an interface for viewing returned candidate foreign keys.

FIG. 7B illustrates an embodiment of an interface for viewing returned candidate foreign keys. In this example, sorting by frequency is shown. For example, sorting by frequency descending is shown in this example. Groups of candidates for foreign keys may also be sorted by ascending frequency.

The frequency of certain keys may vary depending on the source database. For example, while the customer key may occur in the single digits in this example (three times, as shown at 712), in another example database, such as a hospital records database that includes patent IDs, there may thousands.

In some embodiments, the sorting is based on the tracking of the number of tables that a given column name appears in. The higher the frequency, the more number of tables that a given column name appears in. If a column name is observed across a large number of tables, that is indicative that the data in the column name is referring to a main column of data, and are likely candidates for being made virtual foreign keys. That is, sorting by frequency may be beneficial to identify columns that should be foreign keys, as the more often a column name appears, the more likely it is to be a foreign key.

As shown in this example at 712, the column name "customer_key" has been observed in three tables (e.g., the "customers", "legacy", and "marketing" tables in a source database).

Based on the results presented in the user interface, the user may then select which columns they would like to make virtual foreign keys. As one example, the user is provided the option to bulk select them (e.g., with a single click from the UI) to be foreign keys that refer to the same primary key.

Surfacing of Candidates to be Registered as a Primary Key

The following are embodiments of surfacing primary keys. User interfaces for selecting a column for use as a primary key are also described in further detail below. After selecting foreign keys, the user is provided, in the user interface, the option to select a primary key to which the foreign keys are mapped.

In some embodiments, candidate primary keys are presented. As one example, the candidate primary keys are sorted alphabetically. In some embodiments, the candidate primary keys are ordered based on fuzzy matching.

In some embodiments, candidate primary keys are suggested. In this example, a candidate primary key is a column that will be the primary key column that the foreign key columns refer to. In some embodiments, each of the enumerated columns of the source database is evaluated to determine whether a given column should be suggested. In some embodiments, determination of a candidate primary key is based on 1) whether a table or name of a column at least partially matches a selected foreign key column name; and 2) whether the candidate primary column is an existing primary key column codified in the source database.

In some embodiments, matching is performed between a selected foreign key and the set of enumerated columns in the source database. For example, suppose that the user has selected "customer_key" when selecting a foreign key. The composition of the selected foreign key(s) is determined. For example, a primary key column is selected as a candidate if the table and/or column has the string "customer" in it. In some embodiments, a (fuzzy) match is performed based on the column name. As another example, a match is performed based on the combination of table name and column name. For example, consider the column "patient_id" that has been selected for being a foreign key. Any columns that have the same name or string components (e.g., "patient" and "id" with or without underscores) is returned. As another example, if the combination of the name of a column and its table name fuzzily matches the foreign key column name, then it is returned as well. For example, if a column has the name "id" and is in the table named "patient", then the combination of the table name and the column name fuzzily matches the selected foreign key column name, and that "id" column in the "patient" table is returned (e.g., the column with the path "patient.id" is returned, as it matches a selected "patient_id" foreign key column). As another example, if a selected foreign key column has the name "source_transaction_id", then a column with the name "id" in the table named "transactions" is returned as a suggested candidate primary key.

In some embodiments, the user has the option of performing one or both of the matching on column name, or combination table name and column name search.

The candidate primary keys are displayed in the UI to the user. Examples of candidate primary keys are shown at 714 of FIG. 7B. As shown in this example, the user may filter the candidate primary keys by searching for columns with certain names.

In some cases, there may be multiple candidate primary keys. In some embodiments, the candidate primary keys are sorted or prioritized. For example, the candidate primary keys are sorted based on the amount of matching between a given candidate primary key and a selected foreign key. Those candidate primary keys that match more closely with a selected foreign key are ranked higher.

In some embodiments, the prioritization is based on whether a candidate primary key is a codified primary key. As one example, a column that is already codified as a primary key in the source database is prioritized over other columns that are not already codified as primary keys. This in part accounts for users often ignoring foreign keys in their source database, but are less likely to ignore primary keys. For example, it is likely that a user would have codified a customer key primary key column, but may have forgotten to link a foreign key column in another table back to the codified primary key. In this way, the tool is also able to be used as a mechanism by which to identify columns which were inadvertently not linked back to primary keys.

In various embodiments, prioritization is based on both the level of matching, as well as whether a candidate primary key is a codified primary key, where the factors may be weighted when determining how to rank or prioritize a candidate primary key in the user interface. For example, a candidate primary key that is a perfect match may rank higher than a candidate primary key that did not match at all, but was a primary key. On the other hand, if two candidate primary keys had similar levels of matching to a selected foreign key, then the candidate primary key that is a codified (in the source database) primary key is ranked higher.

In establishing foreign key relationships, the same column is prohibited from being a primary key and a foreign key that refers to itself. In some embodiments, the columns that are selected by the user to be foreign keys are removed from the list of suggested candidate primary keys. For example, columns selected as being foreign keys are prevented from being surfaced as suggested primary keys. That is, in some embodiments, a foreign key is not permitted to be a primary key to itself, and in some embodiments, the user interface is configured to prohibit users from selecting a primary key that is the same as a selected foreign key.

In some embodiments, the system monitors for and messages the user if their selection results in a situation in which there are no suggested candidate primary keys. For example, suppose that there are three columns with "customer_key", and the user inadvertently selects all of them to be virtual foreign keys. In this case, if the user types in "customer" in the candidate primary key search bar, no matching columns would be available to be primary keys. In this case, where the set of suggested primary keys is empty, the system causes a UI alert to be displayed, where a message is presented indicating that there are no suggested primary keys available based on the suggested foreign keys. A UI option is also presented that allows the user to remove a selected foreign key column.

Suggesting Foreign Keys/Primary Keys

There may be cases where in the source database, the creators of the database inadvertently did not establish foreign key relationships in the source database. Such columns can be surfaced and suggested for making virtual foreign key relationships.

In some embodiments, the system suggests columns to be made virtual foreign keys. As described above, the column names across the tables in the source database are enumerated. A count is maintained of how many times a column name is observed. For each of those columns that fall under having the common column name (or match based on column-to-column matching, which may include fuzzy matching), it is also observed and tracked whether that column is codified as a foreign key.

Suppose that based on the scan, it is determined that there are 800 columns with the column name "patient_id". Suppose that of those 800 columns, it is determined that 750 of them are codified as foreign keys that refer to a "patient.id" primary key. For the remaining 50 columns, these instances of "patient_id" are surfaced and suggested as potential foreign keys to the "patient.id" column. Here, the enumeration of columns and their recorded statistics are used to suggest additional columns that should potentially be foreign keys. The corresponding primary key is also surfaced based on the determination of similarly-named columns that are foreign keys and the primary key that they refer to.

In this case, the system determines that the number of codified foreign key relationships for columns with a given column name is less than the total number of columns with this column name. This is an indication that the remaining columns without codified foreign key relationships should have the same reference to a primary key as those columns with existing codified foreign key relationships.

For example, it is determined that a column with a first column name has a codified foreign key relationship in which the column is a foreign key that refers to a primary key. It is determined that another, second column with a matching name does not have a codified foreign key relationship to the primary key. Based on the first column having the same name and a codified foreign key relationship with a primary key, the second column is suggested as a candidate for being in a virtual foreign key relationship with the primary key that the first column refers to. In this way, both candidate foreign keys and a corresponding candidate parent key are suggested.

As another example, as part of the enumeration, the system performs fuzzy matching to determine columns that have similar or matching names. The presence of multiple columns across multiple tables that have the same or similar names is an indication that at least some of the columns are likely to be foreign keys that refer to a primary key. If those columns do not have codified foreign key relationships, then in some embodiments, when the UI is displayed, those columns are presented for selection as foreign keys. A suggested primary key is also presented. The user can then accept or reject the suggested virtual foreign key relationships.

The following are embodiments of determining suggested primary keys. In some embodiments, there are rules utilized by the platform, such as that the foreign key part of the relationship is much more likely to have "id" somewhere in the column/field name. A column may also be declared a primary key in the database without there being a foreign key pointing to it (this may be a relatively common scenario), and this would allow the platform to know which is the primary. In some embodiments, the platform evaluates the data, as a primary key is by definition unique; if one of the columns has data in it with duplicates, the other must be the primary key.

As shown above, candidate foreign keys and corresponding primary keys are suggested, in various embodiments, based on matching (fuzzy matching), the existence of already codified foreign keys in the database, etc.

Generating Virtual Foreign Key Relationships

The user may then select which column key is to be the primary key that the selected foreign key columns refer to. For example, a user, via the interface, may select multiple candidate keys to be foreign keys, which are then configured to map or refer to a single primary key. Once the user submits this request, multiple foreign keys are created that point to the selected primary key. In the example of FIG. 7B, the user has performed the combination of sorting (by frequency) to identify candidate foreign keys, bulk selected multiple candidate foreign keys, and then applied the bulk selection to generate multiple virtual foreign key relationships between the candidate foreign keys and a single primary key.

In some embodiments, subsequent to selection of the foreign key columns and the primary key column, virtual foreign key relationships are generated. In addition, the resulting virtual foreign key relationships that are generated are rendered visually in the user interface. This allows a user to quickly edit the virtual foreign keys. This includes deleting virtual foreign keys and disassociating them. Later on, when the user selects a primary key, there will be relationships between the primary key and the multiple created foreign keys (which are not pre-existing and codified in the source database, but are added in the platform).

Based on the selection by the user, multiple data structure representations of the virtual foreign key relationships are also created automatically and recorded in platform 102. In some embodiments, virtual foreign key relationships are stored in metadata database 114. The following are embodiments of generating virtual foreign key relationships.

Multiple foreign key relationships may be mapped to a single primary key, as shown in the example interface of FIG. 7B, where multiple foreign keys are shown selected (with check marks next to them), which will be mapped to a selected primary key (e.g., public.customers.Customer_Key at 716) The multiple virtual foreign key relationships that are created that are mapped to the same primary key may be surfaced or reflected in the foreign key relationships view, as shown at 722 in the example interface of FIG. 7C. Thus, as shown, multiple virtual foreign key relationships may be created in a batch.

Viewing Foreign Keys

The following is an example of viewing foreign keys (e.g., augmented virtual foreign keys, as well as codified foreign keys). In this example, a user uses their device (e.g., laptop 108 of FIG. 1) to interact with and communicate with the web server 104.

FIG. 7C illustrates an embodiment of an interface for viewing foreign key relationships. In this example, a user may view all foreign keys, which may include existing foreign key relationships in an input database, as well as any added virtual foreign keys (e.g., via interfaces for adding virtual foreign keys, such as those shown in the examples of FIGS. 7A and 7B). For example, the existing foreign keys are identified by the platform by querying the source database. The added virtual foreign keys may be obtained by reading a file that includes records of added virtual foreign keys. Further details regarding recording of virtual foreign keys are described below. In this example, those foreign keys that have a lock next to them are actual foreign keys that exist and are codified in a source database. Other types of indications of whether a foreign key is an added virtual one or an existing one codified in the input source database may be used.

In this example, the added virtual foreign key relationships are indicated as being virtual by not having a lock next to them. As shown in this example, for added virtual foreign key relationships, there is an option to select the virtual foreign key relationship to edit it (where in some embodiments, existing foreign key relationships are locked and not allowed to be modified).

As shown in this example, via the UI, a user interface option is also provided that allows virtual foreign keys to be deleted from the synthetic data platform. Virtual foreign keys may be selected individually or in bulk for deletion/removal. Virtual foreign keys may also be filtered based on column name search. Sorting may also be performed. A shift select operation may also be used to select a range of virtual foreign keys.

When an instruction to remove the virtual foreign key relationships is received via the user interface, the corresponding records for those virtual foreign key relationships are also deleted. For example, as will be described in further detail below, JSON data structures/entries for those virtual foreign key relationships in a virtual foreign keys file are also deleted.

Recording Virtual Foreign Key Relationships

In some embodiments, data structures such as JSON objects are created for the specified/configured virtual foreign key relationships.

As shown in the above examples, the user uses the UI to sort by frequency descending. The user may then see what fields are most frequent. The user may then add foreign keys to selected field names. In the example of FIG. 7B, if the user clicks on "customer_key" at 716, then all column names with that field name will be selected (there in this case). Three foreign keys are then created.

In some embodiments, in response to a user input via the user interfaces described above to create a virtual foreign key relationship, a corresponding data object is created. As one example, a JSON representation of a created virtual foreign key is generated by the platform and stored. Examples of accessing and viewing a JSON representation of a virtual foreign key relationship are described below. While JSON entries are shown in this example for illustrative purposes, the techniques described herein may be variously adapted to accommodate other types of file formats for recording virtual foreign key relationships.

The virtual foreign key relationships may be a one-to-one mapping (e.g., a single column mapping to a single column). In other embodiments, users may specify compound primary keys and compound foreign keys. In some embodiments, such compound foreign keys may also be created by writing JSON code.

Figure 8B:
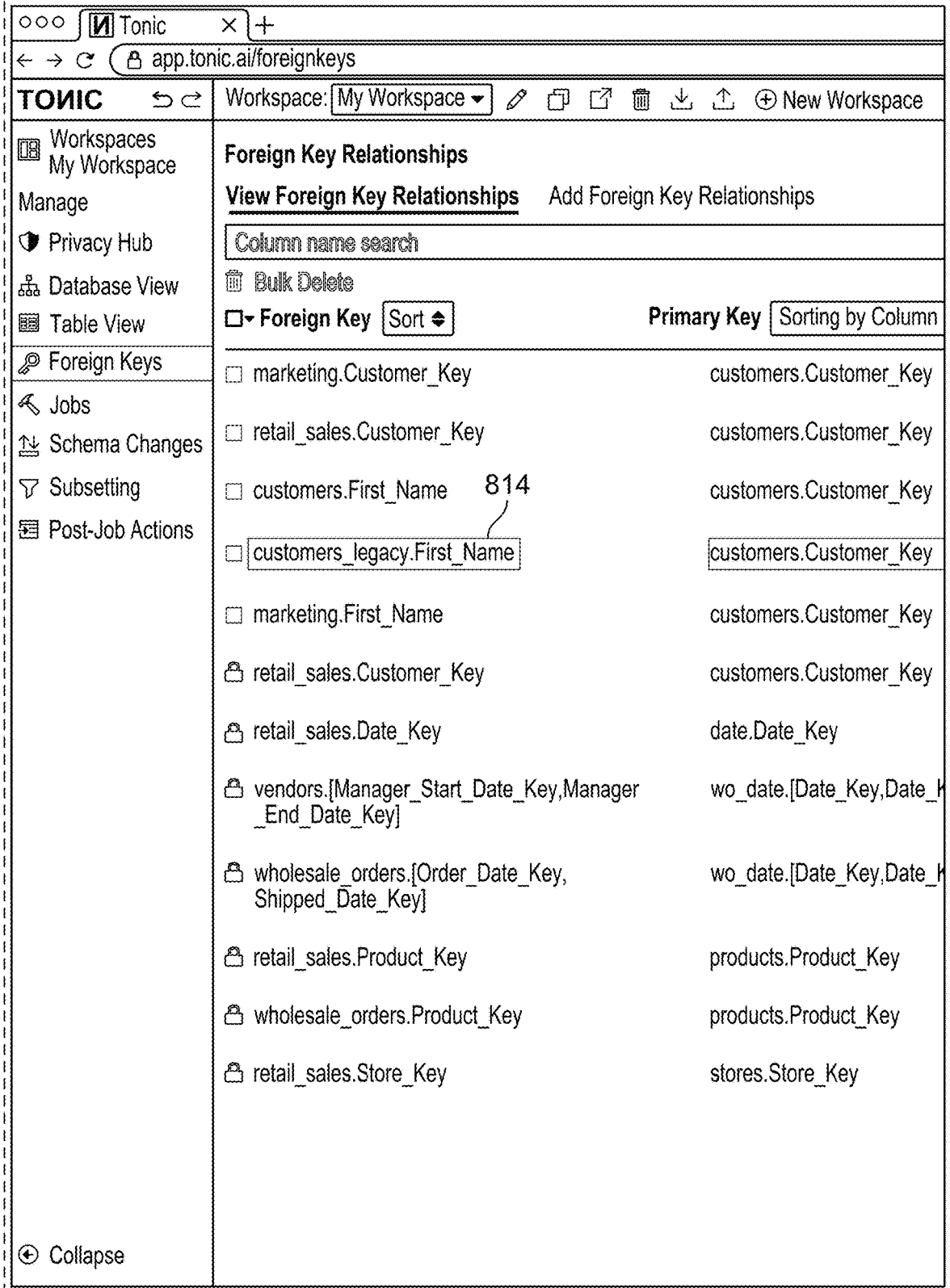

The following are examples and embodiments of a data model (e.g., JSON data model) for storing virtual foreign key relationships. In some embodiments, a column is described with three fields: schema, table, and column. In some embodiments, a virtual foreign key relationship includes two blocks of JSON code, one for the foreign key schema, foreign key table, and foreign key columns, and a corresponding block of target schema, target table and target columns (where the target is, for example, the selected primary key). An example of JSON representations of virtual foreign key relationships is shown in the example of FIG. 8A. In some embodiments, the JSON representation of a column includes a field for indicating whether the column/key is nullable. FIG. 8B illustrates an embodiment of a JSON representation of a virtual foreign key relationship. For example, the highlighted block of JSON at 812 is a representation of the highlighted virtual foreign key relationship shown at 814 in the user interface for viewing foreign key relationships.

In this example, a JSON document is maintained to store and keep track of all representations of virtual foreign key relationships. As described above, when there are missing foreign key relationships (or if foreign key relationships cannot be defined in a source database, because foreign keys are not supported in the source database), the virtual foreign key tool described herein allows users to add additional foreign keys to ensure that all relationships are maintained. In some embodiments, the virtual foreign keys are stored externally from the source database. As one example, the document or file in which virtual foreign key relationships are recorded is stored in metadata database 114.

In some embodiments, the portion of the UI for displaying virtual foreign key relationships (such as that shown in the example of FIG. 7C) is driven by or generated based on the contents of the JSON document. In some embodiments, a user may directly edit the JSON document to write a virtual foreign key relationship. The new relationship will then be surfaced in the user interface (as, in some embodiments, the user interface is rendered according to the content of the JSON document including the JSON representations of virtual foreign key relationships). When generating a user interface such as that shown in FIG. 7C, as described above, the existing foreign key relationships may be determined by querying the input database. The source database may also be queried for all columns that are not foreign keys, where such columns (identified, for example, by their column names) may be presented in a user interface as candidates for selection as foreign keys, as shown in various example user interfaces above.

Using Virtual Foreign Keys

The virtual foreign keys that have been added on top of the existing foreign key relationships codified in the source database may then be used in various aspects of the system, both front end and backend. For example, the added virtual foreign keys may be used by platform 102 in a same way as foreign key relationships that were already codified in the source database. For example, masking treats the virtual foreign keys as if they were existing codified foreign keys. As one example, in some embodiments, if a primary key column is masked, then the same masking rule must be applied on the corresponding foreign key column so that the linking/referential integrity is maintained. This applies to both codified existing foreign key relationships, as well as virtual foreign key relationships. That is, regardless of whether a foreign key relationship was previously defined in the source database, or is added as an augmentation, platform 102 enforces the established foreign key constraints.

As one example, a worker such as worker 106 is configured to perform a scan of existing virtual foreign keys codified in the source database, as well as a scan of the metadata database 114 for virtual foreign keys that have been generated to augment the source database. Various services are then able to utilize the virtual foreign keys stored in the metadata data store.

In some embodiments, when a user starts a job to perform a function such as masking, the system performs a check to determine whether all of the foreign keys are valid (e.g., via foreign key constraints). For example, the system determines with a target column (e.g., primary key) exists in a given table. If not, then a foreign key is not valid. The user may then be prompted via a user interface to update their foreign key. The user may be provided an option via the interface to delete the virtual foreign key or edit its JSON representation.

As described above, in some embodiments, virtual foreign key relationships are stored as JSON entries in a file of virtual foreign key relationships. When a service such as subsetting utilizes foreign keys, it accesses both codified ones in the database, as well as the virtual foreign keys in the file, where all of the codified and virtual foreign keys are available for use. For example, an endpoint is provided to a user, where when the user provides input to the endpoint for foreign keys, the endpoint aggregates and combines codified foreign keys from the source database (which is queried for codified foreign key relationships), as well as virtual foreign key relationships established in the JSON file (any other type of file format may be used, as appropriate).

Virtual Foreign Keys for Non-Relational Source Databases

In the above examples, virtual foreign keys were generated for relational databases. The techniques described herein may also be variously adapted to generate virtual foreign keys for non-relational source databases that include unstructured and semi-structured data, such as MongoDB data stores. In the case of a data store such as MongoDB, there will be no codified foreign keys (or codified relationships for referential integrity), and all foreign keys generated will be virtual. This is because non-relational databases such as NoSQL databases (e.g., MongoDB) do not support foreign keys. In various embodiments, the processing described above with respect to tables and columns of relational databases is adapted for collections and fields, respectively.

In some embodiments, schema determination/generation (e.g., using the techniques described in further detail below) is used to perform a full scan of the source Mongo data store, where an internal schema is built for all of the documents in a collection. (Further details regarding empirical determination of an internal schema of a schema-less database are described below). For example, all unique field names are enumerated in a manner analogous to the enumeration of column names in relational databases, as described above. For example, the number of collections that the given field name appears in is tracked and recorded. In this way, grouping/flattening of field names is performed. This allows the field names to be surfaced in a user interface, similar to the column names as described above.

The following are example details and embodiments regarding selecting primary keys for virtual foreign key relationships for an unstructured or semi-structured data store.

In the above example of a relational database, a candidate primary key column for a virtual foreign key relationship was suggested based on matching performed based on column name and/or the combination of table name and column name. In an analogous manner, when generating virtual foreign keys for a source database such as MongoDB, collection names and/or field names are matched on when identifying candidate primary keys (where collection is to table, and field name is to column name). Further details regarding determination of an empirical schema of a non-relational database are described below.

FIG. 8C illustrates an embodiment of a JSON representation of a virtual foreign key relationship established for a non-relational database. The JSON representation is similar to that of for relational databases, As shown in this example, a virtual foreign key relationship includes two blocks of JSON code, one for the foreign key collection and foreign key fields, and a corresponding block of target collection and target fields (where the target is, for example, the selected primary key).

Figure 9:
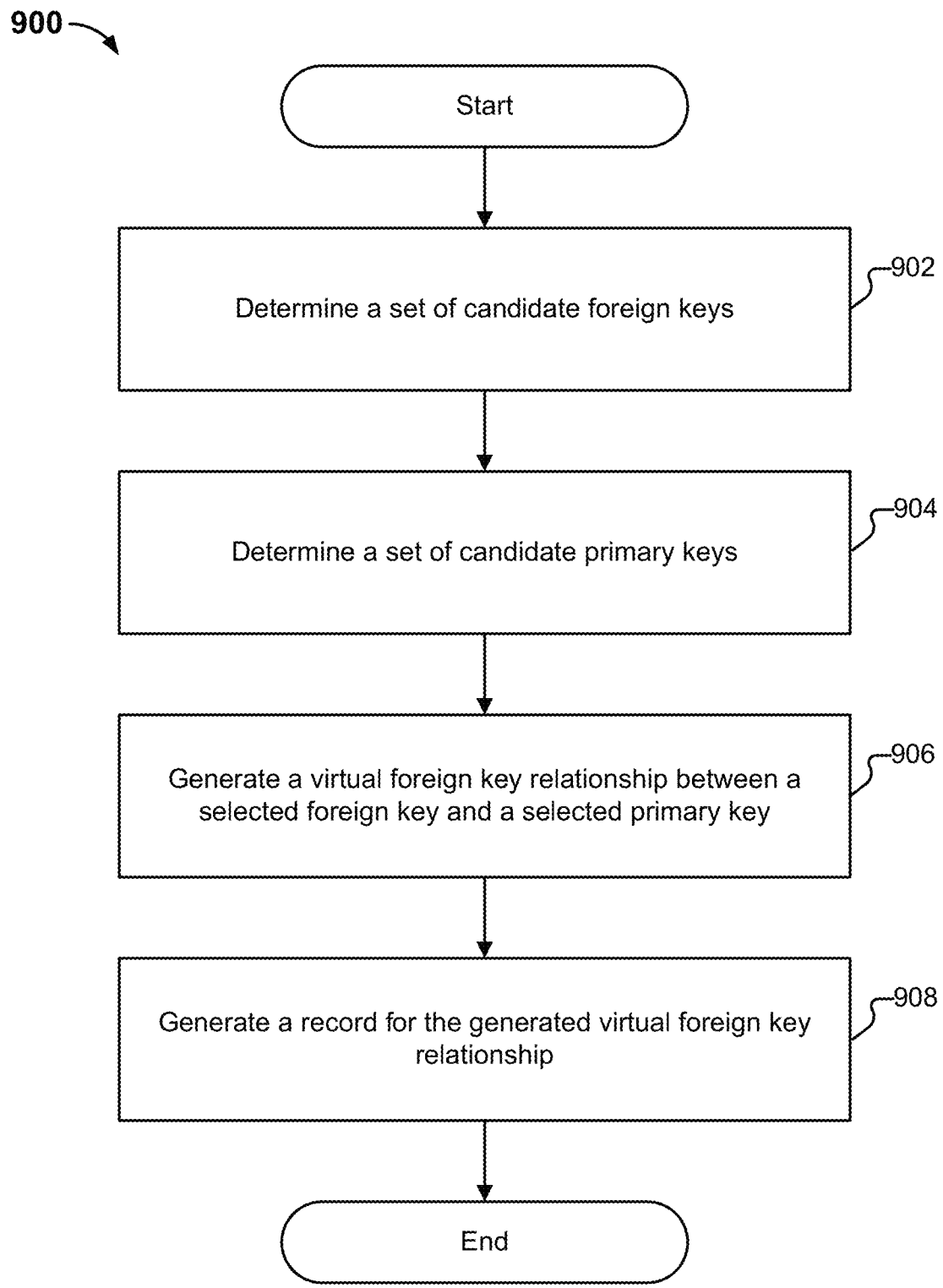
FIG. 9 is a flow diagram illustrating an embodiment of a process for generating virtual foreign key constraints.

FIG. 9 is a flow diagram illustrating an embodiment of a process for generating virtual foreign key constraints. In some embodiments, process 900 is executed by platform 102. The process begins at 902, when a set of candidate foreign keys is determined. For example, as described above, a source database is accessed and scanned to determine available columns or fields to be used as foreign keys. Further details regarding enumeration are described above. In some embodiments, the candidate foreign keys are displayed in a user interface. They may also be provided via an application programming interface (API). The candidate foreign keys may be sorted, such as by frequency or name.

At 904, a set of candidate primary keys is determined. For example, in some embodiments, the candidate primary keys are determined based on a selection of foreign keys to be used in creating virtual foreign key relationships. The set of candidate primary keys may also be displayed. Further details regarding determination and surfacing of candidate primary keys are described above.

At 906, a virtual foreign key relationship is generated between a selected foreign key and a selected primary key. For example, via user interfaces such as those described above, users may select foreign keys and a corresponding primary key that the selected foreign keys refer to. In some embodiments, the generated virtual foreign key relationship is a foreign key relationship that is absent in the source database, and was not previously existing or codified in the source database.

At 908, a record is generated for the virtual foreign key. Further details regarding recording of virtual foreign keys in a file are described above.

Handling Schema-less, Unstructured Databases

In the above examples, the platform operated on source data in a relational database. In relational databases, tables have a rigid schema, where each and every row in the table adheres to that schema definition. However, in some scenarios, users may wish to use databases that are non-relational.

One example of such a non-relational data store is MongoDB. MongoDB is an open-source NoSQL database that is often used because of its flexibility. By using MongoDB, developers can quickly bring up a database, and define the schema as they go. For example, a project may have many developers who are building websites and adding fields. By using a non-relational database such as Mongo, those developers do not have to first go through a rigorous process with a database administrator (DBA) to define a schema. Rather, the developers can stand up their database, and include whatever is needed in order for their website to be operational, deferring the work of understanding what is in their database to a later time. For example, the developer users may not necessarily know their database schemas that well, or may not know what fields are in their database, how they are represented, how they are structured, etc.

The data structure for MongoDB is different from that of relational data connectors. For example, MongoDB does not store data in tables according to a rigid schema. Instead, MongoDB stores data in documents that have a flexible schema or no schema at all. For example, instead of schemas, tables, and columns, a MongoDB database includes collections of documents that include fields. The fields of a document include objects that are pairs of field names and corresponding values. The fields may be in any order in the document, and be nested in other objects or arrays. Because of the lack of a formal structure of documents, users can add whatever they like to the documents. Due to the unstructured and variable nature of such data, it can be difficult for users to effectively understand the nature of their data and make decisions on how to create synthetic data from it. For example, because there is no schema, there is no consistent definition of what is contained in documents, and it can be difficult for users to visualize or understand what is in their documents. This in turn makes it difficult for users to determine how to appropriately transform their data.

The following are embodiments of handling unstructured and/or semi-structured source data. This includes processing data from source data stores that are non-relational databases. For illustrative purposes, embodiments involving MongoDB are described below. The techniques described herein may be variously adapted to accommodate other types of non-relational data stores. For example, the techniques described herein may be variously adapted to accommodate other types of document-based stores, such as DynamoDB. The techniques described herein may also be adapted to work with data stores such as Elasticsearch. In some embodiments, the techniques described herein may be adapted to accommodate data sources that include both structured and unstructured data, such as SQL databases that include JSON data.

As described above, in a data store such as MongoDB, data is not included in tables, but in collections of documents. As one example, a document may be a JSON (JavaScript Object Notation) document.

FIG. 10 illustrates an embodiment of a collection of JSON documents. A collection is a named grouping of documents. By way of analogy, a collection is analogous to a table. A document is analogous to a row of a table. A table may be considered as a collection of rows. In Mongo, a collection of documents is analogous to a table with rows. In this example, suppose a "restaurant" collection of documents representing a set of restaurants, where each document in the collection includes data for a specific restaurant.

Coders may write documents in a collection to be similar, but because there is no rigid schema, and no document structures are enforced, the structures of the documents in the collection may vary. For example, even though the documents in FIG. 10 all pertain to restaurants, documents in the same collection may have overlapping fields, additional fields, or different data type representations for values of the same field.

In this example, three JSON documents are shown (1002, 1004, 1006), each pertaining or corresponding to a specific restaurant. As shown in this example, the documents have some similarities among them. For example, each of the documents has the fields "URL", "_id", and "rating" at the same locations (e.g., access paths) within the documents.

Although the structure of the JSON documents is similar, with some overlapping fields, there are also differences. For example, only documents 1002 and 1006 include the "address" field, while document 1004 does not. As another example of variation among the documents, although all of the documents include a field with the name "rating", the data types for the values of the field are different for the different documents. For example, in document 1002, the rating field is a string. In document 1004, the data type for the value for the rating field is an integer (int32). In document 1006, the data type for the value for the rating field is a double. As shown in this example, across documents, the same key may have values represented in multiple ways. That is, all of the JSON documents have the same rating field, in the same location/path within their respective documents, but are all of different data types. Here, the same rating field has been represented in the user's MongoDB data store in different types of values.

As shown in this example, although the three documents in the collection all represent restaurants, because of the unstructured nature of MongoDB, and because there are fewer to no restrictions on what can and cannot be included in a document, while there are some similarities in fields among the three documents, there are also differences. In this case, even though all three documents represent instances of restaurants, they are not identical in structure, and even for the same field, there are different data type representations.

Due to variability in the fields and the way fields are arranged in different documents of a collection, this can make it difficult for users to understand what a restaurant record looks like, as it may be different from record to record. Such difficulty increases exponentially for collections with large numbers of documents (e.g., in the thousands), where the documents may be highly complex with arbitrary complexity that is further exacerbated by the ability to have arbitrary arrays of nested documents In some embodiments, to help a user have an understanding of the nature of the documents in a collection, the platform is configured to analyze the contents of the documents and empirically determine a schema or structure of the data contained across the documents. For example, for the collection of documents representing restaurants shown in FIG. 10, the platform is configured to generate a structured view of the fields and types of data that are present across the documents in the collection. This provides a global, summarized view of how documents are structured, and gives a visualization of what fields are present in documents, how they are represented, and how often they are represented in certain ways in the collection of documents. As shown in the examples above, there may be multiple ways of representing a field. It could be a double or an int, it could be an int or a string, but it also could be an array or a JSON object itself. It may be of type document itself.

As will be described in further detail below, the platform described herein assists developers or other users by automating the process of determining or inferring a schema (a process referred to herein as "hybrid schema determination," further details of which will be described below) of their non-relational data store. Using the techniques described herein, the sparseness of a database may be also be determined. A visualization of the structure of Mongo may also be provided to determine, for example, what keys are present, the types of values that have been set for those keys, etc. (e.g., hybrid document generated by value saturation, as will be described in further detail below).

In some embodiments, platform 102 is configured to determine for a collection of documents, a summarization of the structure (including variations) of the documents in that collection. The process is referred to herein as schema building, and in some embodiments, a schema builder of platform 102 is configured to perform the schema building. In some embodiments, the schema builder is implemented as both a part of the API (provided, for example by web server 104) and a worker (e.g., worker 106). Depending on how the scan is started, it may be run by either. The schema building provides a user an understanding of the nature of the documents in the collection, such as their general structure, as well as the variations among the documents. For example, all fields across all documents are identified. As part of the structure determination, the platform also determines how often certain keys with certain types of values are found in documents. This provides the user insight into their collection and a sense of what elements are common across a large number of documents, and what types of variations there are among the documents in the collection. This is because although documents in a collection might nominally follow a similar structure, they may have different variations that make it difficult for a user to understand what exactly is in the documents, which in turn impacts their ability to make decisions on how to transform their data at an aggregate or group level. The summarization of the documents provides various information, where keys that are repeated across documents are shown, and where the variations found amongst the documents are also presented.

In some embodiments, by examining and evaluating all such documents as part of the schema building process, the system reveals or otherwise determines the empirical schema for such documents. That is, although a schema was not intended for the source data, the system is able to determine the de facto schema of the source data. For example, as will be described in further detail below, in some embodiments, the platform determines a list of all keys across the documents in the collection, where the key list reflects all of the permutations of every field from every document. For example, a field may have different data types for values in different documents. Such permutations of field and data type are recorded. The empirically determined schema is referred to herein as a "hybrid schema." Further details regarding empirical generation of a hybrid schema are described below.

After empirically determining the structure of the documents in the collection, platform 102 is configured to provide a navigatable experience to a user to allow them to generate synthetic data from such non-relational source databases. For example, the collection may also be visually represented, according to the determined hybrid schema, via what is referred to herein as a "hybrid document" view. In some embodiments, the hybrid document is a version of the hybrid schema that is saturated or otherwise populated with example values. As will be described in further detail below, providing a hybrid document that outputs a representation of the source data facilitates allowing users to perform various operations on such source data to generate synthetic data. Further details regarding saturation of a hybrid schema and the hybrid document view are described below.

As will be described in further detail below, in some embodiments, the hybrid schema keeps track of all of the fields that are observed, as well as their access paths (e.g., path descriptor that described how to access the field), their data types, etc. In order to display the representation of the empirically determined structure to users, the schema is populated (via a process referred to herein as "saturation") with examples of the data, thereby forming a hybrid document.

The ability to integrate with databases such as MongoDB provides flexibility for end users, who may use Mongo in places where documents make more sense to capture that information such as an employee profile, an application, a book review, etc.

In some embodiments, using the schema determination techniques described herein, a structure or definition may be imposed or inferred of what all of the documents in a collection represent. Sparseness and complexity of the documents may also be determined.

Embodiments of the schema building techniques described herein provide various benefits to end users. For example, users may see data that they normally do not see. It also provides an opportunity to have a gate, to ensure that data is not leaking through so that it is not only, for example, object IDs that are being masked. The platform is able to determine the data type for any field in any document in a collection. No matter if there are inconsistencies, the platform is able to protect fields and ensure that there is no data leak to a lower environment.

Generating a Hybrid Schema

As described above, a non-relational database such as MongoDB stores data in documents that have a flexible schema or no schema at all. For example, a field of a document may in turn be an object data type that is made up of other child fields. In this way, a collection may have a hierarchical or tree-like structure that is similar to a JSON document. That is, even though a user may create a set of documents that belong to a same collection, there are no restrictions that the documents are required to conform to.

As one example of schema building, in MongoDB, suppose a collection which is full of different JSON or BSON objects. In some embodiments, the platform goes through and builds a schema from an evaluation of each and every one of the documents. For example, the platform is configured to build a schema based on an evaluation of the documents in the collection. For example, each and every document in the collection in the source database is scanned to determine what fields (where fields are identified by their field name/access path) are present in the documents, as well as for each field, what types of values are present for that field (as a single field may have multiple values that are of different types in different documents). In some embodiments, the superset of all of those fields and value types that are present in any of the documents in the collection is recorded in a hybrid schema file (which as one example is also in the JSON format). In some embodiments, the hybrid schema is an internal data structure representation of the empirically determined schema of the set of documents in the collection. For example, the hybrid schema is a representation of what the platform has empirically determined to be how data is organized within the documents of the collection. Depending on the documents, the hybrid schema itself may have a recursive structure, as there may be objects inside of documents or arrays inside of documents.

In some embodiments, as part of the process of scanning the documents to empirically determine a schema for the documents in a collection, in addition to recording what types of values a field takes on in documents, the platform also records, in the hybrid schema, how many documents (e.g., BSON—binary encoded Javascript Object Notation—documents) that a given permutation of field path/data type is found/encountered in.

The following are embodiments of generating a hybrid schema (also referred to herein as a document store schema). In some embodiments, to build the schema, the platform evaluates every single document in a collection. In some embodiments, every single document is scanned, as it may be the case that there is a field that only appears in a single document. If any documents are skipped, then this may result in an incomplete schema being determined.

In some embodiments, the process of empirically determining a schema begins with an indication of non-relational data for which a schema is to be empirically determined. As one example, an end user selects, via a UI, a collection of documents to be processed. The user may then request to have an empirical schema determined for the indicated collection (e.g., via a UI). In some embodiments, the platform provides an option to exclude certain portions of a collection from evaluation. For example, there may be certain documents with sensitive information that a user does not want visible or are not relevant, and they have the option to exclude those documents from evaluation.

In some embodiments, the process starts at the beginning of the selected collection. For example, a connection is opened to a collection stored in the source datastore 110, and the platform processes through the collection document-by-document, integrating each document. The MongoDB data may either be hosted on an external entity or self-hosted.

In some embodiments, the platform empirically determines a schema for the collection of documents by scanning the documents to determine the fields and data types within the documents that make up the collection. For example, this scan is performed to determine available fields in the collection, the field types, and how prevalent those fields are.

As described above, the JSON documents may include nested fields and objects, forming a hierarchical structure. In some embodiments, performing scanning of a JSON document includes traversing the tree structure of the document, where objects are either a root node or have a parent node. The process starts with the root node (e.g., the document as a whole), where the platform then scans through the entirety of the document, keeping track of the fields that are found. This includes traversing the JSON data structure and determining (e.g., by parsing) field definitions for fields that are encountered.

For example, the documents are retrieved from the Mongo database using a find function. The platform then parses through each document, traversing the hierarchical tree structure of the document until all of the nodes (fields) in the document are visited and their field definitions catalogued and recorded. As fields may be nested, recursive scanning of the objects in the document is performed. In some embodiments, each document is evaluated one at a time, where the hybrid schema is iteratively updated as each successive document is scanned.

In some embodiments, as a field in the document is visited as part of the parsing, the platform keeps track of various information about the field, such as how many times the platform has hit or encountered that field in the documents evaluated so far (e.g., a field with a particular field definition that includes a key with a certain access path and values of a certain type). As will be described in further detail below, such information is used to determine various metrics and measures, such as prevalence of fields with certain field definitions (e.g., the percentage or proportion of documents that a field definition is found in).

The following is another example of schema building. In some embodiments, the schema building is performed by the schema builder of platform 102. The schema builder accesses and scans through a first document in the collection of interest. This includes parsing the document and traversing the tree structure of the document, as described above.

Suppose as part of the parsing and traversal of the hierarchical structure of the document, the schema builder reaches a field. For example, suppose that starting from the root, the schema builder detects a new type of child object of the document. The new child object of that root is added to the hybrid schema. The schema builder records its path from the root onwards to determine the key's position relative to the root and what level it is in the hierarchy for this document. Metadata information is also determined. In some embodiments, the metadata includes a record or other indication of the types of values that are present for the key (e.g., Boolean, strings, etc.).

In some embodiments, the aforementioned information is recorded in the hybrid schema file. In some embodiments, schema building logic starts with a completely empty schema. In some embodiments, the schema is iteratively built up as documents are scanned, as described above, and the fields identified in documents are integrated one by one into the hybrid schema. In some embodiments, for a field, its path is evaluated against the schema being built to determine where it fits in the existing schema. The schema is then updated, as appropriate. For example, if a field definition (e.g., combination or permutation of field path and data type) already has a matching record in the hybrid document, then this indicates that the field definition has already been encountered before in previously scanned documents, and its hit counter is incremented to reflect that it has been observed yet again. If, on the other hand, there is no existing record in the hybrid schema for the field definition, then this is an indication that this field definition has not been encountered before (and this is the first time it has been encountered), and a new record or entry corresponding to the newly encountered field definition is included in the schema. That is, as documents are scanned and further field definitions are identified, the hybrid schema file is updated.

In some embodiments, each time a particular permutation and field and data type is encountered, information is saved indicating that that field of that type was encountered again. In some embodiments, a running tally is maintained of the number of times it is "hit." In some embodiments, the schema builder also keeps a running tally of how many times everything has been seen. In some embodiments, at the end of the schema building process, when the schema is finalized, after every document has been evaluated, the number of hits is divided by the number of documents that the field was identified in to determine that field definition's prevalence (e.g., for documents that had the field with a given path, the percentage of documents in which that field had a particular data type is determined).

As described above, in some embodiments, tracking of the fields includes recording the full path and the type. In some embodiments, matching is performed based on access path/data type to determine whether a field encountered in a subsequently scanned document has already been observed before (i.e., a corresponding record for the field definition is already present in the document) and is another hit, or is a newly encountered field definition.

As one example, a first document is evaluated. The schema is developed based on the contents of the first document. When a second document is evaluated that happens to have the same field definition (same permutation of field name, access path, and metadata type) that matches to one that had previously been recorded and included in the schema, a new entry is not created in the schema being built.

Rather, this is an indication that this field definition parsed from the current document being evaluated has been previously encountered (e.g., in a previously scanned document). If a new field definition that has not been seen before is detected, then the schema is updated to include an entry for the newly encountered field definition. For example, the hybrid schema is updated with the creation of a new entry for the newly observed field definition.

In some embodiments, the platform saves a field definition for an identified field, where for each combination of field name (key), path (e.g., path to access the key), and value data type (where a single field, such as an array may have multiple data types), its path, its type, how often it appears in documents, and then also if it is an object, which children it has, and if it is an array, what that schema is, etc. is stored. Further examples and embodiments of field definitions are described below.

The following is an embodiment of schema generation. In the following example, a hybrid schema is built up based on a scan of the three example documents shown in FIG. 10.

Figure 11A:
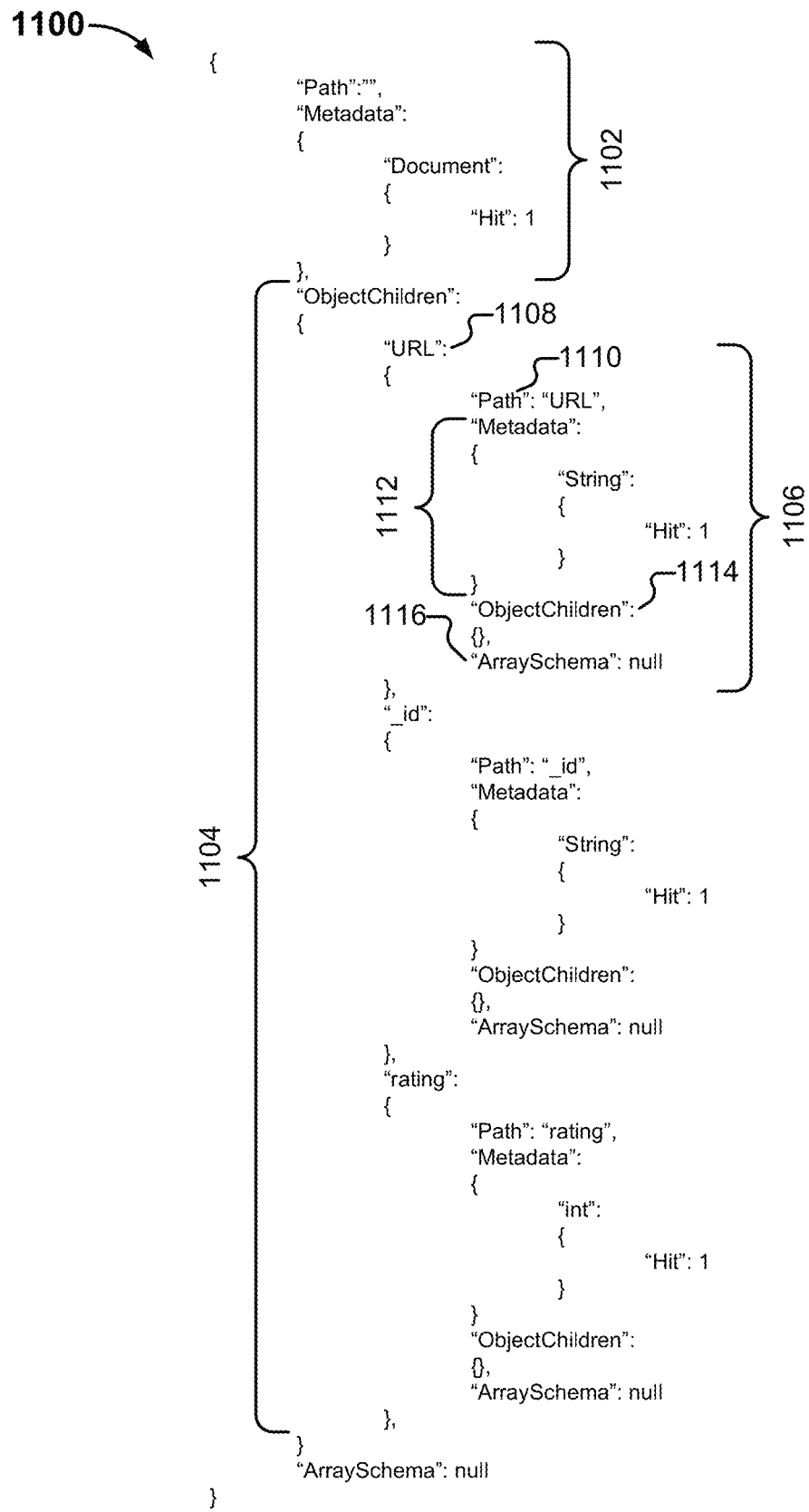
FIG. 11A illustrates an embodiment of a field definition for a field.

FIG. 11A illustrates an embodiment of a field definition for a field. In this example, a first document in the collection of three documents is accessed and evaluated. In this example, suppose that document 1004 is selected first for evaluation. At an initial stage, suppose that the hybrid schema file 1100 is empty. As described above, the hybrid schema file is a file that includes a representation of all fields across all documents in a collection (e.g., a representation of how data is determined to be structured or organized in documents of the collection). In this example, the hybrid schema has a single root level with an empty path. For example, a document in the collection itself is recorded as not having a field name, and has an empty path, as shown at 1102. The document is of type document, and a document of this type, with this path, has now been encountered once.

The schema builder continues from the root of document 1006 and parses and traverses the JSON document, visiting various fields. In this example, the schema builder determines that JSON document 1004 has three child objects, the fields "URL", "_id", and "rating". All three fields are in the same level of the hierarchy of JSON document 1004.

In this example, field definitions are generated for each of the three fields. The field definitions are placed in portion 1104 for recording object children. In this example, document 1004 is a document object of data type document, and it is an object that includes further fields. The child objects are recorded in this section of the field definition for the overall JSON document 1004.

At 1106, an entry corresponding to a field definition for the field "URL" of document 1004 is shown. For the field name "URL" (1108), the access path of the field (e.g., location of the field within the document in which it was found) is recorded at 1110. The recording of the path of a field is used, for example, to differentiate two fields with the same name, but located at different places within the JSON document. For example, the same field name may occur in nested objects in the same document, but the full access name (e.g., access path for the field) should be unique. As described herein, in some embodiments, for child objects, the platform keeps track of them through their paths (e.g., from the root). For example, while the field name serves as a key for the field, the path is used to determine the field's location within a document.

At 1112, metadata for the field is recorded. The metadata includes an indication of the data type for the value of the field encountered in the instance of the document being scanned. For example, each data type that is observed for the given field name with the given path is recorded in the metadata section as a field. In this example, in document 1004, the URL field value is observed to be a string data type, which is recorded in the field definition for the URL field. The number of times that values of that data type for that field have been seen is recorded. In this example, as only document 1004 has been evaluated so far, the URL field, with this combination or permutation of field, access path, and data type, has been seen once, so the "hit" count is set to one.

In this example, the URL field does not include further nested, child objects, and thus the "ObjectChildren" portion 1114 of the field definition for the URL field is empty. If there were child objects (e.g., because the URL field is in turn a document type object that has child objects or fields), then those child objects would be included in the "ObjectChildren" portion 1114, and the schema builder would recursively scan those children objects and create field definitions for them as well. For example, the child objects would be further similarly scanned to determine all of the fields in the child(ren) objects, where the field definitions for fields in the child objects are recorded in a similar manner to as described herein.

Because the URL field is also not an array type, then there is no array schema to be determined for this field, and the "ArraySchema" portion 1116 of the field definition of the URL field is set to "null." If the field were an array type, then the schema of the array would be determined. This includes evaluating the elements of the array, determining the types of values present in arrays of this name with this path, and for any fields or objects in the array, determining a corresponding field definition in the manner described herein. Further details regarding determining array schemas for array type objects are described below.

In the example of FIG. 11A, the schema file is written to include field definitions for the other two fields of JSON document 1004, "_id" and "rating" as they are encountered as part of the traversal and parsing of the JSON document. Note that in this example, "_id" is of type string, and "rating" is of type int.

As described above, in some embodiments, documents in the collection are evaluated one-by-one, and the hybrid schema is iteratively updated as documents are successively processed and scanned. Continuing with the example of FIG. 11A, suppose that a second document, document 1002, is subsequently evaluated after document 1004 is scanned. In this example, based on the scanning, the hybrid schema 1100 is updated, as shown in the example of FIG. 11B.

FIG. 11B illustrates an embodiment of a hybrid schema. In this example, the second document 1002 is subsequently scanned, and the hybrid schema file is iteratively updated accordingly. In this example, at the root level of the collection, document 1002 is also a document type, and it is recorded at 1112 that a document type object has been seen twice now during the schema building process.

Similarly to as described above in conjunction with FIG. 11A, document 1002 is scanned to determine all of the fields within document 1002, and how they are structured or organized within the document. In some embodiments, when a field is visited as part of the parsing and traversal of document 1002, the field definition for the visited field is determined. The schema builder then determines whether this field definition has been previously observed, or is a newly observed field definition. In some embodiments, the schema builder makes this determination by comparing the field name/access path and the data type of the field under evaluation to existing fields in the hybrid schema 1100.

For example, consider the "URL" field in document 1002. In this example, in document 1002, the access path for the "URL" field is "URL", and is of type string. The schema builder is configured to take the field definition of the field under consideration and compare it against the existing field definitions (e.g., permutations of field path/data type) in the schema file. In this example, this field definition, with its particular permutation of path and data type, matches to the existing field definition in 1106 (e.g., matches on both field access path and corresponding value data type).

As such, this is not a newly observed field definition, and instead of creating a new entry in the hybrid schema file, the hit count for the field is updated to now be two (as it has now been observed or encountered twice, in two documents). Similarly, for the field "_id" in document 1002, its permutation of path/data type also matches an existing permutation of path/data type in hybrid schema file 1100, so the hit count for that field definition in the hybrid schema is also incremented by one.

Now consider the "address" field in document 1002. Its field definition has a path of "address" (compared to the root), and it is of data type string. Document 1004 did not have this field, and the hybrid schema so far (as shown in the example of FIG. 11A), does not include such a field definition for this permutation of field name, access path, and data type. (There is not a record for a field with this access path at all). That is, "address" is a new field that has not been encountered before. The hybrid schema is then updated accordingly.

As shown in the example of FIG. 11B, because the "address" field is at the first level of the document, just below the root, the ObjectChildren portion 1104 is updated to include its field definition. For example, the ObjectChildren portion 1104 is updated to include field definition 1114. As this is the first time this specific permutation of field name, access path, and data type for this field has been encountered, its hit count is set to 1.

Now consider the "rating" field in document 1002. Although the "rating" field also existed in document 1004, and has the same field name and access path, the data types for the field in the two documents is different. For example, in document 1004, the rating is an int (integer) data type. In document 1002, however, the rating field is of the string data type. That is, document 1002 also includes a "rating" field object in the same location as in document 1004, but is of a different data type.

In this example, the access path for the "rating" field in document 1002 matches the access path for the "rating" field definition that already exists in the hybrid schema, as shown at 1116. However, while the access path matches, the data type for the "rating" field in document 1002 does not match to any existing data types previously encountered (and recorded in the hybrid schema). The field definition for the "rating" field in the hybrid schema is then accordingly updated, as shown at 1116. For example, in this case, the field name/path of the "rating" field in 1002 is determined to match to the field name and path of the existing field definition 1116 in hybrid schema field 1100. In this case, to account for the variation in encountered data type, the metadata portion of this field definition record in the hybrid schema file is updated. For example, as shown at 1118, the metadata portion of the field definition is updated to include a record that the value for this field has also been observed to be a string type in a document, and that this permutation of data type for the field with this name and path has been observed once so far. Thus, so far, across the two documents, the "rating" field (with the same access path or location in both documents) has been observed to be an integer once, and a string once. That is, such a "rating" field has been detected or observed to be organized in the same way within two documents (with the same access path), but with different data types for their values (one int and one string).

Continuing with the example of FIG. 11B, suppose that after scanning documents 1004 and then 1002, now document 1006 is scanned. The hybrid schema file 1100 is then iteratively updated by the schema builder to the state shown in the example of FIG. 11C.

FIG. 11C illustrates an embodiment of a hybrid schema. In this example, at the root level of the collection, document 1006 is also a document type, and it is recorded that at a root level of the collection, a document type object has been encountered three times now during the schema building process.

In this example, the instances of the "URL" and "_id" fields encountered in document 1006 have field definitions (field name, access path, and data type) that match to existing field definitions in the hybrid schema, and the hit counters for those two field definitions are incremented to both be three (as such permutations of field path and data type have been encountered three times so far).

In this example, document 1006 also includes an instance of an "address" field, whose field name and path match to an existing field definition. However, whereas the address field in document 1002 had been a string, in document 1006, it is a string. Thus, a new permutation of field name/path and data type has been encountered. Based on this, under the "address" field definition (because there is a match on field path), the metadata portion of the "address" field definition 1122 is updated to indicate that an integer type "address" field has also been encountered (once so far), indicating that the "address" field with this path configuration has also been observed to take on an integer type value.

Now consider the "rating" field in document 1006. Although the name/path of its field matches to the field/path of existing field definition 1124 of the hybrid schema, the data type for the "rating" field in document 1006 (which is a double) does not match to any of the existing data types for the field seen so far (where only an int type and string type had been observed in the first two documents 1004 and 1002). Thus, a new permutation or combination of field path and data type has been encountered, and because it is the data type for the value that is newly encountered, the metadata portion 1124 of the "rating" field definition is updated to include a record that a "double" type value has now also been observed (now once so far), as shown at 1126.

Thus, as shown across the examples of FIGS. 11A-11C, the state of the schema file is iteratively updated as documents in a collection are scanned. The hybrid schema is then further updated as needed as more documents are scanned. For example, while three documents of a collection were described in this example for illustrative purposes, the collection may have many more documents, each of which would be scanned by the schema builder, with the hybrid schema updated according to what is identified in the documents in the manner described herein.

In some embodiments, upon completion of the scan of the documents of a collection, the "hit" counts for the observed data types are converted to percentages based on the number of times this field name with this path was seen in documents, and the proportion of times that this particular permutation of field path and data type was seen. For example, the percentage of documents that field with a given access path is determined. The percentage of encountered instances of a field for which the value for the field is of a given data type is also determined.

Handling Arrays and Nested Objects

A field within a JSON document may have data type values that in turn include other types of nested fields. For example, arrays and documents may include further nested fields. In some embodiments, the schema building also recursively evaluates nested fields to empirically determine their schema.

For example, as shown in the above examples of FIG. 10, a document is an example of an object that has child objects. The schema builder is configured to recursively evaluate such document objects, and scan their child objects. For example, if a field is a document object with further fields, than the nested structure of the document type filed is further evaluated. For example, as described above, in some embodiments, the schema builder recursively scans nested objects to determine their schema and enumerate all of their fields and determine their corresponding field definitions (which are, for example, included in a "ObjectChildren" portion of a field definition, as described above). If there are object children, then the schema building processing is performed recursively. In the example of FIGS. 11A-11C, the "URL", "_id", "address", and "rating" fields are examples of object children that are nested within document objects (that happen to be at the root level of a collection). For example, any child objects are further similarly scanned to determine all of the fields in the child(ren) objects, where the field definitions for fields in the child objects are recorded in a similar manner to as described above.

Another example data type that a field can take is an array. The elements of an array can be a mixture of data types. In addition to being strings, integers, etc., an element is potentially another object, such as another field (name-value pair), or nested array or document. The arrays can also be arbitrary length. Even if two documents in a collection have arrays with the same names and the same paths, the composition of the elements of the arrays may be different.

As described above, the field definition in the hybrid schema also includes a section or portion for recording an array schema. This is populated if, for example, the field is of data type array. The schema of the array is then determined by scanning the elements of the array. The individual elements of the array may be of any data type, including additional arrays or documents/objects. Each of the individual elements is evaluated, and field definitions created if needed.

In some embodiments, if a field is an array, then determining the field definition for the array includes recursively scanning the elements of the array to determine a schema for the array. In this way, the structure of arrays (e.g., the way in which data is organized in arrays) in the documents of a collection are also empirically determined. That is, the array schema describes all of the elements seen across all of the instances of this array (with this name/access path).

In some embodiments, when an array is detected, the platform is configured to empirically determine a schema or structure of the array. In some embodiments, the array schema is determined based on an evaluation of the data types of the elements of the array. In some embodiments, if all of the elements in an array are of the same data type, then the array is flattened to a single schema. For example, each element of an array could potentially be of a different data type, and thus each have a different field definition. The platform performs an element-by-element evaluation of the data type for each element in the array. If the data types are all the same, then there is a single schema that has been determined for the array, which is that it is an array of strings. If the array is a mixed data type array, where the composition of the data types of the elements in an array with such an access path is varied, then the different types of elements encountered within arrays with that access path are also recorded in the field definition of such arrays. For any elements that are documents, their child objects are scanned. For any elements that are arrays, the schema for those nested arrays is also determined.

FIG. 12A illustrates an embodiment of a hybrid schema. In this example, a portion of a hybrid schema file is shown. In this example, one of the fields encountered in the scanning of documents in a collection is an array named "string_arr", which, when it appears, has the path "string_arr". A field definition for this array field is shown at 1202. As shown in this example, the metadata for the string_arr field indicates that it is an array data type. Accordingly, the arrayschema portion of the field definition is populated with information regarding the schema of arrays with this array definition that have been encountered in documents. In this example, the path used to access the elements of the array is "string_arr[ ]" In some embodiments, all elements of the array are evaluated. The data type for each of the elements is recorded in the metadata portion of the arrayschema (which enumerates all of the elements and fields within the array). In this example, in all instances in which an array with this array definition was encountered, all of the elements were strings.

In this example, the array schema definition further includes, for the elements of the array, a path specification, metadata indicating the different data types of elements for such arrays when present in documents, a portion to record child objects (e.g., if an element was found to be a document), as well as a further portion to describe the schema of any elements that were found to be nested arrays.

In this example, the path specification is "string_arr[ ]", with brackets. In this example, the brackets do not specify a specific index, and the array schema lists all types of elements that have been encountered, regardless of their index.

Another example of a schema for an array is described in conjunction with FIG. 12B. FIG. 12B illustrates an embodiment of a hybrid schema. In this example, a portion of a hybrid schema file is shown. In this example, a portion of a hybrid schema pertaining to a definition of an array field with the name "acquisitions" and with a path "acquisitions" is shown. Examples of two instances of JSON documents that this portion of the hybrid schema represents are described below.

```
{
    "_id": 1234,
    "acquisitions": [{"price_amount": 2}, {"field": "name"}]
}
{
    "_id": 1235,
    "acquisitions": [{"test": 4}. {"price_amount": null}]
}
```

As shown in the above two example JSON documents, both include an array with the same name and access path (e.g., both documents have arrays of the same name in the same location). Both of the arrays include document type elements. For example, both include documents with the field name "price_amount". These are child objects of the array. One difference between the "price_amount" elements in the two arrays is that one has an integer type value, and the other has a null data type.

The variations in the "price_amount" element of the "acquisitions" document, and the structure of there being a nested object in arrays of this permutation of path/data type are recorded in the example hybrid schema shown in FIG. 12B. For example, the hybrid schema is built to reflect that such arrays, when encountered, have only documents inside of them. As documents are objects, the "ObjectChildren" portion of the arrayschema is accordingly populated. In this example, it has been found that such arrays have nested within them a child object document with the name "price_amount", and which has been observed to have values of two different data types. The "ObjectChildren" portion for this array schema is built to show that the price_amount element for such arrays is an int32 some of the time, has been observed to have been "Null" other times, has been observed to be an int64 sometimes as well, etc.

If the instances of arrays with this unique path configuration had been of mixed data types, such as documents and strings, this would also be reflected in the arrayschema portion. For example, the "Metadata" portion of the "ArraySchema" would be updated to include not only "Document," but also a "String" entry to indicate that in scanned instances of this array, string elements were also encountered.

In some embodiments, the hybrid schema does not record, on an index-by-index basis, what data types have been encountered for a specific index. This allows for matching (e.g., by path into the array) to be determined regardless of where a field or type of element was found in an array. For example, the "price_amount" document was in different indices of their respective arrays in the two example documents above. In this example, both access paths for the "price_amount" fields are allowed to match (as indicated by them matching on "acquisitions[ ].price_amount"), even though their corresponding indices in their arrays were different. That is, the hybrid schema allows matching of element paths in an array regardless of their index. As another example, if for an array in a first document, a field of a certain type was found at index 0 of the array, and for a second document that also has an array in the same location, the same field of the same type was found at index 5, the same field/data type is determined to have been found in the same array field definition, and the hit count for that field/data type in the array is incremented. That is, in some embodiments, the indices are ignored. In other embodiments, the different elements found at each index are recorded, but may be ignored when performing matching.

The following is another example of a scenario supported by the hybrid schema described herein. If there are fields that hold information themselves (e.g., guids), a user may specify a limit at which the platform collapses all of the fields into one field in the schema, so that instead of the hybrid schema having 10000 children of different guids, it will have 1 child that is identified by, for example, "TONIC_COLLAPSED_OBJECTID_KEY***"

Privacy Scanning

In some embodiments, as the schema builder of the platform parses a document for its various fields (and determines field paths, field names, value data types, etc.), the platform also determines whether the values are privacy data.

As one example, the platform evaluates the names and values of fields as they are parsed to determine whether they are indicative of privacy data. One example of a type of privacy data that the platform monitors for is zip codes. For example, the platform uses a library to evaluate field names and values to determine whether they are zip codes. If so, then that field/value is flagged by the platform and suggested as including potential PII. Other types of privacy data may also be monitored-for as part of the schema building process.

As shown above, in some embodiments, the schema building process starts from the first document to determine a schema for that document and then the schema is built iteratively. For example, the document may have a nested or hierarchical structure. After the first document is scanned, the schema building process obtains a next document. The schema so far is updated based on the contents of the next document. It is determined whether a field definition is already present in the current schema. If so, then a count for the field is updated. If such a field definition has not been encountered before (i.e., is not already present in the hybrid schema), the schema is updated to include a new entry in an appropriate location of the schema being built. In some embodiments, the hybrid schema that is built is stored. As one example, the hybrid schema file is stored in a database. As another example, the hybrid schema is stored in memory.

Generating a Hybrid Document

As described above, in some embodiments, the platform is configured to provide a navigatable user experience to the user to allow them to visually understand the manner in which data is organized in documents of a collection, and then to also apply generators to fields in the UI that can then be applied to all matching fields in documents of the collection.

In some embodiments, in order to provide such a navigatable experience, not only is the empirically determined schema visually presented to users, but examples of permutations of field path and data type are also provided. For example, whenever a user indicates that they would like to see their collection, their different documents are gone through, and the hybrid schema is saturated with examples to generate a hybrid schema. For example, a hybrid document is generated from the hybrid document store schema. In some embodiments, when the example values are added in, the hybrid schema becomes the hybrid document.

In some embodiments, the hybrid schema is used to find example values for identified fields via a process referred to herein as "saturation," where saturation involves, for example, finding example values. This provides a visualization for end users benefit. For example, while users may technically be able to do various processing without these examples, such a hybrid document view that is displayed in a UI allows users to view example values for various fields, which may be beneficial if they are unable to remember what are common examples or how certain fields are formatted.

The following are examples of performing saturation for an empirically determined schema. In some embodiments, a subset of documents in the source collection is first accessed and used to attempt to saturate the schema with values from that subset of documents.

As one example, a subset of the documents in a collection (e.g., the first hundred, or first thousand documents) is obtained from the user source database. That subset of documents is then stored locally as the platform evaluates them and finds and places example values in the hybrid document. In some embodiments, the documents are loaded in memory as a stream and then each is released when processing on them is completed. This provides a way for the platform to have a subset of the documents to operate on locally.

In some embodiments, the example values are built off of the hybrid schema that had been created. For example, the documents in the obtained subset are evaluated to determine where actual values in those documents fit in the hybrid schema. In some embodiments, the schema is modified to include an examples field. In some embodiments, when performing saturation, everything that can be obtained from that document that is being evaluated is extracted and placed into matching locations in the schema. The next document is then evaluated accordingly.

If a sufficient number of examples is not found in the local cache/subset of documents, then in some embodiments, the platform then goes back and queries the source database to look for examples. For example, the platform (via a saturation engine or hybrid document creator) queries a document in the collection for a value at a field access path included in the hybrid schema That is, in some embodiments, for whatever fields for which the subset does not include example values, the source collection is queried for example values. By initially evaluating a subset of documents to determine example values, the number of times that the user source database is hit or queried may be minimized.

The following are further embodiments of saturating an empirically determined schema with examples.

In some embodiments, the hybrid document builder takes as input the empirically generated schema. In some embodiments, the schema examples builder is configured to integrate documents. For example, the document integration takes as input a BSON document. The document integration logic traverses the elements of the BSON document. In some embodiments, while there are any elements or fields, the logic traverses it, adding information to the schema. For example, the hybrid schema is updated to include examples of actual values extracted from the document being integrated, resulting in a hybrid schema with examples.

As described above, given a built schema, a subset of documents (e.g., 100 documents, or any other number of documents, as appropriate) is obtained. A document is evaluated, including determining what all the elements or keys are, and for each element, its definition (e.g., path and data type) are determined. The document store schema (hybrid schema) is traversed to determine where in the schema that element is located (based, for example, on path/type). The document store schema is then updated with actual values from the document that are placed as examples for that corresponding permutation of path and data type in the hybrid schema.

In some embodiments, after integration of those documents, a threshold is applied, and if any of the permutations of field path and data type have not met the threshold, then the examples builder specifically looks for values corresponding to that field path and data type (for example, by querying the source database). In some embodiments, the platform will attempt to find values for elements or fields that do not have enough examples. For example, for permutations of field path/data tyle that do not have sufficient examples, the platform will evaluate individual documents for example values. As this results in queries to the source database, which may be resource intensive, this is a feature that can be toggled on or off.

In some embodiments, end users have the option to disable such thresholding functionality, as, for example, there may be a certain field/data type that only exists in a single document, and all of the documents would have to be scanned in order to determine whether it has any other examples. This can be resource-intensive.

FIG. 13 illustrates an embodiment of a saturated hybrid schema. As shown in this example, for a name field that has been found in documents of a collection, the name field has been found to be both strings and integers. (382 times as a string, one time as an integer). Examples (obtained from documents) of string type values for the name field with that path (specific permutation of the "name" field with path "name" and of the string data type) are shown at 1302.

In some embodiments, the hybrid document provides a full listing of all fields that are in the documents in the source collection, including example values for each permutation of field and data type. The saturated hybrid document is then used to generate a user interface and navigatable experience to the user.

FIG. 14 illustrates an embodiment of a hybrid document view. In this example, a portion of the hybrid document view is determined based on the hybrid schema of FIG. 11C built from the documents described in conjunction with FIG. 10. In this example, a visual representation of the keys recorded in FIG. 11C are shown, such as the "URL" key and the "_id" key. Further, the "address" key and the "rating" key are also shown. The different data types encountered for values of the "address" key and the "rating" key, which were recorded in the schema of FIG. 11C, are also shown at 1406 and 1408, respectively. As described in conjunction with the example JSON of FIG. 10, although all three documents have the same field "rating," with the same path, they are all of different data types. The example interface of FIG. 14 summarizes the rating field, reflecting that the rating field is represented with three different types, either as a double, an integer, or a string. Further, in this example, the system, based on an evaluation of the database, also determines the frequency of such occurrences in the documents, which may also be rendered. This is beneficial, as it allows users to handle these different variations in different ways.

In the example of FIG. 14, a full list of keys is shown on the left. Examples values are shown at the right. In this example hybrid document view, the key list reflects all of the permutations of every field (and type) from every document in the scanned collection. For example, a field might sometimes be a double and sometimes a string. The hybrid document allows the user to visualize both types.

As shown in this example, in some embodiments, the positioning of a field within the hybrid document view is based on its path (which is recorded in the hybrid schema). For example, the path indicates where such a permutation of field path/data type has been found to be located within one or more documents, and indicates the amount of nesting for a field. That is, the hybrid document is rendered to represent the nested level of a field.

As described above, in some embodiments, for each unique field definition, the platform records the number of times that field definition has been observed. The number of "hits" may be used to determine various other metrics. As one example, the sparseness or presence of keys is determined and presented. This allows the user to determine that for a given field with a certain name/access path, how often it appears as type int32, versus type object, for example. This is beneficial, as for some fields, multiple types of values may be specified. Further, the variation becomes increasingly complex (with arbitrary complexity) as there may be arbitrary arrays and nested documents. In some embodiments, the percentages are determined for a subset of the documents (e.g., first 100 documents in the collection).

In some embodiments, the platform provides user interface views on a document-by-document basis. For example, a schema representation of each document is provided for viewing. A user may page through different documents, which may have different sets of keys. For example, while one document includes short description and long description, another document may not. This may be reflected in the hybrid document, which may show, for example, that long description is only in 61% of documents, and that short description is in 37% of documents.

Performing Synthetic Data Generation Using the Hybrid Document

As described above, rendering the hybrid document view in a user interface allows the user to not only visualize the way in which data is organized in the documents of a collection, but also provides the user a centralized location from which to apply transformations to various permutations of fields and data types located across various documents. The following are embodiments of performing synthetic data generation via a hybrid document view.

Via the displayed hybrid document views, users may configure various transformations to be applied. The transformations, such as privacy protecting transformations, are determined based on the empirically determined schema. For example, via the hybrid document view, the user can view the fields in a selected collection. The user, via the UI, may then assign generators to various fields. If a field has multiple data types, then the user can specify which specific data types for the field a generator is to apply to.

The following are embodiments of generators for handling databases such as MongoDB. In some embodiments, the generators are configured to handle arrays. For example, while arrays exist in SQL, they are typically significantly less used. Arrays are typically more common in JSON documents.

FIG. 15 illustrates an embodiment of a hybrid document view in a user interface. In this example, a structured view of the fields identified in the JSON documents of a source collection are shown. As shown in this example, the platform has taken in numerous documents and collapsed them into a single view for all of the documents that accounts for the various different types of fields that have been determined to be included in the documents.

Via the hybrid document view shown in this example, a user such as Alice may perform the same types of operations as described above in conjunction with relational data, such as applying various generators. This may include performing operations such as replacing names. The generators may involve the use of dictionaries such as that described above, or may be based on statistical examination of the source database.

In this example, a user such as Alice has configured her generator rules and the fields on which the transformations are to be applied (e.g., applying a random integer generator for pageCount, random timestamp for publishedDate). As another example, for the key "_id," which has been found to have values of different data types in documents (e.g., mixed data type field), Alice has specified that she would like to apply an integer key generator specifically to those instances of the "_id" key where the values are of the integer data type. That is, a user, when determining what field to apply to a generator, can also specify the specific permutation of field and data type to apply the generator to. Alice may then proceed to issue a command to generate synthetic data, which is then executed by a set of workers of platform 102. As shown in this example, although there are multiple documents in the collection, Alice is configuring transformation from a single, centralized view of all of the fields of the documents.

In some embodiments, the hybrid document has information on all of the fields. In some embodiments, a separate call is made to obtain all of the possible generators for each field. In some embodiments, when a user specifies a generator for a particular field definition (field with a certain combination of field path and data type), the corresponding field definition of the hybrid document is updated to include the rule or generator to be applied.

The following is an example of applying transformations. In some embodiments, each individual document in a collection is compared to the hybrid document and it is determined what are the rules for all the fields in this document. For example, for a document with the "_id" key that has a value of data type int 32, then the generator is applied. If, however, another document also has the same "_id" key with the same path, but is an ObjectID, then the integer key is not applied. The underlying schema for any document is not changed. Rather, it is passed through the filter, resulting in, for example, the same amount of sparseness in the destination data.

As the unique permutations of field definitions (name, path, and data type) are all shown in the hybrid document, with examples, the user may then determine the appropriate generator to apply.

As shown in the example above, a user may apply a generator to a permutation of a field name and data type. The platform then identifies all instances of fields with that field definition across the documents in the collection, and applies the generator. For example, suppose a field with a field name that has been found in different documents, to be both an integer type and a string type. For example, suppose that in two documents, the field is a string, and in a third document the field (with the same field access path) is an integer. Suppose that via the hybrid document view, the user selects to apply a character scramble to any instances of the field that are of the string data type. In this case, based on the indication of the generator selected by the user, and the selected field and data type, the platform automatically applies the same generator to all instances of the field that are of that string type, and does not apply the generator to the instances of the field that are of the integer data type. In this way, the platform groups together all instances of a key that have the same field definition in documents of the collection.

In some embodiments, a set of documents is taken and each document is treated individually and is de-identified based on rules that have been written which come from the superset of the structure. In some embodiments, relationships across documents may be determined. In some embodiments, sub-setting may be performed on databases such as MongoDB.

Applying Generators to Arrays of Mixed-Type Elements

As described above, the elements of an array may be of mixed data types. Thus, a generator applied to an array may only be relevant for some of the values.

In some embodiments, if all of the elements of an array (to which a generator is to be applied) are all of the same data type/format, then the same generator is applied to every index of that array.

Suppose though, an array that has mixed data type elements, and has some strings, some numbers, and some nulls. Suppose that a generator that scrambles characters in strings is to be applied to perform obfuscation. In some embodiments, a generator is associated with a type of data it is permitted or able to transform. For example, the character scramble generator is associated with the string data type. In this example, based on the permitted data type of the character scramble generator, the platform is configured to limit application of the character scramble generator to only those elements of the array (in a document) whose elements are of the matching string data type. That is, all of the strings are scrambled, but non-strings are not scrambled. In this way, even if the user applies a generator more generally to an overall array, the platform includes logic for intelligently applying a generator to only those elements applicable to the generator (e.g., based on matching data type).

In some embodiments, if an array includes multiple data types, then the hybrid document also includes a visual representation of the array, showing, for each index of the array, the data types found at that index of the array. In some embodiments, the platform provides an option to select generators for individual indices or elements of the array. In some embodiments, if a user selects to apply a generator to a specific value of the array, the platform automatically applies the same generator to all other values of the same data type.

In some embodiments, grouping is performed, such as by type. For example, consider the application of a categorical generator to an element of an acquisitions array. In some embodiments, the generator is adapted to find all matching elements (e.g., the group of elements that match to what the generator was applied to).

Figure 16B:
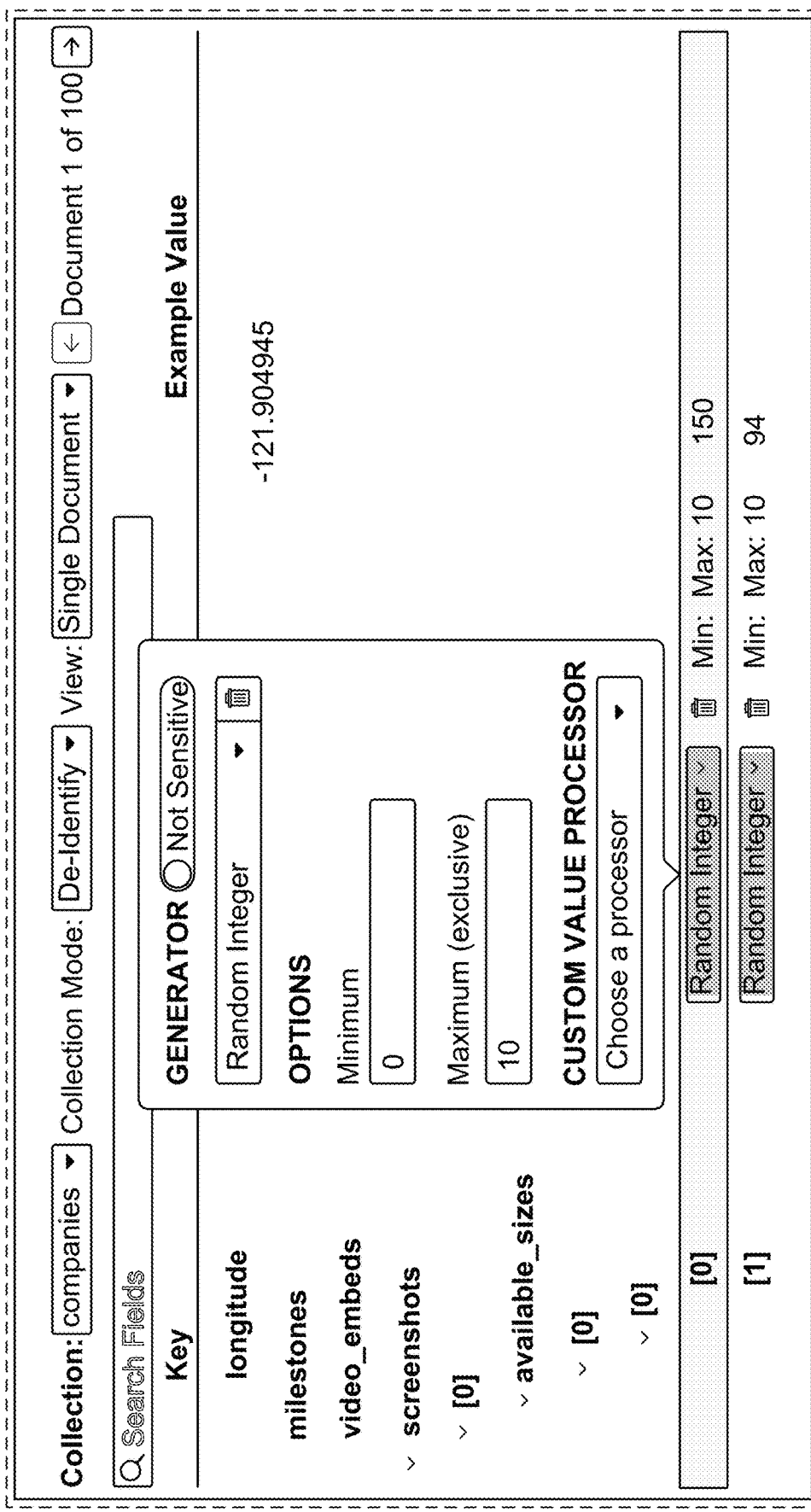

FIGS. 16A-16C illustrate embodiments of interfaces for applying generators to arrays or array elements.

If, as shown in the example of FIG. 16A, the generator is put on, for example, acquisitions array, and then a child of that array, the platform is configured to determine more matches by unwinding all of the documents, so that it can then group them and aggregate on that.

Arrays can have any number of elements. As described above, in some embodiments, indices are ignored. For example, instead of looking at a certain path, a path expression is evaluated, such as acquisitions. acquired_year.

The path expression may match a variety of different paths. For example, acquisitions. acquired_year and acquisitions. acquired_year are all valid matching paths, where the use of the path expression acquisitions..acquired_year allows for matching on any index.

In some embodiments, when applying the categorical generator, if the generator is being applied to an array, the path that is matched on is expanded to allow any index in the array to match. For example, when performing path matching, matching on any index is allowed when determining what elements to apply the generator on.

As another example, suppose adding of a random integer generator, as shown in the example of FIG. 16B. In this example, the random integer generator is automatically applied to all elements that would match, regardless of their index or position in an array, as shown in the example of FIG. 16C.

In some embodiments, the platform provides generators which obtain statistics from the input database. The categorical generator is one such example. In some embodiments, the categorical generator is configured to collect information about what is stored, and for each of the six example generators that have been added in the example of FIG. 16C, the generator will look at all six of these, plus over every document. The generator will then use those to choose how it will mask.

As described above, in some embodiments, the hybrid document represents a sum or accumulation or aggregation of all documents. In some embodiments, without such a hybrid document, operating on source data may be challenging. For example, suppose that there is not a hybrid document. Suppose that one document has a name field, and the other document has the name misspelled. Without a hybrid document, it would be challenging for a user to become aware of such a misspelling. The hybrid document described herein provides an overview of all of the possible fields that every document has, allowing a user to more easily understand and comprehend the data.

Truncating Collections

In some embodiments, the platform provides the ability to truncate collections. This is available also for SQL databases, as well as databases such as Mongo. In some embodiments, this includes not copying over certain information. In some embodiments, when truncating is performed, only the collection structure is included in the destination database, where the collection has no data in the destination database.

The following is an example of truncating. Suppose an end user has an old collection that is no longer being used and the end user does not need it for testing, but the end user does not want to just delete it in their source. In some embodiments, the platform provides an option that the user can select so that the collection may be truncated so that it is not copied over and then it does not take up space in the output that will be used.

Other modes may be available for collections. For example, in some embodiments, the table modes described above may be variously adapted to accommodate collections.

Detecting Schema Changes

In some embodiments, performing schema building includes evaluating every document. As this may be a more resource-intensive process, in some embodiments, the schema building process is limited to when, for example, a privacy scan is performed, or a generation is run.

In some embodiments, if a document were added to the input data that has new fields, the system detects such a change and may also alert a user to indicate the presence of new fields. In some embodiments, when the schema building is re-run, the schema is rebuilt from the start, as any document in a collection could have been changed.

With relational databases such as Postgres, MySQL, SQL, etc. that include structured data, determining such changes may be relatively easy as there are tables that have an upfront schema, where the database can be queried for the schema for a table, in which case the database returns a set of columns. The system may then perform a comparison to determine the presence of any new columns, and then provide an alert in some embodiments.

In some embodiments, in order to determine changes to non-relational data, such as in MongoDB, each document in the data store is evaluated to determine changes (as a user could have made a change, for example, to add a field in any of the documents in the collection).

In some embodiments, performing such a scan is performed as infrequently as possible. In some embodiments, when such a scan is performed, bookkeeping is performed by the system. When scanning, touching of every document is taken advantage of to ensure that the hybrid schema document is updated so that users may be alerted to any potential changes in the schema, alert the user to any new PII that may have been identified, etc. That is, the hybrid schema/document described herein may be used to power various user interfaces (e.g., views for generating synthesized data, applying categorical generators, etc.), as well as detect when schemas change and provide alerts when such schema changes are detected. In some embodiments, the hybrid document may then be read and then whatever generators are appropriate for that document may be applied before writing to the destination database.

In some embodiments, optimizations can be performed if settings on the source database are configured to allow follower functionality to determine what has changed since the last time the database was interacted with. This is in contrast to, for example, a SQL database, where the schema can be determined quickly, because the database keeps track of the schema.

Non-Relational Data in Relational Databases

In the above examples, an empirical schema was determined for non-relational databases. In various embodiments, the schema determination techniques described herein may be variously adapted to accommodate schema determination for non-relational data in relational databases as well.

For example, a relational database may have a column that is for JSON data type fields. In some embodiments, rather than receiving an entire collection, the platform ingests and reads the JSON column, and then proceeds to scan each of the elements (rows) of that column to empirically determine a schema for the column. Rather than reading from a non-relational database, the non-relational data is read from a portion of a relational database. For example, the platform processes a document in a JSON field in a table, or in a JSON column in a table. The scanning techniques described herein are then utilized to scan those documents, where the hybrid schema/document is then updated accordingly, based on the field definition (e.g., tracking of path for a field and data types of values for the field).

In the case of non-relational data in a relational database, the path will have a different structure or format as compared to if the source database is a non-relational database. For example, the path would be a mix with the schema table and column to indicate what the column is, and then further within the path is a JSON path descriptor for a field. For example, for a non-relational field, its path and type are recorded, where the path also now includes a column and table.

In some embodiments, if a JSON field is updated in the relational database, then a full scan is also performed of the non-relational data to determine any schema updates.

Figure 17:
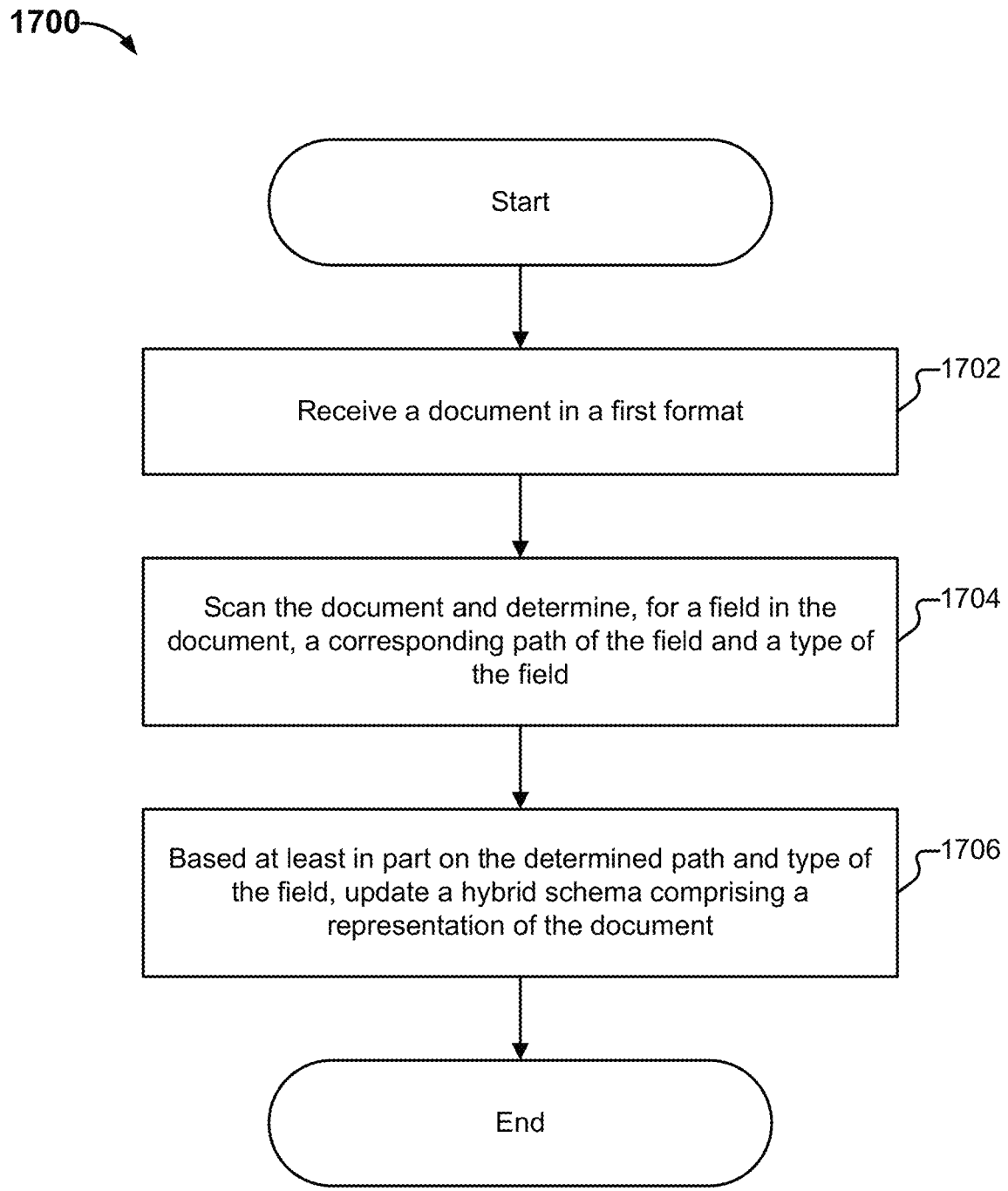
FIG. 17 is a flow diagram illustrating an embodiment of a process for generating a hybrid schema.

FIG. 17 is a flow diagram illustrating an embodiment of a process for generating a hybrid schema. In some embodiments, process 1700 is executed by platform 102. The process begins at 1702, when a document in a first format is received. For example, the document is a JSON or BSON document. The document may be part of a collection, or the value of a column in a relational database. At 1704, the document is scanned to determine, for a field in the document, a corresponding path of the field and a data type of a value of the field. At 1706, based at least in part on the determined path of the field and the data type of the value of the field, a hybrid schema is updated. For example, if a record corresponding to the combination of field path and data type exists in the hybrid schema, then a count of the number of times that that combination of field path and data type has been encountered is incremented. If, on the other hand, a record of this combination of field path and data type does not exist in the hybrid schema, then the hybrid schema is updated to include a record or entry corresponding to this newly observed combination of field path and data type.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
scan a source database, wherein scanning the source database comprises:
enumerating column names in the source database; and
recording whether a column in the source database is an existing foreign key;
determine and display, in a user interface, a set of candidate foreign keys, wherein the set of candidate foreign keys is sorted at least in part by tracking a number of tables that a column name corresponding to a candidate foreign key appears in;
determine and display, in the user interface, a set of candidate primary keys;
receive a request, via the user interface, to generate a virtual foreign key relationship between a selected candidate foreign key and a selected candidate primary key, wherein the virtual foreign key relationship is generated as an additional foreign key relationship to augment existing foreign key relationships codified in the source database;
in response to receiving the request to generate the virtual foreign key relationship between the selected candidate foreign key and the selected candidate primary key, generate the virtual foreign key relationship at least in part by generating a record for the virtual foreign key relationship, wherein the record for the virtual foreign key relationship is stored externally to the source database in which the existing foreign key relationships are codified; and
generate, based at least in part on the source database, a destination database at least in part by accessing an existing foreign key relationship codified in the source database and accessing the record for the virtual foreign key relationship stored externally to the source database, wherein foreign key constraints associated with both the existing foreign key relationship and the virtual foreign key relationship are enforced when generating the destination database; and
a memory coupled to the processor and configured to provide the processor with instructions.

2. The system recited in claim 1, wherein the set of candidate foreign keys is sorted by frequency in the user interface.

3. The system recited in claim 1, wherein the virtual foreign key relationship is editable.

4. The system recited in claim 1, wherein the existing foreign key relationship codified in the source database is locked from modification.

5. The system recited in claim 1, wherein the destination database comprises a scaled version of the source database.

6. The system recited in claim 1, wherein the destination database comprises synthetic data generated at least in part by transforming source data in the source database, and wherein what source data is transformed is based at least in part on the virtual foreign key relationship.

7. A method, comprising:
scanning a source database, wherein scanning the source database comprises:
enumerating column names in the source database; and
recording whether a column in the source database is an existing foreign key;
determining and displaying, in a user interface, a set of candidate foreign keys, wherein the set of candidate foreign keys is sorted at least in part by tracking a number of tables that a column name corresponding to a candidate foreign key appears in;

determining and displaying, in the user interface, a set of candidate primary keys;

receiving a request, via the user interface, to generate a virtual foreign key relationship between a selected candidate foreign key and a selected candidate primary key, wherein the virtual foreign key relationship is generated as an additional foreign key relationship to augment existing foreign key relationships codified in the source database; [and] in response to receiving the request to generate the virtual foreign key relationship between the selected candidate foreign key and the selected candidate primary key, generating the virtual foreign key relationship at least in part by generating a record for the virtual foreign key relationship, wherein the record for the virtual foreign key relationship is stored externally to the source database in which the existing foreign key relationships are codified; and generating, based at least in part on the source database, a destination database at least in part by accessing an existing foreign key relationship codified in the source database and accessing the record for the virtual foreign key relationship stored externally to the source database, wherein foreign key constraints associated with both the existing foreign key relationship and the virtual foreign key relationship are enforced when generating the destination database.

8. The method of claim 7, wherein the set of candidate foreign keys is sorted by frequency in the user interface.

9. The method of claim 7, wherein the virtual foreign key relationship is editable.

10. The method of claim 7, wherein the existing foreign key relationship codified in the source database is locked from modification.

11. The method of claim 7, wherein the destination database comprises a scaled version of the source database.

12. The method of claim 7, wherein the destination database comprises synthetic data generated at least in part by transforming source data in the source database, and wherein what source data is transformed is based at least in part on the virtual foreign key relationship.

* * * * *

UNITED STATES PATENT AND TRADEMARK OFFICE
CERTIFICATE OF CORRECTION

PATENT NO. : 12,130,840 B2
APPLICATION NO. : 18/084001
DATED : October 29, 2024
INVENTOR(S) : Emily Christine Ritter et al.

It is certified that error appears in the above-identified patent and that said Letters Patent is hereby corrected as shown below:

In the Drawings

In drawing sheet 17 of 36, figure 7B, reference no. 714, delete "matching"" and insert --matching--, therefor.

In the Specification

In Column 4, Line(s) 48, after "removed", insert --.--.

In Column 14, Line(s) 51, delete "database" and insert --databases--, therefor.

In Column 21, Line(s) 14, delete "patent" and insert --patient--, therefor.

In Column 21, Line(s) 14, after "may", insert --be--.

In Column 22, Line(s) 41, after "customer key", insert --as a--.

In Column 30, Line(s) 37, after "documents", insert --.--.

In Column 30, Line(s) 62, after "may", delete "be".

In Column 31, Line(s) 49, delete "navigatable" and insert --navigable--, therefor.

In Column 32, Line(s) 65, delete "Javascript" and insert --JavaScript--, therefor.

In Column 39, Line(s) 15, delete "than" and insert --then--, therefor.

In Column 42, Line(s) 23, delete "navigatable" and insert --navigable--, therefor.

In Column 42, Line(s) 29 & 30, delete "navigatable" and insert --navigable--, therefor.

Signed and Sealed this
First Day of July, 2025

Coke Morgan Stewart
*Acting Director of the United States Patent and Trademark Office*

CERTIFICATE OF CORRECTION (continued)
U.S. Pat. No. 12,130,840 B2

In Column 44, Line(s) 9, delete "navigatable" and insert --navigable--, therefor.

In Column 47, Line(s) 31, delete "acquisitions. acquired_year." and insert --acquisitions.[ ].acquired_year.--, therefor.

In Column 47, Line(s) 33, delete "acquisitions. acquired_year" and insert --acquisitions.[5].acquired_year--, therefor.

In Column 47, Line(s) 33 & 34, delete "acquisitions. acquired_year" and insert --acquisitions.[6].acquired_year--, therefor.

In Column 47, Line(s) 35, delete "acquisitions..acquired_year" and insert --acquisitions.[ ].acquired_year--, therefor.

In the Claims

In Column 51, Line(s) 12, Claim 7, delete "[and]".